(12) United States Patent
Ushakov

(10) Patent No.: US 9,883,275 B2
(45) Date of Patent: *Jan. 30, 2018

(54) WEARABLE TELECOMMUNICATION DEVICE IN A FORM OF A NECKLACE

(71) Applicant: Alexey Ushakov, Moscow (RU)

(72) Inventor: Alexey Ushakov, Moscow (RU)

(*) Notice: Subject to any disclaimer, the term of this patent is extended or adjusted under 35 U.S.C. 154(b) by 11 days.

This patent is subject to a terminal disclaimer.

(21) Appl. No.: 15/168,012

(22) Filed: May 28, 2016

(65) Prior Publication Data

US 2016/0277824 A1    Sep. 22, 2016

Related U.S. Application Data

(63) Continuation-in-part of application No. 15/052,240, filed on Feb. 24, 2016, now Pat. No. 9,621,978, which is a continuation of application No. 13/902,903, filed on May 27, 2013, now Pat. No. 9,282,392.

(30) Foreign Application Priority Data

Dec. 28, 2012  (RU) ................................ 2012158157

(51) Int. Cl.
*H04R 1/10* (2006.01)
*H04M 1/05* (2006.01)
*H04M 1/15* (2006.01)
*H04R 1/02* (2006.01)

(52) U.S. Cl.
CPC ............ *H04R 1/1033* (2013.01); *H04M 1/05* (2013.01); *H04M 1/15* (2013.01); *H04R 1/1066* (2013.01); *H04R 1/028* (2013.01); *H04R 1/1041* (2013.01); *H04R 2201/023* (2013.01); *H04R 2201/107* (2013.01)

(58) Field of Classification Search
CPC .... H04R 1/1033; H04R 1/1066; H04R 1/028; H04R 1/1041; H04R 2201/023; H04R 2201/107; H04M 1/05; H04M 1/15
USPC .................................................... 381/333, 74
See application file for complete search history.

(56) References Cited

U.S. PATENT DOCUMENTS

2011/0216931 A1*  9/2011  Bui ...................... H04R 1/1091
                                                                    381/333

* cited by examiner

*Primary Examiner* — Vivian Chin
*Assistant Examiner* — Ammar Hamid
(74) *Attorney, Agent, or Firm* — Bardmesser Law Group

(57) ABSTRACT

A wearable telecommunication device configured as an electronic necklace in a form of an open or closed neck loop comprising electronic components and connected to two in-ear earphones. The point of connection of the proximal end of the earphone cords to the neck loop is on the dorsal neck surface. An additional cord connection node positioned under the user's occiput, which allows the earphones and the cords to be secured when the earphones are operational, and reduces excursion of the loose portions of the cords, thus providing the device to be non-changing appearance of the user. Ferromagnetic inserts allow the earphones and the cords to be secured when non-operational, for the device to be hidden. The device may be embodied as a wireless headset for a mobile telecommunication device, a telecommunication device itself, an audio player, a CB radio station, a part of a personal health or security system, etc.

57 Claims, 43 Drawing Sheets

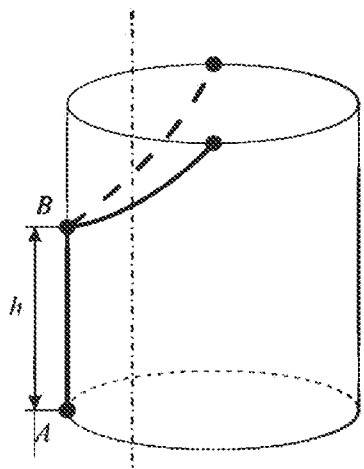
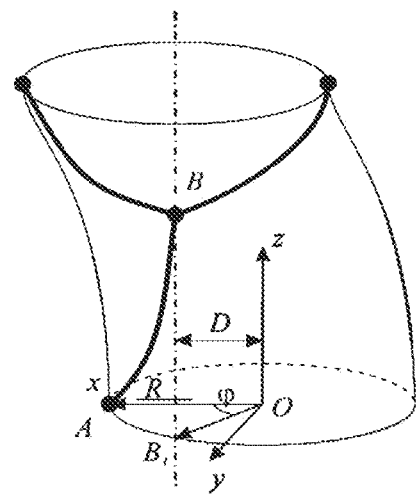
FIG. 2A          FIG. 2B
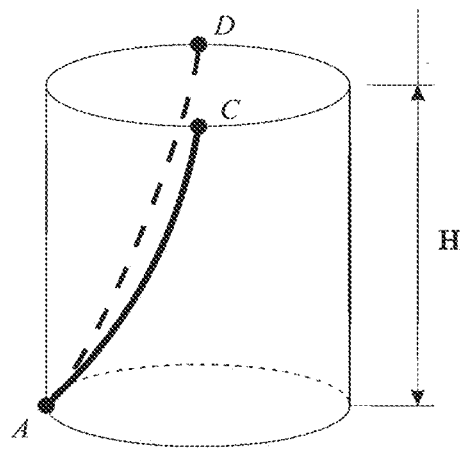
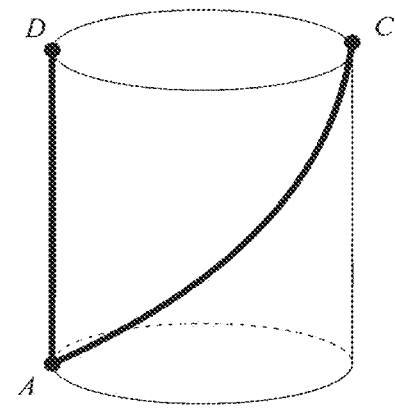
FIG. 3A          FIG. 3B

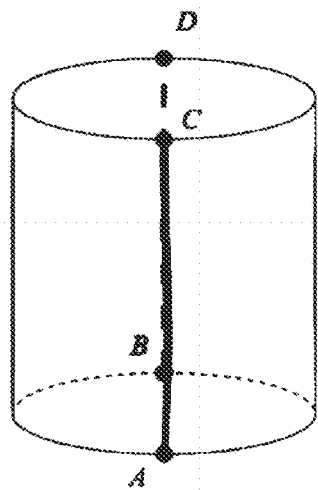
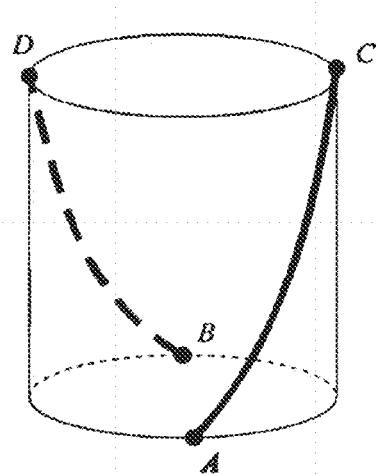
FIG. 4A
FIG. 4B
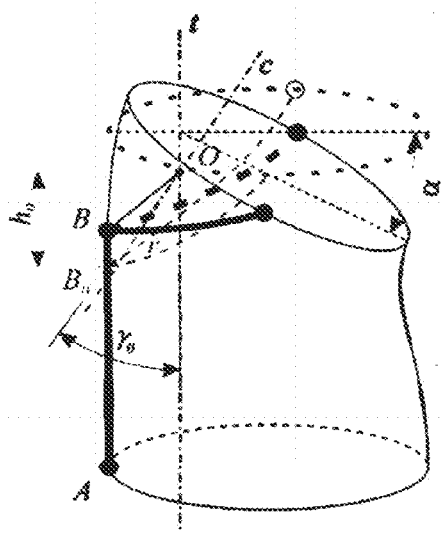
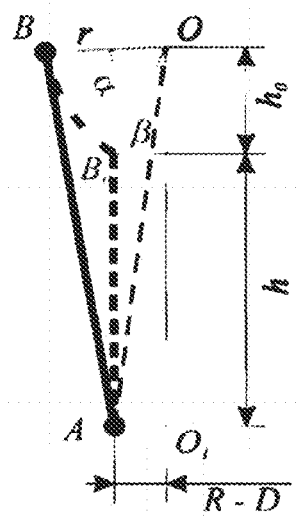
FIG. 5A
FIG. 5B

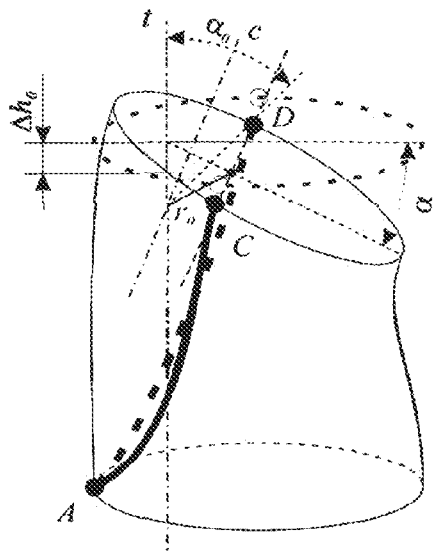
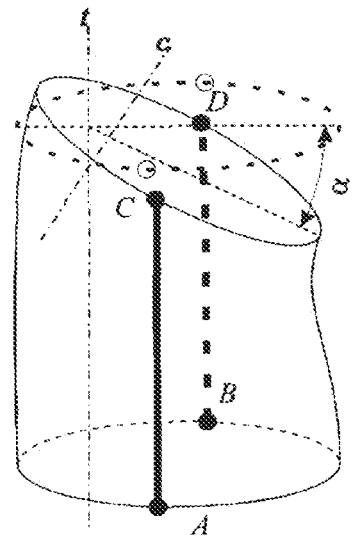
FIG. 6A        FIG. 6B
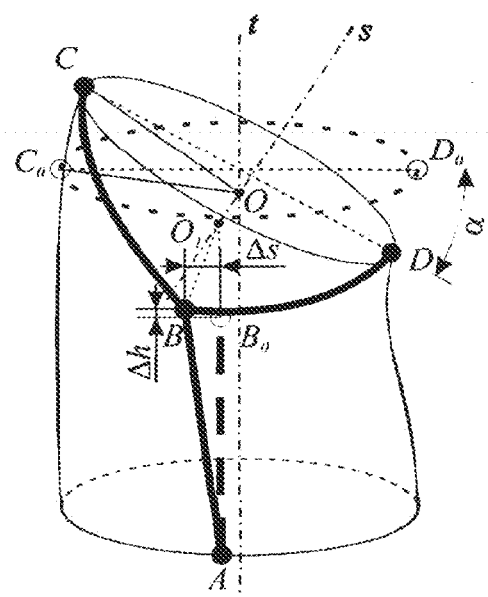
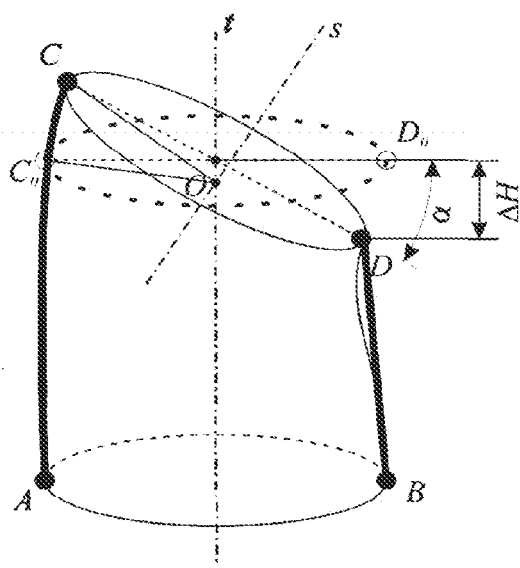
FIG. 7A        FIG. 7B

WEARABLE TELECOMMUNICATION DEVICE IN A FORM OF A NECKLACE

CROSS-REFERENCE TO RELATED APPLICATIONS

This application is a continuation in part of U.S. patent application Ser. No. 15/052,240, filed on Feb. 24, 2016, which is a continuation of U.S. patent application Ser. No. 13/902,903, filed on May 27, 2013, which claims priority to Russian Patent Application No. 2012158157, filed on Dec. 28, 2012 all of which are incorporated by reference herein in their entirety.

FIELD OF THE INVENTION

The invention relates to telecommunication devices, and, more particularly, to a wearable telecommunication device in the form of a necklace.

BACKGROUND OF THE INVENTION

Wearable telecommunication devices based on a necklace, collar, neckband, headband or other similar load-carrying structure are often used as an interface between a human being and a technical system, which may be a telecommunication system, a computer system, an entertainment system, a medical system, a security system, etc.

Known stereo headsets in the form of a necklace, collar, neckband, either of a neck half-loop or a neck loop type, have predominantly two types of connection between earphones and the neck part: headsets with two side nodes, in which earphone cords are connected with the neck part and do not have connections between themselves, and headsets with a single node, in which earphone cords are connected to each other and to the neck loop in a single node.

A conventional headset (U.S. Pat. No. 7,416,099B2) comprises earphones connected through cords to a supporting structure, which accommodates a signal transceiver, and is connected to a necklace (neck loop). The headset comprises long unsecured portions of cords connecting the earphones to the neck loop, because the additional length is needed when the user rotates and moves the head relative to the torso. The headset has two nodes and the length of the movable portion of the cords in the headset is more than 19 cm. The cords hang freely along the entire length thereof in the air over the user's body surface, so they have slack and might tangle and cling to surrounding objects. In addition, the headset is difficult to wear under clothing, both in the operational and non-operational position, i.e., when the earphones are taken off the ears.

A known earphone storage structure (U.S. Pat. No. 7,936,895B2) comprises a necklace (similar to a neck loop), two fasteners formed in the two ends of the necklace, and stoppers. The size of the fasteners is smaller than the size of the stoppers and the size of the earphones, therefore the earphones may be pulled out when they are not used. The stoppers connection form nodes, and this device relates to headsets with two side nodes. The earphone storage structure has the same limitations as the previous device: cords have slack, and the structure is difficult to wear under clothing, and managing it through clothing is not convenient.

A lanyard for a portable electronic device (U.S. Pat. No. 7,650,007B2) comprises two side connection nodes and allows adjusting the length of earphone cords, but the lanyard does not eliminate sagging of cords in the operational position.

In a necklace-type audio device (WO2012015257A1), earphone cords form a neck loop when they are attached at their ends to a jack disposed on the user's chest, and crossed through two rings disposed in the back of the necklace (neck loop), the rings being adapted to adjust the length of the neck loop and earphone cords. In this device, the length of the cords connecting the earphone to the necklace (neck loop) is even longer than in necklace-type headsets with two side nodes; this contributes to slacking the cords, and the way of adjusting the length of cords in the headset eliminates a possibility of wearing the device under clothes.

A known modular personal audio device (WO2005022872A1) and (US20070021073A1) comprises a necklace having a winding device for headphone cords. These cords are connected to the rear part of the necklace and may be coiled when the headphones are in the non-operational position. However when the cords are in the operational position, they are still loose and so remain movable, and freely hang over the user's head during rotation of the head. Hook-type holders are provided for securing the headphones to the auricle. This makes wearing the device noticeable and inconvenient. The device does not have any controls means.

There is a known headset (US20010010727A1) to be mounted upon glasses, the headset comprising a half-rigid anatomic headband in which headphone cords are disposed. The cords extend from the occipital side of the headband and form a freely located loop on the way to the device connected to the headset. This makes wearing the headset noticeable and inconvenient. The device does not have any controls means.

There is a known headset (US20020043545A1) comprising a headphone and a microphone, the headset provided in the form of a wire loop bearing the device connected to the headset. This makes wearing the headset noticeable and inconvenient. The device does not have any controls means.

There is a known headset (US2002065115A1) which comprises one or two headphones and one or two microphones, the headset provided in the form of a wire loop bearing the device connected to the headset. The headphones are connected to the device by separate cords. This makes wearing the headset noticeable and inconvenient. The device does not have any controls means.

There is a known electronic telecommunication device (US20020090099A1) comprising a microphone located in an electronic unit hanging on the user's chest, using a wire loop, and a headphone connected to the electronic unit by a separate cord, wherein the electronic unit comprises controls means and (optionally) a power supply unit fastened to the back side of the wire loop on the user's neck. This makes wearing the device noticeable and inconvenient.

There is a known headset (US20030096640A1) comprising a holder of an external electronic telecommunication device, a headphone and a retracting and coiling device for the headphone cord, the retracting device further providing securing the headphone when it is in a non-operational position. The headphone is connected to the telecommunication device by a separate cord, and the device is positioned in a pocket or fastened to a belt, etc. This makes wearing the headset noticeable and inconvenient. The device does not have any controls means.

There is a known headset (US20030104842A1) comprising a microphone located in an electronic unit hanging on the user's chest, using a wire loop, and a headphone connected to the electronic unit by a separate cord. This makes wearing the headset noticeable and inconvenient.

There is a known headset (US2004157649A1) in the form of spectacles, comprising headphones secured on the spectacle frame, an electronic unit and a control means. The headset comprises massive spectacle sides accommodating the electronic unit and a power source and so having a considerable weight. This makes wearing the headset noticeable and inconvenient.

There is a known loop (US20070080186A1) for retaining an electronic device, wherein cords are located inside the loop, and the user is able to change the point where the cord leaves the loop and to adjust the length of the loose part of the cord by moving a clip. However this makes wearing the headphones noticeable and inconvenient during rotation of the head.

There is a known wire loop (US20070053523A1) for retaining an electronic device, wherein the user is able to adjust the length of the loose part of the cords by moving a clip. However this makes wearing the headphones noticeable and inconvenient.

There is a device (US20100151922A1) for retracting and coiling a headphone cord and for securing the headphone when it is in the non-operational position. The headphone is connected to the telecommunication device by a separate cord, and the device is positioned inside an electronic apparatus which may be positioned in a pocket or fastened to a belt, etc. This makes wearing the headphone noticeable and inconvenient. The device does not have any controls means.

There is a known headset (US2008143954A1), (US20110051982A1) in the form of spectacles comprising headphones to be secured on the spectacle frame when the headphones are in the non-operational position and connected by separate cords to an electronic unit located on the user's occiput. The headset has a considerable weight and the electronic unit observably extends from the user's head surface. This makes wearing the headset noticeable and inconvenient.

There is a device (US20110130174A1) for retracting and coiling a headphone cord. Headphones are connected to an electronic apparatus by separate cords, and the device is positioned on the surface of the apparatus which may be placed in a pocket or fastened to a belt, etc. This makes wearing the headphone noticeable and inconvenient. The device does not have any controls means.

There is a known headset (US20110170723A1) comprising a rigid anatomic headband in which an electronic device and a power source are disposed, so the headset has a considerable weight. The headset does not contain hanging wires, however the considerable size and weight of the rigid headband make wearing the headset noticeable and inconvenient.

There is a known headset (US2008283651A1) comprising a loop for bearing the headset on the user's neck, headphones and a device for retracting and coiling the cord extending from the headset to an external electronic device which may be placed in a pocket or fastened to a belt, etc. This makes wearing the headphone noticeable and inconvenient. The device does not have any controls means.

A known modular personal audio device (US2009318198A1) comprises headphones connected by separate cords to an electronic unit comprising a power source and located on the user's neck's back side. The separate cords are disposed at the level of lower part of user's auricles, so this makes wearing the device noticeable and inconvenient.

There is a known wire loop (WO2003103255A1) for bearing an electronic device, wherein the user is able to adjust the length of the loose part of the headphone cords by moving a clip, and magnets are used to retain the headphones in the non-operational position. However when the user changes length of the headphone cords, size of the neck loop changes correspondingly, and the cords comprise loose parts. All this makes wearing the headphone noticeable and inconvenient.

There is a known wire loop (WO2006031320A1) for bearing an electronic device, wherein a headphone is connected to the device by a separate cord. A loose part of the cord makes wearing the headphone noticeable and inconvenient.

There is a known audio player (WO2009019517A2) aggregated with a rigid headband, wherein an electronic device and control means are disposed in a rear part of the headband located on the back surface of the user's neck. A rigid configuration of the player makes its wearing noticeable and control turns out to be inconvenient.

There is a known headset (CH681841A5) comprising an open rigid loop having a throat microphone at one end thereof and a headphone to be secured on the user's auricle when the headphone is in the operational position. The headphone is connected to the loop by a separate cord. A rigid configuration of the headset makes its wearing noticeable and incompatible with certain types of clothes. The device does not have any controls means.

There is a known headset (WO2010019634A2) comprising an open rigid loop having a microphone located at one end thereof and headphones connected to the loop by separate cords. A loose part of the cord makes wearing the headphone noticeable and inconvenient. A rigid configuration of the loop is incompatible with certain types of clothes.

There is a known headset (RU2177675C2) comprising a laryngophone to be located on the temporal part of the user's head and a headphone, wherein the operational position of the laryngophone and the headphone are ensured by a flexible bandage positioned on the head. The bandage makes wearing the headset noticeable and incompatible with certain types of headwear.

Therefore, the conventional devices, first, comprise excessively long unsecured portions of cords that connect the head part of a headset having a neck loop (in headsets with a single node the length of freely hanging cords is about 19 cm, and in headsets with two side nodes it is about 25 cm) and, second, unsecured portions of cords in the conventional devices do not fit to the body surface. The cord slack cannot be fully removed without restricting the freedom of movement of the user's head. Therefore, when the devices are used, the cords either slack, tangle and cling to surrounding objects, or restrict freedom of the user's movement.

Therefore, no device suitable for constant wearing has been designed up to now, which device would have a small total length of freely hanging cords snugly fitted to the body and creating no impediments to movements of the head. Such a device shall provide improved user experience by facilitating easy use, assuring secure fixation thereof on the user's body, and preventing failures caused by the cords clinging to surrounding objects.

In general, the degree of slack of cords depends on the following factors:
    the length of movable portion of cords between fixed points. In all conventional neck headsets this is the length of the cord between an earphone and the neck loop, so the shorter the movable portion of the cord, the less the slack is;

cord tension;

degree of adherence of the cord to the body surface;

position of the cords; cords disposed on a plane do not slack as opposed to cords hanging in the air or lying above natural depressions on the surface of user's body.

The impact of the above factors is illustrated in the drawings and further explained by examples of conventional devices and a device according to the invention.

It shall be noted here that some new types of headphones having different configuration have come up recently. This caused some confusion in terms describing headphones in patent and engineering publications.

Particularly, the term "earphone" is construed by Wikipedia as follows: "Earphone consist of individual units that plug into the user's ear canal", however the same article further recites: "Earphones are very small headphones that are fitted directly in the outer ear, facing but not inserted in the ear canal".

Sometimes, the term "earphone" is applied to conventional headphones. For example, claims of U.S. Pat. No. 8,194,909, entitled "Earphone, headset and ear protector" recite "an earphone comprising a hoop with a first and a second pivot point", and U.S. Pat. No. 8,111,858 discloses an earphone as a "supra-aural headphone".

The above review of the prior art indicates that in order to avoid any confusion and assure precise meaning of a key feature of the invention, this term shall be clarified. The purpose of this invention may be achieved when the earphone is exactly the in-ear earphone. Therefore, in order to avoid any confusion, the term "earphone" used herein means exactly "in-ear earphone".

SUMMARY OF THE INVENTION

Accordingly, the present invention is directed to a headset for a mobile electronic device or by a wearable telecommunication device comprising earphones that substantially obviates one or more of the disadvantages of the related art. A headset for a mobile electronic device or a wearable telecommunication device comprising earphones, which prevent substantial changing the user's appearance while wearing thereof, and assure convenient use with no restricting freedom of user's movement, and can be effectively controlled directly through the user's clothes.

These and other advantages are assured by a headset for a mobile electronic device, comprising a neck loop with at least one electrical connector attached thereto; two in-ear earphones; two cords, one end of each of the cords being connected to one of the earphones and the other end being connected to the electrical connector; wherein the two cords are mechanically connected to the neck loop, and points of connection of the cords to the neck loop are placed in close proximity to each other and form a dorsal node, and the two cords are mechanically connected to each other in their portions between the earphones and the dorsal node to form a suboccipital node at the connection point.

In the exemplary headset, when the earphones are worn by the user in the operational position, the dorsal node and the suboccipital node may be disposed on the dorsal surface of the neck, and cords in their portions between the earphones and the suboccipital node may be placed over the auricle.

In the exemplary headset, cords in portions between the earphones and the suboccipital node, when the earphones are worn by the user in the operational position, may be disposed on the surface of the head in a tensioned state.

In the exemplary headset, when the earphones are worn by the user in the operational position, the dorsal node may be positioned at the level of the seventh cervical vertebra, the suboccipital node may be positioned at the level of the external occipital protuberance, and the portion of each of the cords between the suboccipital and dorsal nodes may have a length determined by the maximum distance between the first and seventh cervical vertebrae of the user, measured on the dorsal surface of the neck with the head rotated sideway and tilted downward at the same time.

In the exemplary headset, the portion of each of the cords between the suboccipital and dorsal nodes may have a length in the range of 5 cm to 13 cm.

In the exemplary headset, the suboccipital node may be configured as a clip adapted to move along the cords for adjusting the length of the cords.

In the exemplary headset, the suboccipital node may comprise an electrical connector for disconnecting the cords.

In the exemplary headset, at least one of the cords in its portion between the suboccipital and dorsal nodes may be configured at least partly in the form of a helical spring.

In the exemplary headset, at least one of the cords in its portion between the suboccipital and dorsal nodes cord may be configured at least partly in the form of an S-spring.

The exemplary headset may further comprise a spring disposed between the suboccipital and dorsal nodes.

The exemplary headset may further comprise at least one electronic unit mechanically and electrically coupled to at least one electrical connector.

The exemplary headset may further comprise at least two control means disposed on the neck loop.

The exemplary headset may further comprise at least one power supply disposed on the neck loop.

The exemplary headset may further comprise at least one microphone disposed on the neck loop.

In the exemplary headset, the neck loop may be U-shaped or O-shaped.

In the exemplary headset, the earphones may be configured to be at least partly placed in the external auditory canal.

The above-stated and other advantages are also assured by a wearable telecommunication device comprising a neck loop with at least one electrical connector attached thereto; two cords, one end of each of the cords being connected to one of the earphones and the other end being connected to the electrical connector; wherein the two cords are mechanically connected to the neck loop, and points of connection of the cords to the neck loop are in close proximity to each other and form a dorsal node, and the two cords are mechanically connected to each other in their portions between the earphones and the dorsal node to form a suboccipital node at the connection point; wherein each of the in-ear earphones, the suboccipital node and the dorsal node comprises at least one ferromagnetic insert configured to avoid or reduce magnetic attraction of the earphones to each other and to the suboccipital node, and the neck loop comprises at least one ferromagnetic insert configured to attract the headphones and/or the suboccipital node; wherein at least one of the ferromagnetic inserts is a magnet.

In the exemplary wearable telecommunication device, the neck loop may be U-shaped or O-shaped.

In the exemplary wearable telecommunication device, when the earphones are worn by the user in the operational position, the dorsal node may be configured to be disposed on the lower dorsal surface of the neck, the suboccipital node may be configured to be disposed on the upper dorsal surface of the neck, and cords in portions between the in-ear earphones and the suboccipital node may be configured for disposing in a tensioned state over the auricle; wherein when the earphones are worn by the user in the non-operational position, the suboccipital node may be configured to be secured to at least one of the ferromagnetic inserts of the neck loop, and each of the earphones may be configured to be secured to at least one of the ferromagnetic inserts of the neck loop.

In the exemplary wearable telecommunication device, at least one of the cords in its portion between the suboccipital and dorsal nodes may be configured at least partially in the form of a helical spring or an S-spring.

In the exemplary wearable telecommunication device, each of the cords in its portion between the suboccipital and dorsal nodes may be configured to be of 5 cm to 8 cm length when the spring is in a free, unloaded state.

In the exemplary wearable telecommunication device, each of the cords in its portion between the suboccipital node and the earphone may be configured in the form of a helical spring or an S-spring.

In the exemplary wearable telecommunication device, each of the cords in its portion between the suboccipital node and the earphone may be configured to be of 12 cm to 16 cm length when the spring is in a free, unloaded state.

In the exemplary wearable telecommunication device, at least one of the magnets may be a permanent magnet or an electromagnet.

In the exemplary wearable telecommunication device, the neck loop may comprise a Bowden cable.

In the exemplary wearable telecommunication device, the neck loop may comprise at least two rigid members disposed astride of the dorsal node and configured to be worn on the user's chest and the neck loop may be configured so as to prevent twisting the rigid members; wherein at least one of the ferromagnetic inserts may be located in at least one of the rigid members, wherein when the earphones are in the non-operational position, they may be configured to be secured on one of the rigid members by at least one of the ferromagnetic inserts, and the ferromagnetic inserts of the earphones may be configured to be adjacent to the at least one of the ferromagnetic inserts located in the rigid member.

In the exemplary wearable telecommunication device, the rigid member may comprise mechanical holding means configured to secure the earphones in the non-operational position.

The exemplary wearable telecommunication device may comprise at least one electronic unit electrically and mechanically connected to the electrical connector.

In the exemplary wearable telecommunication device, the suboccipital node may be configured in the form of a clip for adjusting the length of the cords between the suboccipital and dorsal nodes and between the suboccipital node and the earphones by moving along the cords.

In the exemplary wearable telecommunication device, the suboccipital node may be configured in the form of an electric connector for disconnecting the cords.

In the exemplary wearable telecommunication device, the dorsal node may be configured in the form of an electric connector for disconnecting the cords.

The exemplary wearable telecommunication device may comprise at least two control means placed on the neck loop.

In the exemplary wearable telecommunication device, the control means may be configured to generate a control command only when two control means are activated simultaneously.

The exemplary wearable telecommunication device may comprise at least one power source placed on the neck loop.

The exemplary wearable telecommunication device may comprise at least one microphone placed on the neck loop.

The exemplary wearable telecommunication device may comprise at least one lock for opening the neck loop.

The above-stated and other advantages are also assured by a wearable telecommunication device comprising a neck loop comprising at least two rigid members connected to each other so as to prevent twisting the rigid members; at least one electronic unit disposed in at least one of the rigid members; two in-ear earphones each comprising a ferromagnetic insert; two cords, the distal end of each cord being connected to one of the earphones and the proximal end being mechanically and electrically connected to the electronic unit; wherein the two cords are mechanically connected to the neck loop so the points of connection of the cords to the neck loop are located in close proximity to each other and form a dorsal node configured to be disposed on the lower dorsal surface of the neck while wearing the earphones in the operational position, the two cords are further mechanically connected to each other in their portions between the earphones and the dorsal node to form a suboccipital node configured to be disposed on the upper dorsal surface of the neck while wearing the earphones in the operational position; wherein each of the cords in its portion between the suboccipital node and the earphone is to be disposed in a tensioned state over the auricle and configured at least partially in the form of a helical spring or an S-spring so as to be of 12 cm to 16 cm length when the spring is in a free, unloaded state; wherein each of the cords in its portion between the suboccipital node and dorsal node is configured at least partially in the form of a helical spring or an S-spring so as to be of 5 cm to 8 cm length when the spring is in a free, unloaded state; wherein the rigid members are disposed on the neck loop astride of the dorsal node and configured to be worn on the user's chest, and at least one of the rigid members comprises at least one nest recess for parking the earphones in the non-operational position thereof, each recess combined with at least one ferromagnetic insert configured to secure the earphones by means of magnetic attraction, wherein the length of the neck loop between the recess and the dorsal node is in the range of 16 cm to 24 cm; wherein each of the earphones and the suboccipital node comprise at least one ferromagnetic insert configured to avoid or reduce magnetic attraction of the earphones to each other and to the suboccipital node, and the neck loop comprises at least one ferromagnetic insert disposed between the dorsal node and the rigid member and configured to attract the suboccipital node.

In the exemplary wearable telecommunication device, the neck loop may be configured at least partially in the form of a Bowden cable.

In the exemplary wearable telecommunication device, each of the cords between the dorsal and suboccipital nodes may be configured in the form of a helical spring or an S-spring.

In the exemplary wearable telecommunication device, the cords between the dorsal and suboccipital nodes may be configured as an integral cord.

In the exemplary wearable telecommunication device, the suboccipital node may be configured in the form of a clip for adjusting the length of the cords between the suboccipital and dorsal nodes and between the suboccipital node and the earphones by moving along the cords.

In the exemplary wearable telecommunication device, the rigid members may be configured as flat shells having a polyhedron-like form, wherein the planes of two narrow facets of the polyhedron may be substantially parallel to each other and substantially perpendicular to the user's body plane, and at least one of the rigid members may contain at least one control means positioned on at least one of the facets near the rigid member's corner where the facet borders another facet being perpendicular to the user's body plane, and the control means may be configured to be easily found and activated through the cloths when the device is worn under the cloths, wherein intentional activation thereof is possible by catching and holding the member with two fingers and unintentional activation thereof is prevented.

In the exemplary wearable telecommunication device, the neck loop may be U-shaped or O-shaped.

In the exemplary wearable telecommunication device, the electronic unit may be positioned on the neck loop antipodally to the dorsal node.

The exemplary wearable telecommunication device may comprise at least one power source placed on the neck loop.

The exemplary wearable telecommunication device may comprise at least one microphone placed in the rigid member.

The exemplary wearable telecommunication device may comprise at least one lock for opening the neck loop.

In the exemplary wearable telecommunication device, the suboccipital node may be configured is the form of an electric connector for disconnecting the cords.

In the exemplary wearable telecommunication device, the dorsal node may be configured is the form of an electric connector for disconnecting the cords.

In the exemplary wearable telecommunication device, at least one of the rigid members may comprise a curved passage for adjusting the size of the neck loop by placing a part of the flexible portion of the neck loop located between the dorsal node and the left and right rigid members, correspondingly, into the passage.

In the exemplary wearable telecommunication device, at least one of the rigid members may be configured to mechanically and/or electrically connect to at least one additional electronic unit.

In the exemplary wearable telecommunication device, the nest recess may comprise at least one mechanical holding means configured to hold one or both of the earphones in the non-operational position thereof.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 2A and FIG. 2B illustrate a mathematical model of the neck surface where a headset has two nodes and the head is shown in the normal position and may rotate by an angle $\pi/2$.

FIG. 3A and FIG. 3B illustrate a mathematical model of the neck surface where a headset has a single node and the head is shown in the normal position and may rotate by an angle $\pi/2$.

FIG. 4A and FIG. 4B illustrate a mathematical model of the neck surface where a headset has two side nodes and the head is shown in normal position and may rotate by an angle $\pi/2$.

FIG. 5A illustrates a mathematical model of the neck surface where a headset has two nodes and the head is tilted vertically.

FIG. 5B illustrates the calculation of the length of segment AB when the head is tilted forward by an arbitrary angle $\alpha$.

FIG. 6A and FIG. 6B illustrate a mathematical model of the neck surface where a headset has a single node and two side nodes, correspondingly, and the head is tilted vertically.

FIG. 7A and FIG. 7B illustrate a mathematical model of a head tilted sideway where a headset has two nodes and where a headset has two side nodes.

DETAILED DESCRIPTION OF THE INVENTION

The features and advantages of the inventions are discussed in details below.

Let us assume that in order to assure wearing a device on the user's body without additional support, it is expedient to provide the device in the form of a loop or a half-loop.

This assumption is based on the form of clothing articles, electronic, mechanical, or jewelry devices (even harness) which are held on the human body, limbs or head since they are based on the loop form (such as pants, coat, watch, hat, etc.) or half-loop form (collar, unbuttoned coat, diadem, half-bracelet, tiara) each of which assures fixation of the article on the body.

Figure 1A:
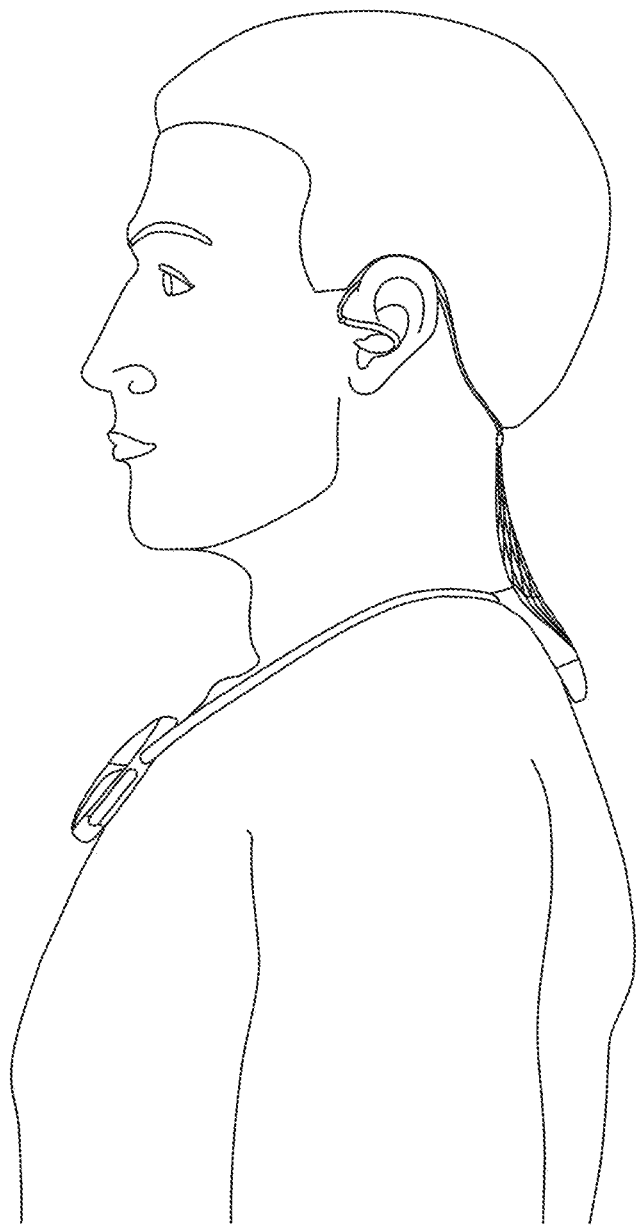
FIG. 1A and FIG. 1B show a general view of a wearable device according to the invention in the operational position of the earphones, placed on the user.

When a user wears a headset in the form of an open loop (FIG. 1A) or a close loop (FIG. 1B), a node that connects earphone cords 5 to a neck loop 1 rests on the dorsal surface of the user's neck, in the region of the seventh cervical vertebra. Slightly lower on the human body, there is a trough deepening lying between the spinous and transverse processes of the vertebrae, sulcus dorsalis, at the level of the second-third thoracic vertebrae in the interscapular region, where a depression of various depth of about 4×5 cm (depending on the constitution and development of subcutaneous fat) is formed at the place of attachment on the medial edges of both blades of serratus anterior muscle, and a large and minor rhomboids muscles (musculae rhomboidei major et minor). The depression may receive a cord winding mechanism and an earphone storage pocket, without projecting above the surface of the body and so without causing inconvenience to the user.

From the cord connection node on the neck part, the cords run up on the dorsal surface of the neck to the back of the head, on the paravertebral deepening, sulcus costae vertebralis major, not reaching the outside occipital protuberance at the level of the first or second cervical vertebrae, where an additional cord connection node, suboccipital node 6, is appropriate to arrange. If the cords are directed in a V manner from the suboccipital node in the oblique anterior-upward direction slightly above or at the hairline, which is almost coinciding with the upper occipital skull line, through the mastoid regions (regiones mastoideae) of the neck, above the mastoid processes, through the projection of ligamentum auriclere superior, which attaches the top part of the auricler cartilage to the squamous part of the temporal bone on the upper portion of the auricle between the front curl and tragus of the outer ear to a fixation point in the earphone 3 of the appropriate side, then the stable position of the suboccipital cord connection node will be provided by the availability of fixing anatomical structures at the datum point, such as the external occipital protuberance and lateral occipital projections, while a snug fit of the cords on the scalp is provided by stretching them on the dorsal surface of the head and neck in the places where the cords pass like a girth due to the partial hook-like overlap of the earphone cords through the ligamentum auriclere with additional fixing of the earphones inside the auricle.

With such attachment only the cords in the portion 7 between nodes 5 and 6 are movable, and only this portion may have a slack for compensation of the cord length, which changes when the head turns in the horizontal plane, tilts back, rocks from side to side, as well as when the movements are combined, that is, in all options that can arise in closed kinematic chains of the neck.

Cords 4 are relatively snugly fitted to the scalp and fixed relative to the user's head, and their length does not vary with all of the above movements and varies so little that these variations can be neglected.

Adherence and immobility of the cords 4 between the nodes are also promoted by the cellular connective tissue structure of the subcutaneous fat of the occipital region, a minor displacement of the skin in the area, the presence of Langer's lines running in the transverse direction in the skin, as well as the passage of the cord on a hollow of the postaural cavity, the hook-like overlap of the cords and positioning the earphones in the outer ear.

In conjunction with the suboccipital node, the tension and absence of slack are further provided by the design of the earphone, which is placed inside the auricle, in most cases, without an arc, but having a stiff part—an earphone arm attached to the earphone body lying in the outer ear and continued upward from the helical root on the ascending part of the helix to the ligamentum auriclere superior, the attachment point of the top of the auricle to the temporal bone. A flexible cord extends from the stiff arm, leaning over the above ligamentum auriclere superior at an angle of less than 45°, which contributes to the fact that the rigid arm of the earphone forms a lever, where at accidental tearing off of the earphone cords, that is, when the cords are pulled at down and back tension vector, the arising moment abuts the earphone against the tragus, thereby fixing the earphone between the tragus and the external auditory canal.

It shall be noted that it is preferred to use in-ear earphones, which are fully or partially inserted into the external auditory canal, in comparison with those in-ear earphones, which are placed within the auricle and are not inserted, wholly or partially, into the external auditory canal.

In terms of biomechanics, it shall be noted that movements of the head are described on the basis of closed kinematic patterns, and extrapolation of even fairly complex combinations of head movements to the fixation points can be considered in only one narrative category—as lengthening-shortening the cord portion between the dorsal cord connection node on the neck loop and the cord connection suboccipital node, which is almost stationary relative to the head and lies under the outer posterior occipital protuberance.

Figure 1B:
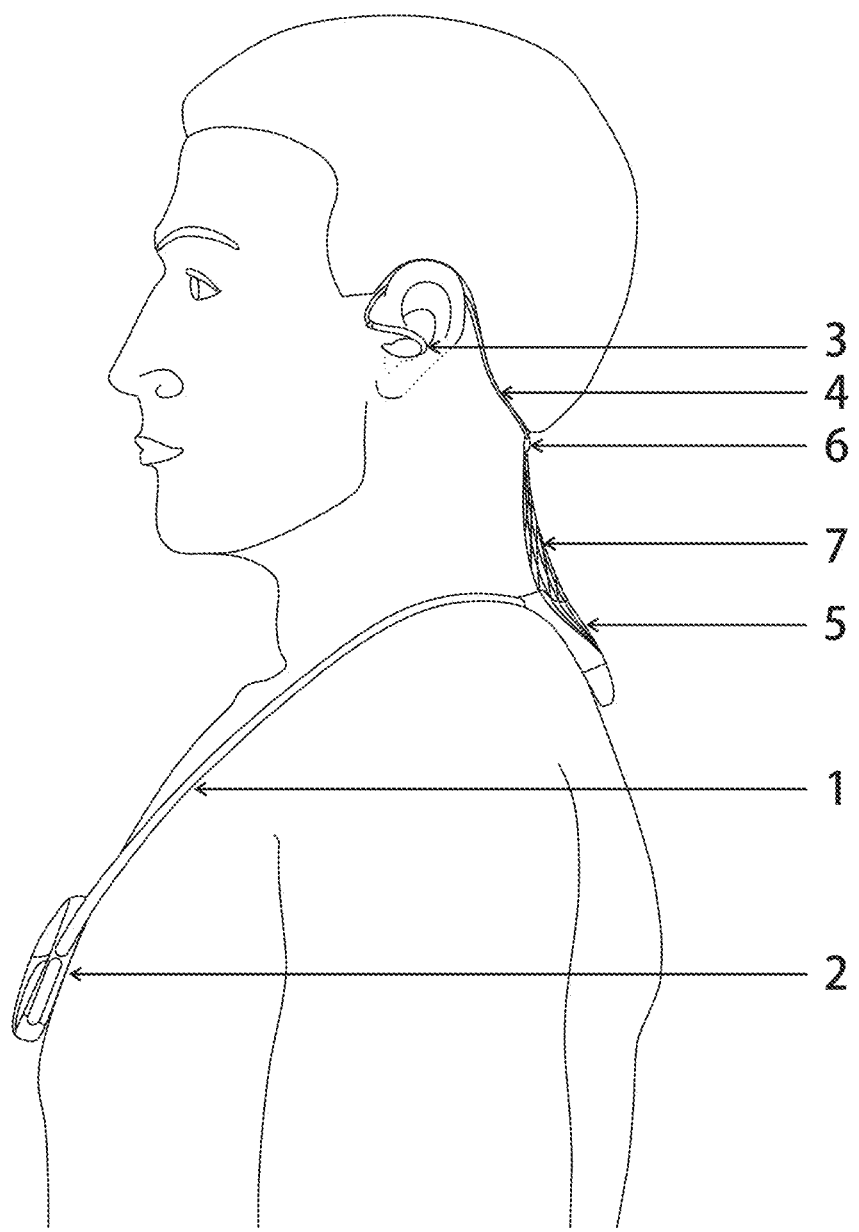

To construct a closed kinematic model, a headset can be represented as consisting of two basic parts and a movable connection thereof (FIG. 1B).

A first part (head part) is stationary relative to the user's head; it comprises two earphones 3, two earphone cords 4 enveloping the auricle from above, and a suboccipital node 6.

A second part is stationary relative to the user's body; it comprises a neck part 1 and a cord connection node disposed on the neck loop on the dorsal surface of the neck, a dorsal node 5.

As shown in FIG. 1B, positions of the cord connection nodes has been chosen at reference numeral 5, point A and reference numeral 6, point B (FIG. 2A, FIG. 2B). In this case, the length of the free-hanging cord 7 in the portion between the nodes should be minimal.

To determine the length of the AB portion, variations in the distance between points A and B as the head turns are to be considered. In this case, "distance" is the length of the geodesic line connecting points A and B on the surface of the neck (FIG. 2B). First, let us define the extension of the cord when the head rotates sideways. Maximum angle of rotation of the head is 90°. Let us determine the AB distance.

To determine the length of the geodesic line it is necessary to describe mathematically the surface of the neck and possible movements of the head and neck. The neck surface can be represented with sufficient accuracy as a cylinder (FIG. 2A). Head and neck can make the following motions: bending-tilting forward, extension/tilting backward, abduction and adduction/tilting to the left and to the right, turns to the left and to the right. High movability of the cervical spine is caused by its segmentation: having a height of about 13 cm, it contains seven medium-sized vertebrae and six high intervertebral discs. Between the first cervical vertebrae and the occipital bone, in the atlantal-occipital joint, adduction/abduction and flexion/extension of the head are performed, and between the first and second cervical vertebra turns of the head to the right and the left are performed. The joint work of these joints provides the head movement about three axes. Thus, combined movements of the head and neck are made in relation to the body, while independent movements of the head are made in relation to the neck. This is because the cervical spine is very flexible, and independent movements are possible between the first and second cervical vertebrae.

Let us consider the behavior of the kinematic model of the headset when the head rotates in the horizontal plane.

When the head rotates in the horizontal plane, the neck twists mainly in the region between the first and second vertebrae. Moreover, since the cervical spine is located closer the back of the neck, the twisting axis is also close to the back surface of the cylinder. Since the twisting is performed only in the upper part of the cylinder about a non-central axis, the cylinder surface is distorted. The distortion is most strongly manifested in the region of the first and second cervical vertebrae, just where point B lies. The main part of the geodesic line passes below the distortion, so in the calculations we assume the surface as cylindrical. An important issue is the determination of the location of point B when the upper part of the cylinder is twisted to a maximum angle $\alpha=\pi/2$. Since ears are symmetric about the twisting axis, that is the axis of the vertebral column, and the point B is fixed by the tensioned cords in symmetrical position as well, the position of point B can be expected in the next central angle $\varphi$ (FIG. 2B).

$$\varphi = \arcsin\left(\frac{R-D}{R}\right) \quad (1)$$

The height of point B will not change at rotation either because it is fixed by the tensioned earphone cords.

Let us consider the task of geodesic line of a cylinder having base radius R and height h (FIG. 2B). The line passes through two diametrically opposite points on different basis.

The geodesic line length is $$ds = \sqrt{dx^2 + dy^2 + dz^2}$$

being presented in differential form.

Since the curve lies on the surface of the cylinder, it is convenient to use cylindrical coordinates, with $dx^2 + dy^2 = R^2 d\varphi^2$, where $\varphi$ is the polar angle (FIG. 2B). In polar coordinates, the task is to find dependence $z(\varphi)$, at which the length of the curve is minimal or when the function $$S = \int_0^{\varphi_0} \sqrt{R^2 + z'^2} \, d\varphi \quad (2)$$

is minimal.

From calculus, it is known that a minimum is reached for the curve that satisfies the Euler equation, in this case:

$$\left(\frac{z'}{\sqrt{R^2 + z'^2}}\right)' = 0 \quad (3)$$

It follows that $z'(\varphi) = \alpha$, where a is the constant factor, then $z(\varphi) = a\varphi + b$. Coefficients are determined though boundary points A (R,0,0), the attachment point of the lower clip, and B (R,$\varphi_0$,h) with the polar angle $\varphi=0$ being at point A and equal to $\varphi_0$ at point B. Then the coefficients are of the form: $a = h/\varphi_0$, $b=0$. Then $z(\varphi) = \varphi \times h/\varphi_0$. And the length of the curve is equal to the value of the functional, i.e.:

$$S = \int_0^{\varphi_0} \sqrt{R^2 + h^2/\varphi_0^2}\, d\varphi = \sqrt{\varphi_0^2 R^2 + h^2} \qquad (4)$$

Thus, variation in distance AB or movability of cords $\Delta S$ is:

$$\Delta S = \sqrt{h^2 + R^2\varphi_0^2} - h \qquad (5)$$

where R—the radius of the cylinder, $\varphi_0$—the angle of rotation of node B, defined relative to the central axis of the cylinder, h—the height of the node. With regard to expression (1) the expression for movability of cords is:

$$\Delta S_t = \sqrt{h^2 + R^2 \arcsin^2\left(\frac{R-D}{R}\right)} - h. \qquad (6)$$

Now, for comparison, we will consider variation in the length of cords at horizontal rotation of the head in conventional headsets. FIG. 3A shows an example of such a headset. In this case, cords are clamped at point A, and the movable part is the entire cord from point A to earphones disposed at points C and D. Conventionally, the headset is denoted as a single node headset. Thus, movability of the cords can be determined from the difference between the distances from point A and D when the head rotates at the angle of 90° in one direction and in the other direction, since while the distance or the geodesic line length increases in one direction, it decreases in the other direction. These two distances can be determined in FIG. 3B, where the minimal distance is the length of line AC, and the maximal distance corresponds to line AD. As a result, movability of the cords can be found from expression (5) with the assumption of h=H and $\varphi_0 = \pi$, and it has the form:

$$\Delta S_{t1} = \sqrt{H^2 + R^2\pi^2} - H \qquad (7).$$

Let us consider another type of a headset, which will be conventionally called a headset having two side nodes (FIG. 4A). In this case assume that the headset cord, at rotation, always passes through points at the base of the cylinder, i.e., points A and B, cord connection nodes. Then the minimum distance between points A and C or B and D is H. The maximum distance when the head is rotated to 90° is shown by geodesic lines AC and BD (FIG. 4B). As a result, movability of the cords is also determined from expression (5) with the assumption of h=H and $\varphi_0 = \pi/2$, and is defined by the following expression:

$$\Delta S_{t2} = \sqrt{H^2 + R^2\pi^2/4} - H \qquad (8).$$

Next, let us consider behavior of the kinematic model when the head tilts forward and backward in the vertical plane.

Tilts of the head are performed by rotation of the head around the axis extending between the first cervical vertebra and the occipital bone. The tilt is often accompanied by a tilt of the entire cervical spine. In a headset having two nodes, the tilt of the neck has a little effect on distance AB, but rotation of the head has a significant impact, since node B is disposed directly on the occipital part. Thus, knowing distance from B to axis of rotation r and angle of rotation a (FIG. 5A), shift of node B can be estimated as $$BB_0 = r\alpha \qquad (9).$$

Now we will obtain an expression for the length of segment AB at arbitrary angle $\alpha$ from the triangle AOB (FIG. 5B):

$$AB^2 = AO^2 + r^2 - 2AO \times r \times \cos(\alpha+\beta) \qquad (10).$$

Distance to axis r can be determined though the distance from the back surface of the neck to the center of the cervical spine, i.e., R–D, and the difference of heights of point B and the axis of rotation of the head $h_0$:

$$r = \sqrt{(R-D)^2 + h_0^2} \qquad (11).$$

Then we will obtain the following expression from triangle $OO_1A$:

$$AO = \sqrt{(R-D)^2 + (h+h_0)^2} \qquad (12).$$

Expression for angle $\beta$ can be obtained from expressions (10), (11) and (12) by substituting $\alpha=0$, AB=h.

$$\beta = \arccos \frac{(R-D)^2 + hh_0 + h_0^2}{\sqrt{((R-D)^2 + (h+h_0)^2)((R-D)^2 + h_0^2)}}. \qquad (13)$$

Thus, the expression for AB has the form:

$$AB(\alpha) = \sqrt{2(R-D)^2 + (h+h_0)^2 + h_0^2 - 2\sqrt{((R-D)^2 + (h+h_0)^2)((R-D)^2 + h_0^2)}\cos(\alpha+\beta)}. \qquad (14)$$

It shall be noted that in case of tilting, the head backward expression (14) is no longer true, because there is no tension of the skin and soft tissues of the dorsal part of the neck. In this case it is appropriate to estimate distance BB0 as the difference between heights of points B and $B_0$:

$$\Delta h = r(\cos(\gamma_0 + \alpha) - \cos\gamma_0) \qquad (15).$$

As a result, movability of the cords is calculated from expression (14) by substituting $\alpha = \alpha_m$ (maximum tilt angle), and (15) by substituting $\alpha = -\alpha_m$:

$$\Delta S_c = AB(\alpha_m) - \sqrt{(R-D)^2 + h_0^2}(\cos(\gamma_0 - \alpha_m) - \cos\gamma_0) \qquad (16).$$

Apparently, $\alpha_m$ cannot exceed $\gamma_0$ due to the limit on deformation of the neck. To assess movability of the cords, we may assume $\alpha_m = \gamma_0$, then with regard to expression (14) we may obtain:

$$\Delta S_c = AB(\gamma_0) - \sqrt{(R-D)^2 + h_0^2}(1 - \cos\gamma_0) \qquad (17).$$

In case of headsets with a single node or with two side nodes rotation in the vertical plane affects the height of points C and D. Variation in the latter, $\Delta h_0$, can be determined if relative distance $r_0$ between axis CD and the axis of rotation, as well as angular position $\alpha_0$ of the axes are known (FIG. 6A):

$$\Delta h_0 = r_0(\cos\alpha_0 - \cos(\alpha_0 + \alpha)) \qquad (18).$$

As a result, variation in the distance or movability of cords for a headset having a single node can be obtained from expression (4) with $H-\Delta h_0$ set instead of h and $\varphi=\pi/2$. In this case, angle $\alpha$ varies in the range $-\alpha_m<\alpha<\alpha_m$, and the height varies in the range:

$$\Delta h_{01}=r_0(\cos\alpha_0-\cos(\alpha_0-\alpha_m))<\Delta h_0<r_0(\cos\alpha_0-\cos(\alpha_0+\alpha_m))=\Delta h_{02} \quad (19),$$

$$\Delta S_{c1}=\sqrt{(H-\Delta h_{01})^2+R^2\pi^2/4}-\sqrt{(H-\Delta h_{02})^2+R^2\pi^2/4} \quad (20).$$

FIG. 6B illustrates the case of a headset having two side nodes. Movability of the cords can be estimated through variation in heights of points C and D. Then, from expression (19) we may obtain movability of the cords in the following form:

$$\Delta S_{c1}=\Delta h_{02}-\Delta h_{01} \quad (21).$$

Like in the case of a headset having two nodes, estimates $\alpha_m=\gamma_0=\alpha_0$ are true. Then we may obtain the following estimate for movability of cords:

$$\Delta S_{c1}=\sqrt{(H+r_0(1-\cos\gamma_0))^2+R^2\pi^2/4}-\sqrt{(H-r_0(\cos\gamma_0-\cos 2\gamma_0))^2+R^2\pi^2/4} \quad (22)$$

$$\Delta S_{s2}=r_0(1-\cos 2\gamma_0) \quad (23)$$

Also consider behavior of the kinematic model when the head tilts sideway in the vertical plane.

When the head tilts sideway, the movement of the head can be represented as rotation of the upper part of a cylinder about axis s, which extends approximately through point O of intersection of axes t and c.

In the case of a headset having two nodes, such rotation is accompanied by a shift of point B, which can be estimated through the distance to axis of rotation $O_1B_0$ (FIG. 7B). As seen in FIG. 7B: $O_1B_0=h_0$. To determine the length of AB it is necessary to determine horizontal shift $\Delta s$ and vertical shift $\Delta h$ of point B, because $AB=\sqrt{(h+\Delta h)^2+\Delta s^2}$. In this case $\Delta h=h_0(1-\cos\alpha)$ and $\Delta s=h_0\sin\alpha$. Then movability of section AB when the head tilts sideway, will be changed to maximum angle $\alpha_m$:

$$\Delta S_s=\sqrt{(h+h_0(1-\cos\alpha_m))^2+h_0^2\sin^2\alpha_m}-h \quad (24)$$

Now let us consider the case of a headset having side nodes. In this case, variation in segments AC and BD can be accounted for by considering the shift of points C and D on arcs of circle from points $C_0$ and $D_0$. The length of AC in the case of the head tilt shown in FIG. 7B can be found as:

$$AC=AC_0+R_s\alpha=H+R_s\alpha \quad (25).$$

Here $R_s$ is the radius of rotation path about axis s, which can be found from triangle $COO_2$, where $OO_2$ can be found, given that the height of point O is $h+h_0$ (FIG. 5B), then $OO_2=H-h-h_0$, $CO_2=R$, therefore:

$$CO=R_s=\sqrt{(H-h-h_0)^2+R^2} \quad (26).$$

To determine BD, only variation in the height of point D, $\Delta H=R_s\sin\alpha$, should be taken into account because the cord in this area is loose:

$$BD=H-\Delta H=H-R_s\sin\alpha \quad (27).$$

Considering maximum deflection angle $\alpha_m=45°$, the following expression can be obtained for movability of cords:

$$\Delta S_{s2}=R_s\alpha_m+R_s\sin\alpha_m \quad (28).$$

Figure 8:
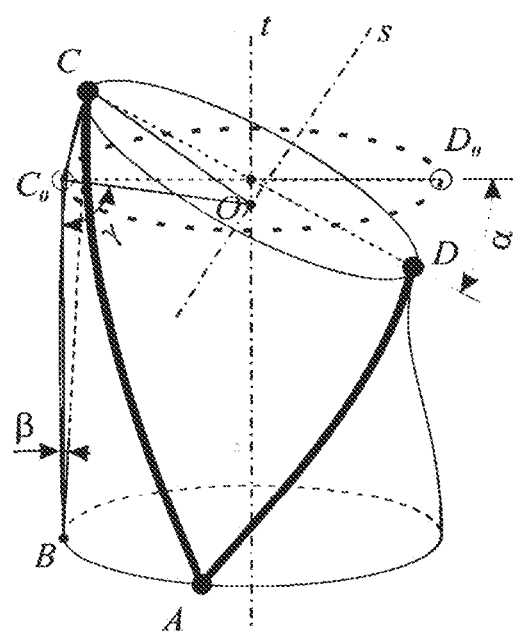
FIG. 8 illustrates a mathematical model of a head tilted sideways where a headset has a single node.

Now we will consider the case of a headset having a single node (FIG. 8). In this case, the calculation is more complicated and requires special treatment for the length of geodesic line AC. In this task the surface of the neck can be described as a surface of an inclined cylinder. To do this, let us find the angle of inclination of the cylinder surface, $\beta$. From triangles $BCC_0$ and $OCC_0$ we may find $C_0=2R_s\sin(\alpha/2)$:

$$BC=\sqrt{H^2+4R_s^2\sin^2(\alpha/2)-4HR_s\sin(\alpha/2)\sin(\alpha/2-\gamma)} \quad (29).$$

From triangle $BCC_0$ we may obtain:

$$BC/\sin(\pi/2-\alpha/2+\gamma)=2R_s\sin(\alpha/2)/\sin\beta$$

so we may obtain:

$$\beta=\arcsin(2R_s\sin(\alpha/2)\cos(\alpha/2-\gamma)/BC) \quad (30).$$

Here $$\gamma=\arctan(R/(H-h-h_0)) \quad (31).$$

Therefore, $$AC=\sqrt{(BC(1-\sin\beta))^2+\pi^2R^2\cos^2\beta/4} \quad (32).$$

Figure 9:
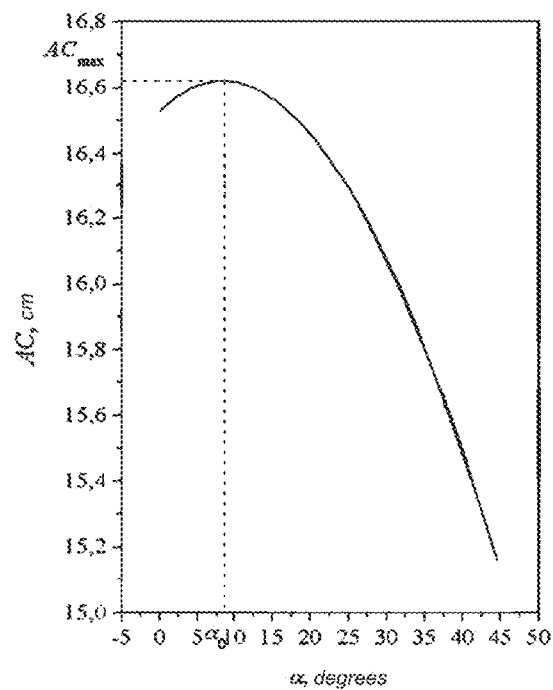
FIG. 9 shows dependence of the length of geodesic line AC on the head tilt angle $\alpha$.

It should be noted that, taking into account the dependence of BC and $\beta$ on angle $\alpha$ from equations (29) and (30), we can expect a non-monotonic dependence of the line length $AC(\alpha)$. FIG. 9 shows this dependence for parameters listed in Table 1. It can be seen that AC reaches maximum $AC_{max}=16.6$ cm at angle $\alpha_0=8.6°$.

Now let us find the length of AD as this line describes the minimum length of the cord. In this case we may consider that the height of the cylinder has changed to $\Delta H=R_s\sin\alpha$, then using the expression (27) we may obtain:

$$AD=\sqrt{(H-R_s\sin\alpha)^2+\pi^2R^2/4} \quad (33).$$

As a result, movability of cords $\Delta S_{s1}$ is determined as the difference of the lengths of lines $AC_{max}$ and AD at the maximum angle of inclination, $\alpha_m$:

$$\Delta S_{s1}=AC_{max}-\sqrt{(H-R\sin\alpha_m)^2+\pi^2R^2/4} \quad (34).$$

Table 1 shows the comparison of cord movability for various types of headsets. As seen in the table, a headset having two nodes, that is a headset, in which two earphone cords are connected to the neck loop through a dorsal cord connection node in close proximity to each other and have an additional point of fixation to each other, a suboccipital node; the cords have the lowest movability as compared with conventional headsets. This advantage applies to all kinds of movements of the head. Comfortable wear of the headset is determined by the maximum possible movability of cords, respectively, the difference between the minimum and maximum possible length of a loose cord, arising at different positions of the head. In a headset having two nodes, the maximum length is determined by maximum distance AB between the nodes, that is, the length AB defined in expression (14). In a headset having a single node, the maximum length of the cord is achieved when the head rotates to 90°:

$$L_{max\,1}=\sqrt{H^2+R^2\pi^2} \quad (35).$$

For a headset having two side nodes we may obtain the maximum length when the head tilts sideway:

$$L_{max\,2}=H+R_s\alpha_m \quad (36).$$

Table 1 contains numerical estimates, from which it follows that the headset having two nodes has a minimum length of a maximum extended, but slack portion of cord. It should also be noted that the estimates obtained for a headset having two side nodes have been deliberately reduced because cords passing from points A and B to the transceiver are not taken into account, and account of them would significantly increase $L_{max2}$.

Figure 10:
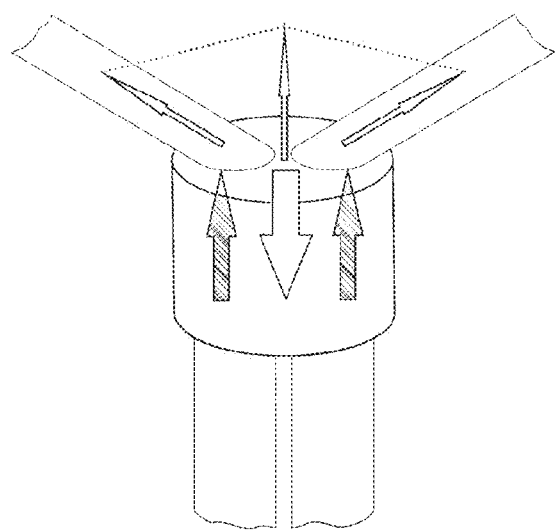
FIG. 10 is a vector diagram of forces.

Therefore, the availability of two optimally positioned nodes A and B contributes not only to reduction in slacking of the cords, but also provides tension of the cords extending from node B to earphones. Since these cords lie on the curved surface of the neck, the tension creates a pressure on the skin (FIG. 10). As a result of this pressure there arises a friction force of the cord against the skin and a pressure force of the suboccipital cord connection node, node B, against soft tissues, while the difference of vectors of these forces leads to fixation of the cords on the scalp and further secures earphones in the auricle. Thus, the securing force is concentrated not only on the auricles, and not only by fixing the earphones in the external auditory canal, but it is uniformly distributed over the entire length of the cord, which greatly facilitates wearing of the earphones. Node B, i.e., suboccipital cord connection node, is held in a stable position owing to the uniform distribution of various forces that arise in the occipital region at the specified arrangement geometry of the cords and their mutual coupling, taking into account human anatomical features.

FIG. 10 shows a vector diagram of projections of the forces acting on the suboccipital cord connection node, node B. Node B is fixed through tension of the cords. Thin arrows indicate tensile forces of the cords, the total of which creates pressure on the skin. As a result, node B undergoes a force of reaction of the skin and surrounding tissues, indicated by wide hollow arrow, that seeks to move the node down, and the arising forces of friction against the cord, marked with wide solid arrow, fix the position of node B. In this model, the tension of cords below the node was neglected, as its length has been chosen for optimal and the cord is loose, and it has an excess length of about 9.8 cm to ensure movability of the cords in movements of the head and neck.

Table 1 summarizes results of comparison of cord movability and maximum cord length in headsets with different geometries.

The technical effect provided by the invention includes the ability of reducing the length of the movable portion of the cords between the earphone and the neck loop, and the adherence of the stationary portion of the cord to the surface of the user's body and fixation of the stationary portion by tension, to substantially eliminate slack of the cords connecting the earphones with the neck loop, which in turn, prevents breakage of cords or earphones, and provides an additional opportunity for constant wear of the headset by the user in the operational position or with the earphones taken off, because the cords do not impair the aesthetic appearance of the user when the earphones are worn in the operational or non-operational position. Furthermore, a mechanism for full or partial winding up the earphone cords when not in use can be arranged on the headset more easily.

Figure 11A:
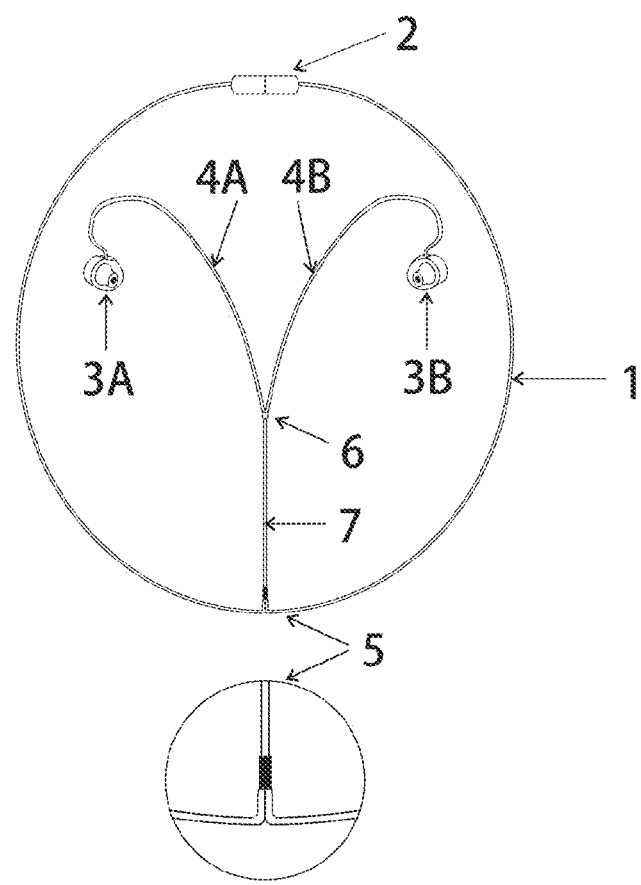
FIG. 11A is a general view of a wearable device according to the invention, with an O-shaped loop in closed position, showing main functional components.

A headset for a mobile electronic device (FIG. 1B, FIGS. 11A, 11B) comprises a neck loop 1 with at least one electrical connector 2 attached to it; two in-ear earphones 3A, 3B; two cords 4A, 4B, each connected at one end to one of the earphones, and at the other end to the electrical connector, and these two cords are connected mechanically to the neck loop 1 so that the points of connection of the cords to the neck loop are in close proximity to each other and form a dorsal cord connection node 5. They are additionally mechanically connected to each other at a location on portions between the earphones and the dorsal cord connection node 5 to form a suboccipital cord connection node 6 at the point of connection thereof.

When the headset is worn in the operational position, the dorsal cord connection node 5 and the suboccipital cord connection node 6 are to be positioned on the dorsal surface of the neck, and cords 4 on the portions between the earphones 3 are to be positioned above the auricle and placed on the head surface in tensioned state.

When the headset is worn in the operational position, the dorsal cord connection node 5 is positioned at the level of the seventh cervical vertebra, the suboccipital cord connection node 6 is positioned at the level of the external occipital protuberance, and portion 7 of the cords between the dorsal

TABLE 1

Comparison of movability and maximum length of cord in headsets with various geometry

| | Movement | | | | | |
|---|---|---|---|---|---|---|
| | Rotation of head in horizontal plane | | Tilt of head forward/backward | | Tilt of head sideway | |
| Headset type | Expression | Estimate at parameters | Expression | Estimate at parameters | Expression | Estimate at parameters |
| Headset with two nodes | (6) | R = 6.5 cm, h = 6 cm, D = 1 cm, $\alpha = 90° = 1.6$ rad $\Delta S_t = 2.9$ cm | (12) | R = 6.5 cm, $h_0 = 2$ cm, D = 1 cm $\Delta S_c = 8.6$ cm $L_{max} = 9.8$ cm (see expression (14)) | (24) | R = 6.5 cm, h = 6 cm, $h_0 = 2$ cm $\alpha_m = 45° = 0.8$ rad $\Delta S_s = 0.6$ cm |
| Headset with a single node | (7) | R = 6.5 cm, H = 13 cm $\Delta S_{t1} = 12.5$ cm | (18) | $r_0 = 3$ cm, $\gamma_0 = 45°$ $\Delta S_{c1} = 2.2$ cm $L_{max\ 1} = \sqrt{H^2 + R^2\pi^2} = 25.5$ cm | (34) | R = 6.5 cm, h = 6 cm $h_0 = 2$ cm $\alpha_m = 45° = 0.8$ rad $\Delta S_{s1} = 3.4$ cm |
| Headset with two side nodes | (8) | R = 7 cm, H = 13 cm $\Delta S_{t2} = 5.2$ cm | (19) | $r_0 = 3$ cm, $\gamma_0 = 45°$ $\Delta S_{c2} = 3$ cm $L_{max\ 2} = H + R_s\alpha_m = 19.4$ cm | (28) | R = 6.5 cm, h = 6 cm $h_0 = 2$ cm $\alpha_m = 45° = 0.8$ rad $\Delta S_{s2} = 11$ cm | and suboccipital cord connection nodes has a length defined by the maximum distance between the first and seventh cervical vertebrae of the user, measured on the dorsal surface of the neck when the head is rotated sideway and tilted down at the same time. This length is in the range from 5 cm to 13 cm.

Figure 12:
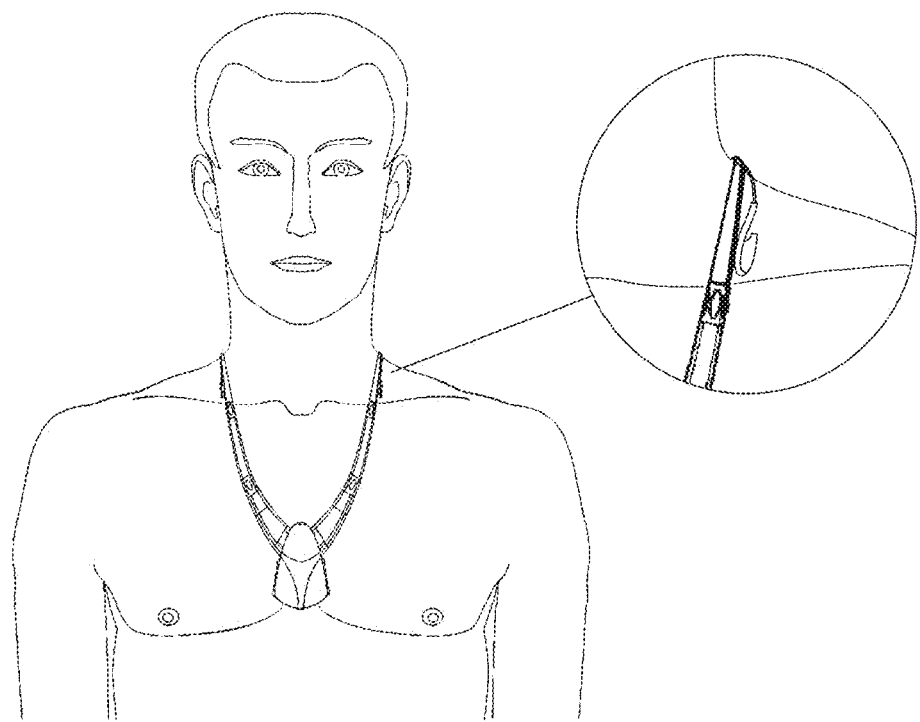
FIG. 12 and FIG. 13 show various embodiments of a wearable device according to the invention, in the operational and non-operational position of the earphones.
Figure 13:
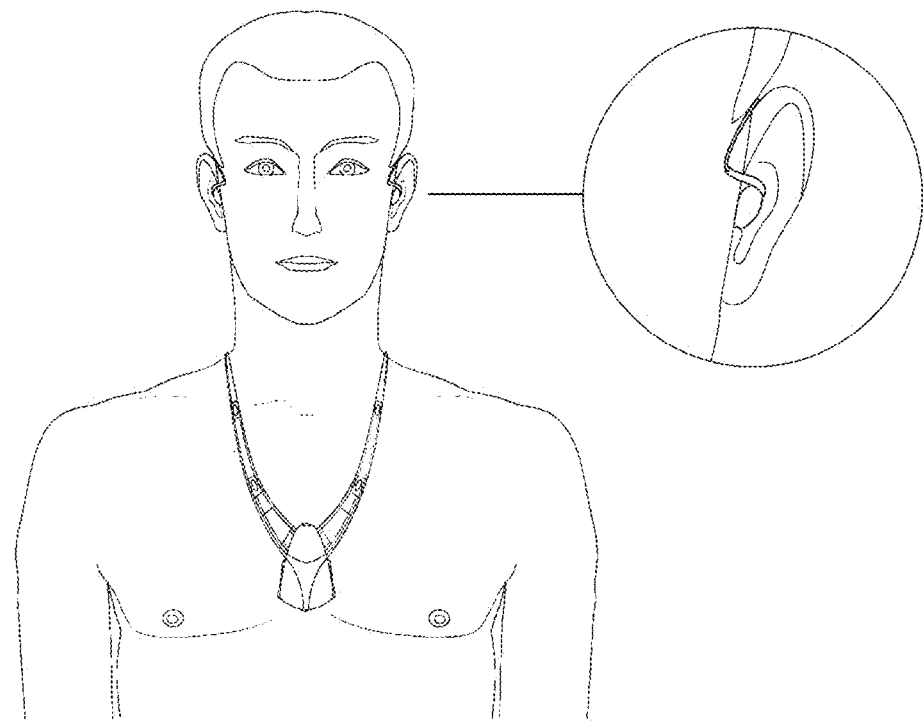

FIG. 12 and FIG. 13 illustrate options of wearing different embodiments of headsets.

Figure 14A:
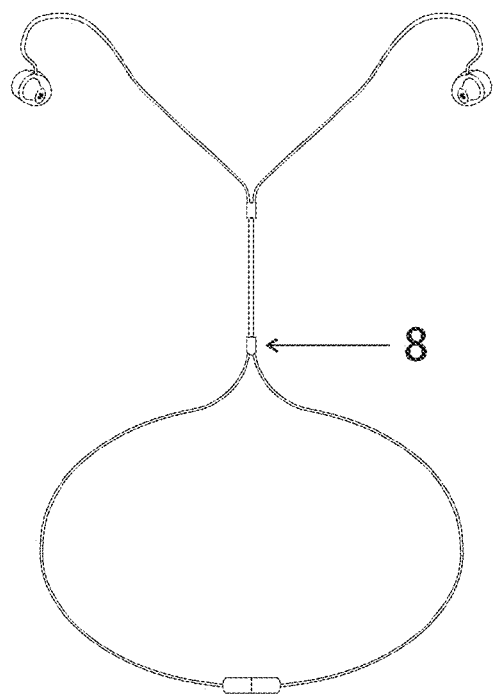
FIG. 14A and FIG. 14B show an embodiment of a headset according to the invention, having a suboccipital node in the form of a clip.
Figure 14B:
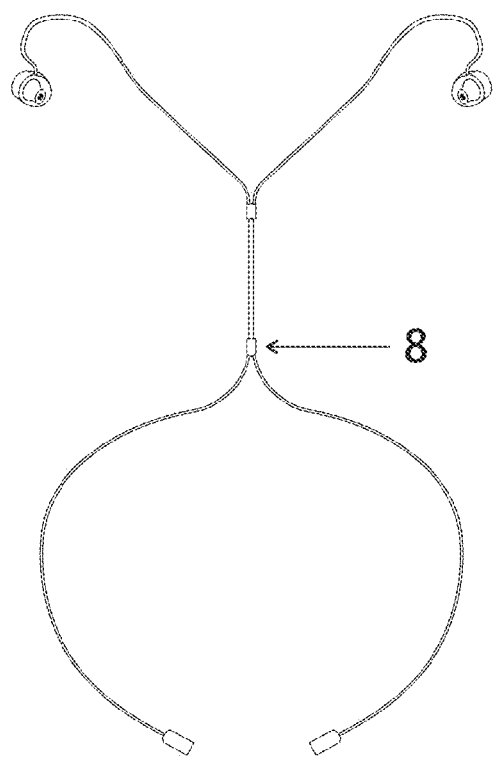

In various embodiments (FIGS. 14A, 14B) the suboccipital cord connection node may be a clip 8, and the length of the cords can be adjusted by moving the clip along the cords. Also the suboccipital node may comprise an electrical connector to disconnect the cords.

Figure 15A:
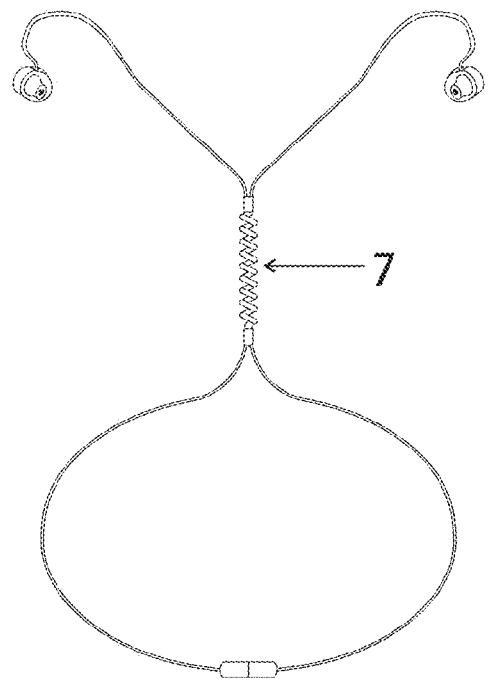
FIG. 15A, FIG. 15B and FIG. 16 show embodiments of a wearable device according to the invention, wherein the cord portion between the suboccipital and dorsal cord connections nodes is provided in the form of a helical cord.
Figure 15B:
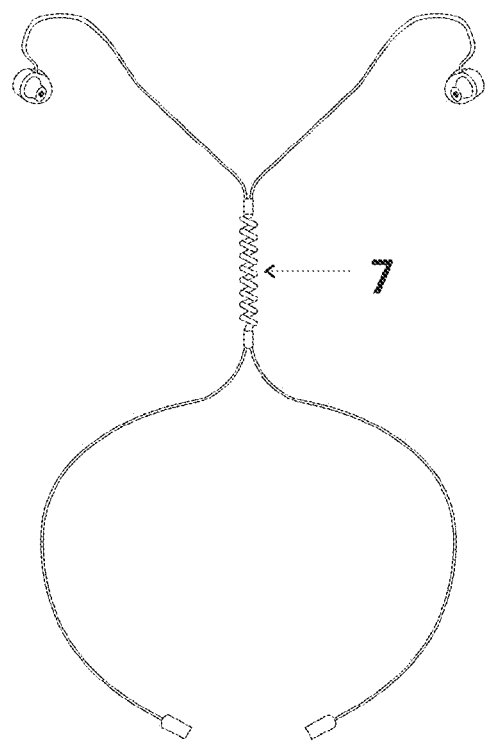
Figure 16:
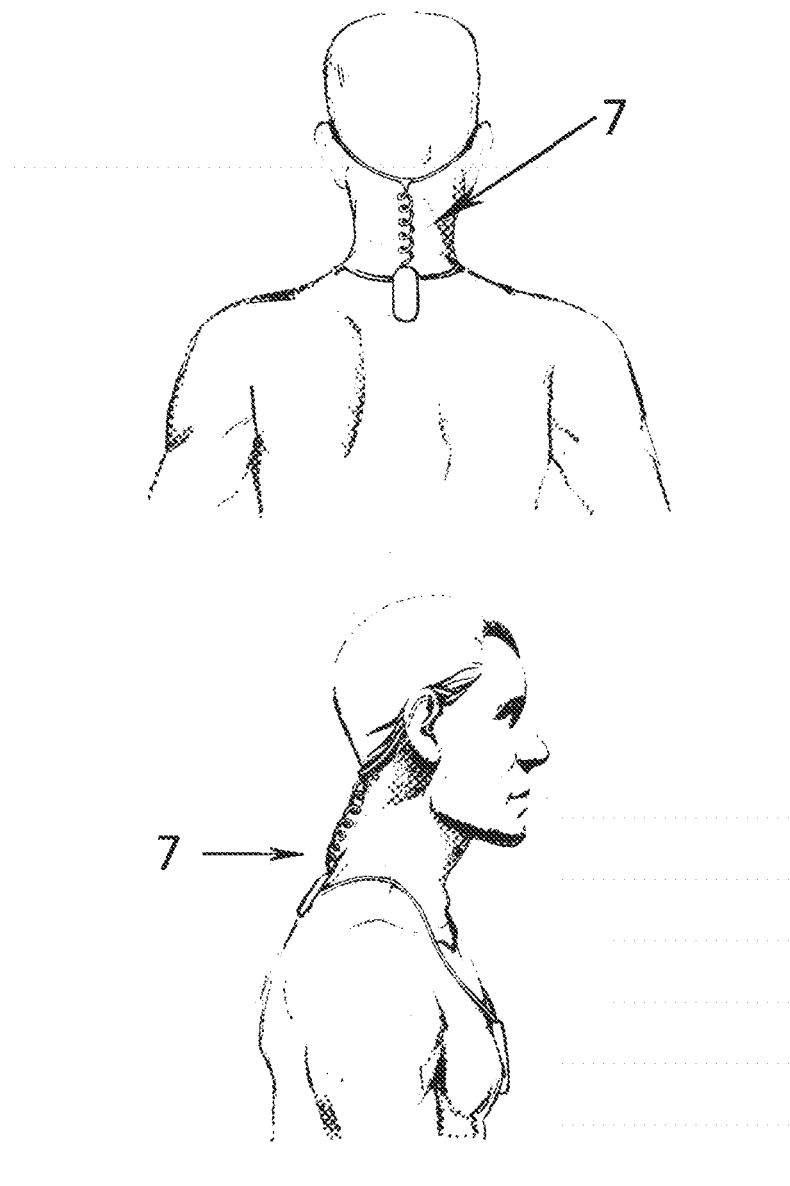
Figure 17:
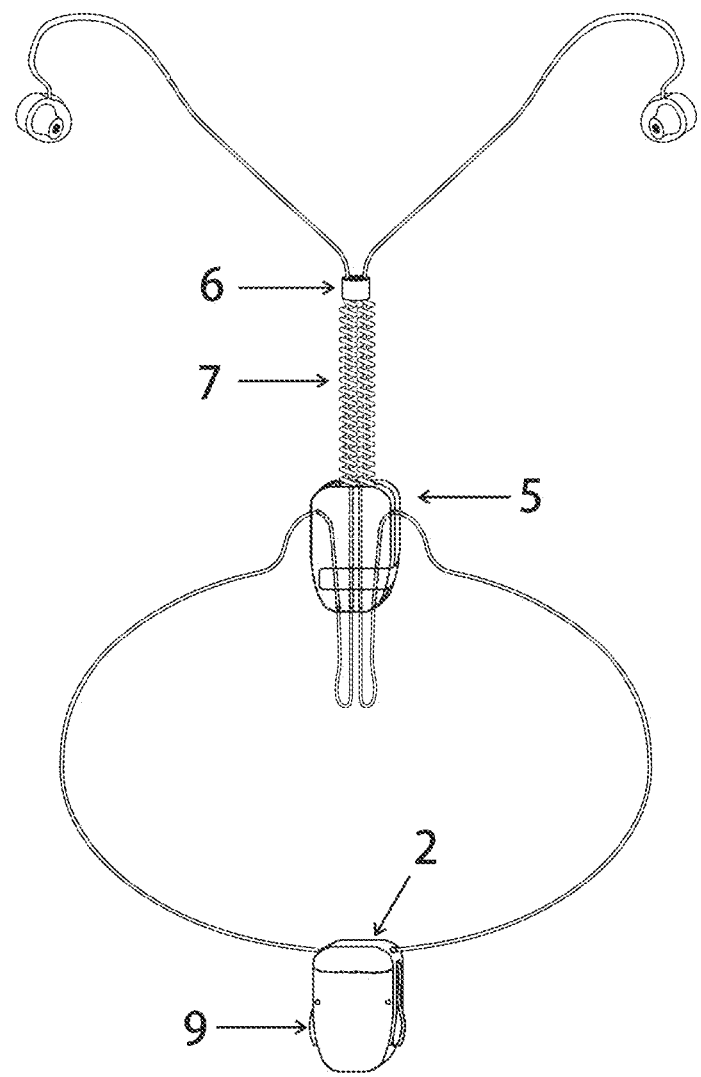
FIG. 17, FIG. 18 and FIG. 19 show embodiments of a headset according to the invention, where the cord portions between the suboccipital and dorsal cord connection nodes are provided in the form of springs.
Figure 18:
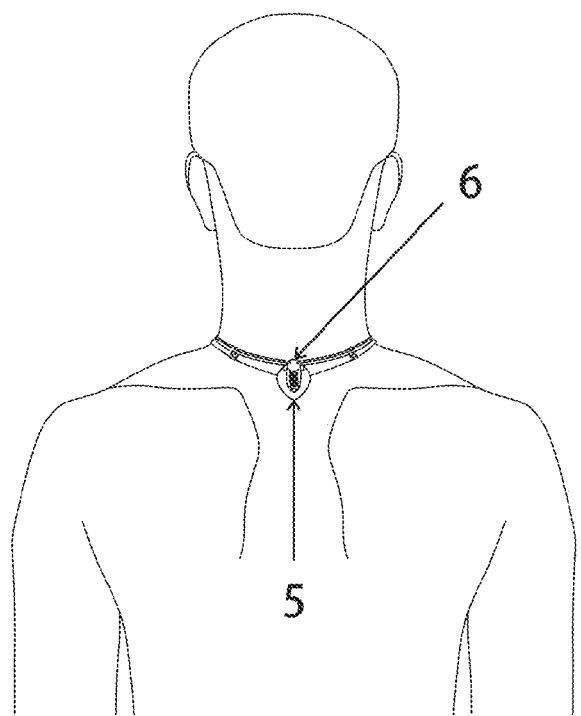
Figure 19:
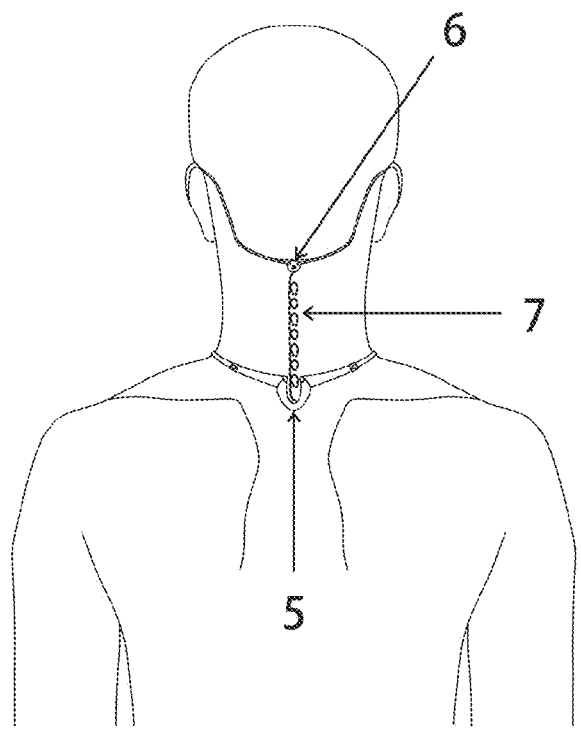

At least one cord of the portion 7 between the suboccipital and dorsal nodes can be configured as a helical spring. In the embodiments shown in FIGS. 15A, 15B, 16, the cord portion 7 between the suboccipital and dorsal cord connection nodes is configured in the form of a helical cord and acts as a tension spring. Various embodiments of a headset having a cord portion between the suboccipital and dorsal nodes in the form of springs are shown in FIGS. 17, 18, 19.

The cords may be formed not only in the form of a helical spring, but also in the form of a flat S-shaped spring, which may be more expedient in some cases, as this allows avoiding distortion of the spring and provides precisely adjacent position of the suboccipital node in relation to the device when the earphone is in the non-operational position.

Figure 20:
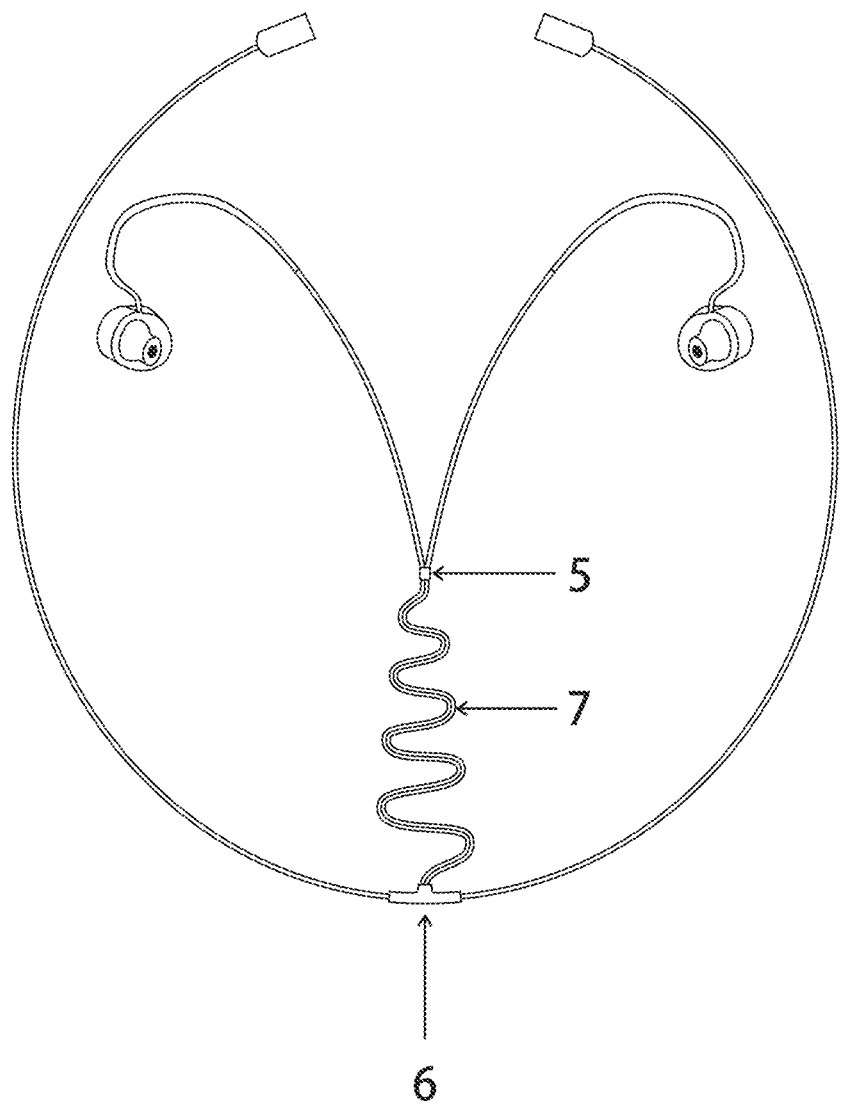
FIG. 20 shows an embodiment of a headset according to the invention, where the integral cord portion between the suboccipital and dorsal cord connection nodes is provided in the form of an S-shaped spring.

An embodiment of the headset using an S-shaped spring is shown in FIG. 20.

Figure 21:
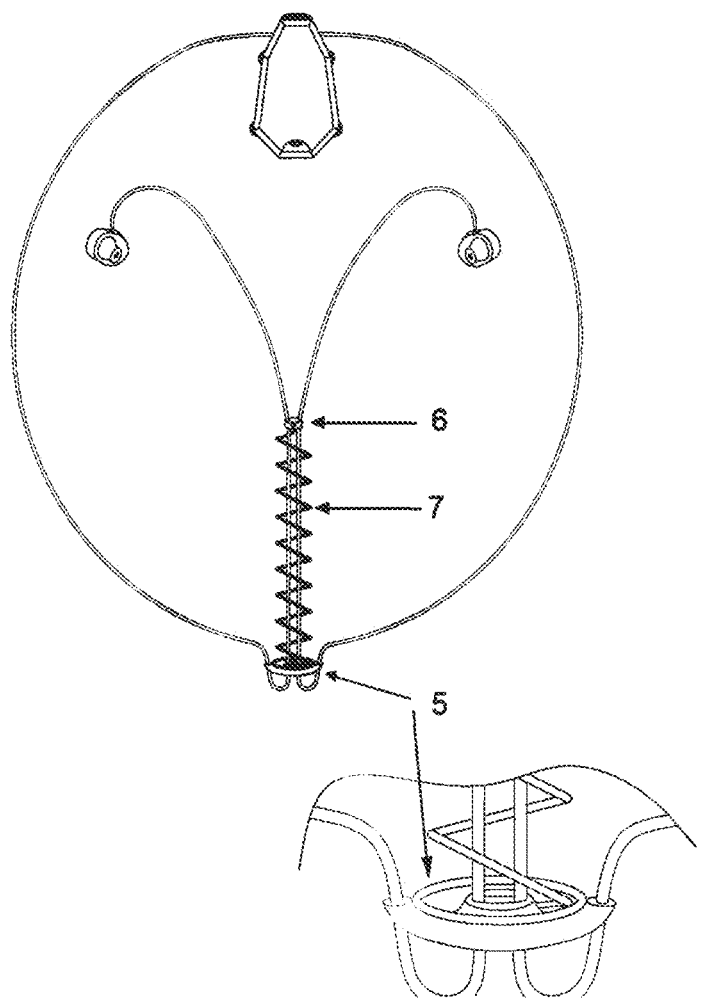
FIG. 21 shows an embodiment of a headset according to the invention, where the cord portions between the suboccipital and dorsal nodes are equipped with an external spring.
Figure 22:
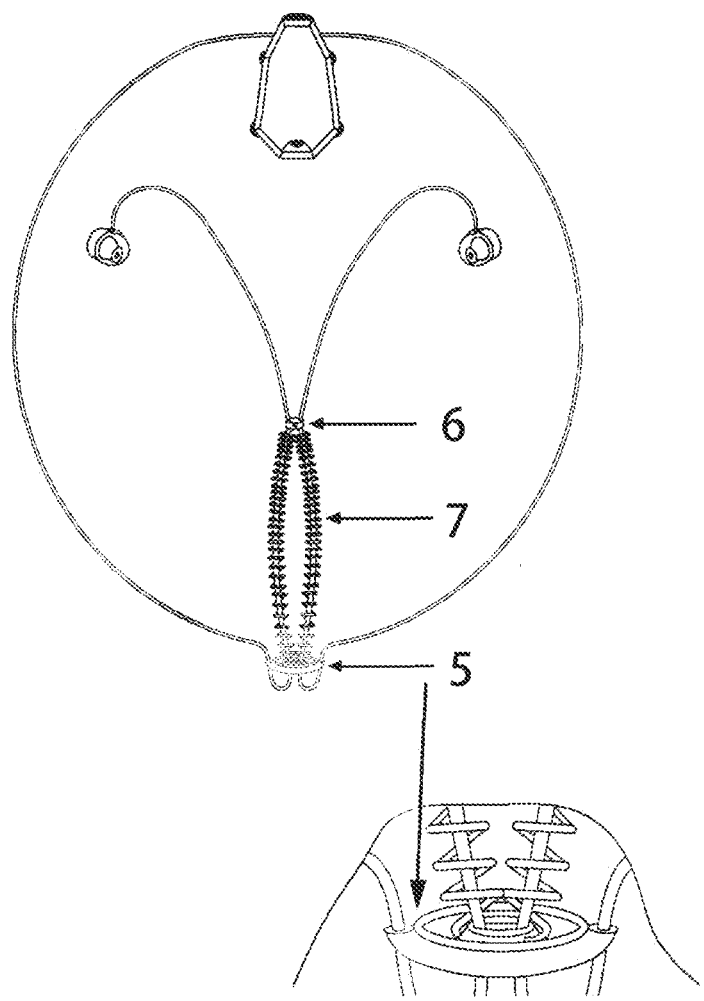
FIG. 22 shows an embodiment of a headset according to the invention, where the cord portions between the suboccipital and dorsal nodes are separately equipped with external springs.
Figure 23A:
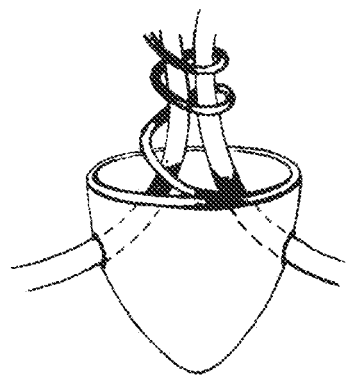
FIG. 23A and FIG. 23B show embodiments of a dorsal cord connection node according to the invention.
Figure 23B:
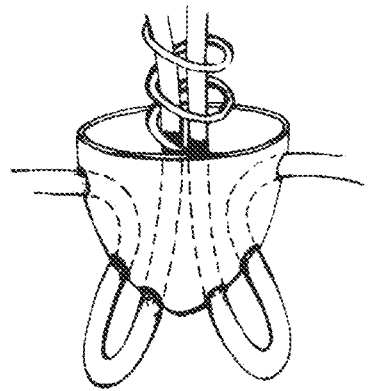

In some embodiments, the headset includes a spring inserted between the suboccipital 6 and dorsal 5 cord connection nodes (FIG. 21, FIG. 22). FIG. 23A and FIG. 23B show embodiments of the dorsal node 5.

Figure 24A:
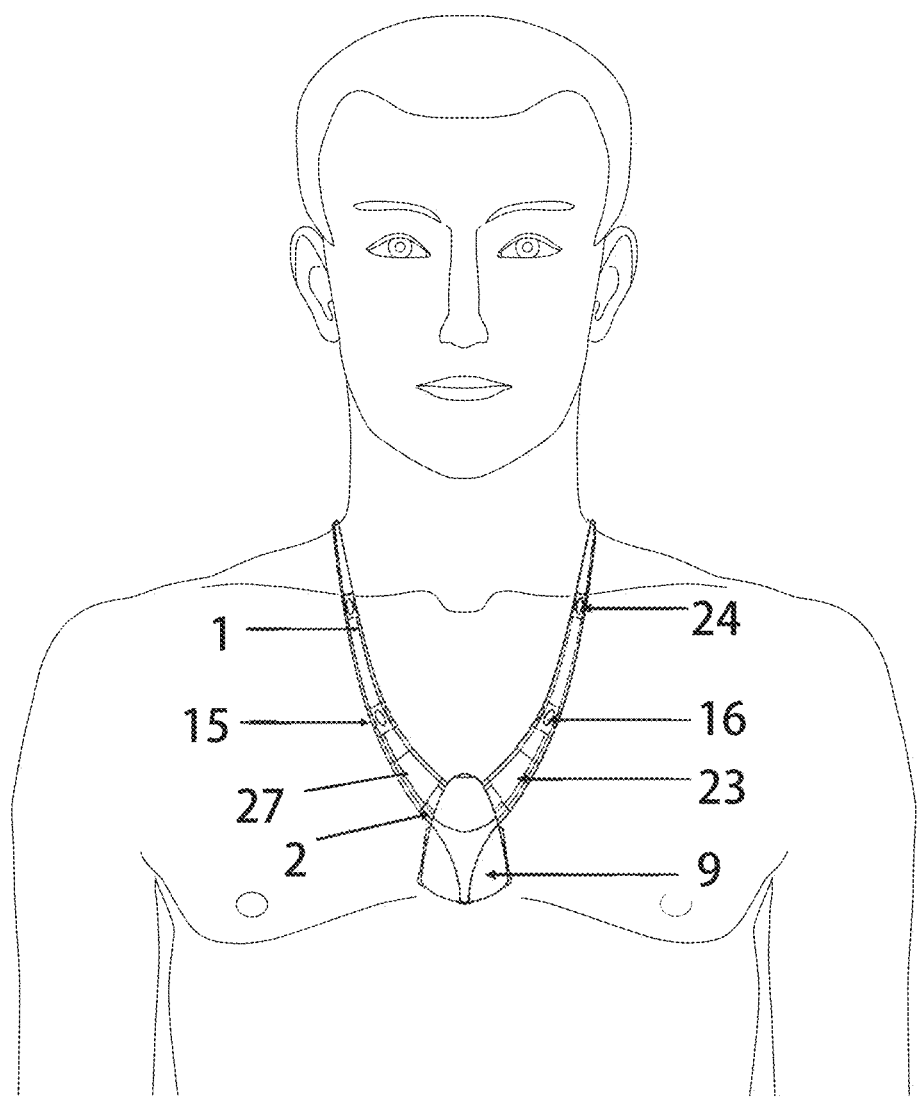
FIG. 24A and FIG. 24B show embodiments of a headset comprising an electronic unit, according to the invention.
Figure 24B:
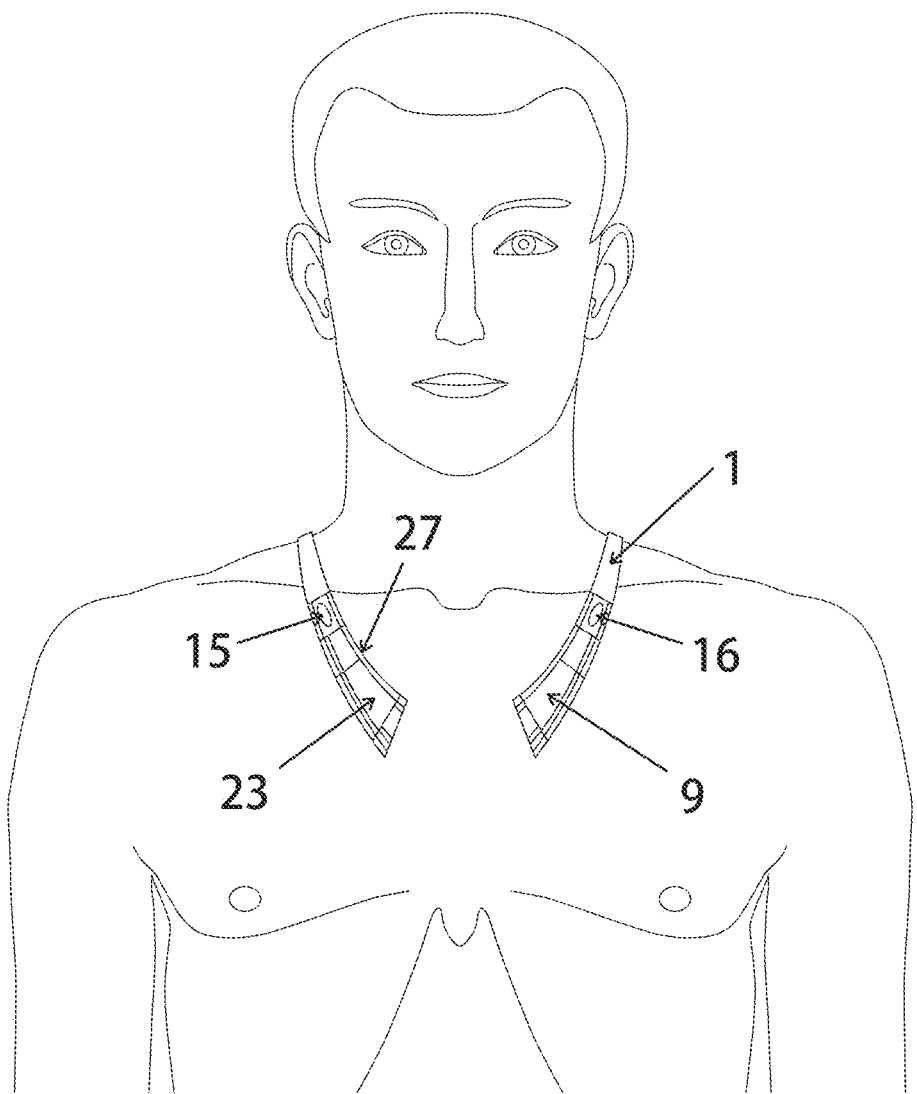
Figure 25:
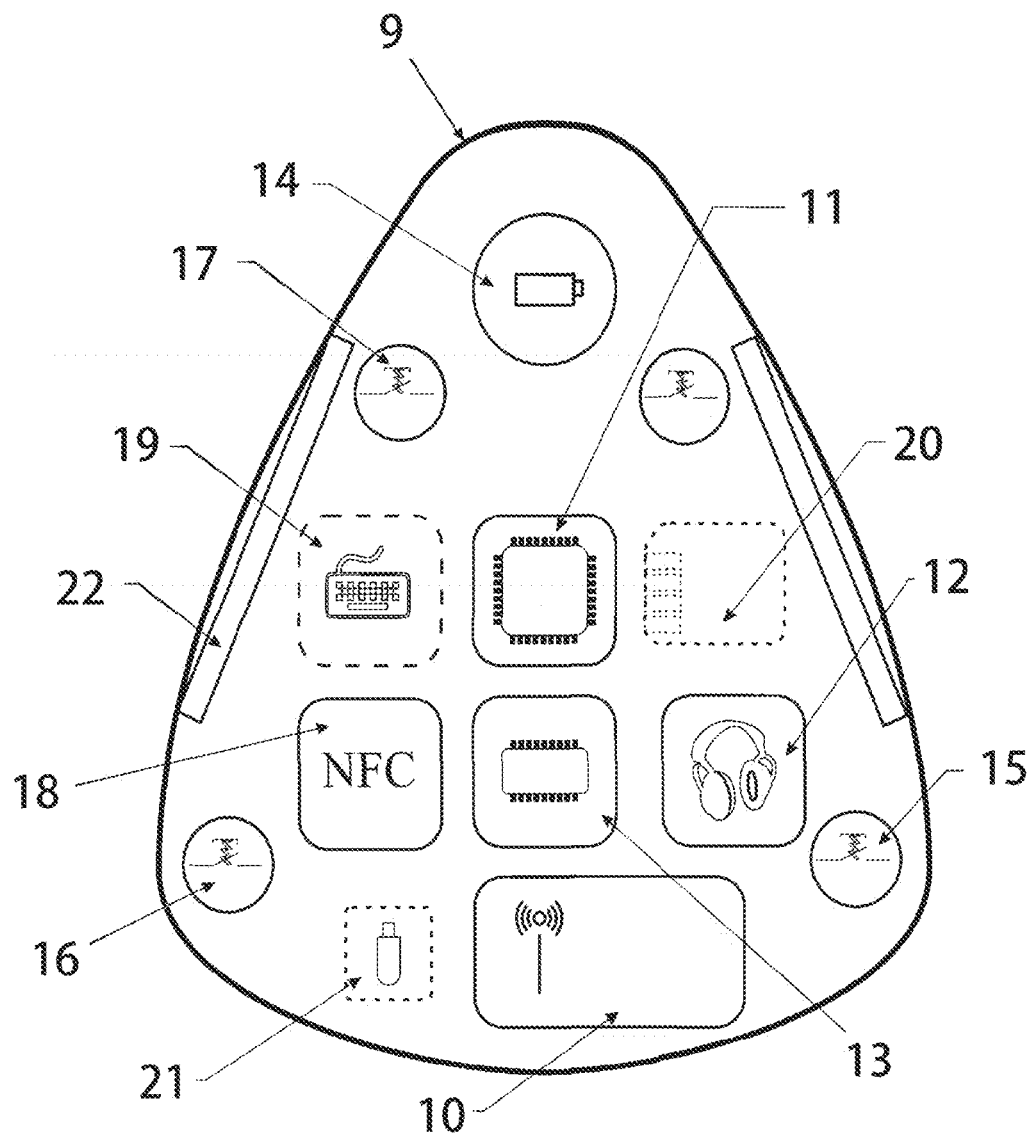
FIG. 25 shows an example of electronic components incorporated into the electronic unit, according to the invention.

In preferred embodiments (FIG. 24A, FIG. 24B), a headset comprises at least one electronic unit 9 mechanically and electrically connected to an electrical connector 2; for instance, the electronic unit can be configured as a medallion. In the embodiment of an open loop necklace (FIG. 24B), the electronic unit 9 can be placed on the chest at one side of a necklace. The electronic unit 9 may comprise a signal transceiver, such as Bluetooth, to receive signal from a cell phone; there may further be a battery, a player, a radio, an (USB flash drive, an electronic key, a satellite signal receiver such as GPS and/or GLONASS receiver able to tell coordinates through voice information transmitted directly to the user's earphones. FIG. 25 shows possible electronic components incorporated into the electronic unit 9. The electronic unit 9 communicates with a mobile phone, a satellite navigation system, a computer or a mobile station via a radio communications module 10. A signal processor 11 processes audio signals, and controls and manages data streams. Digital-to-analog conversion and amplification of a signal, and volume control are performed by a codec or an audio module 12. A memory module 13 stores control software, hardware setting profiles and user's information. A power source, such as a battery 14 incorporated in the electronic unit 9 and/or disposed on the neck loop provides operation of microcircuit chips. The electronic unit 9 may include control buttons, such as 15, 16. A short-range Near Field Connection module 18 can be used for data exchange and quick coupling with a mobile electronic device.

In various embodiments of a headset the electronic unit 9 accommodates the following accessories: an extra controller 19 for processing signals from control buttons; a slot 20 with a connector to connect an external flash memory, a (USB connector 21 for data transfer or charging the battery. Connectors 22 are used to connect earphones, external microphones, and additional control buttons.

In various embodiments (FIGS. 24A, 24B), control means in the form of buttons 15, 16 can be disposed on the neck loop 1.

In various embodiments of the headset, control buttons and keys (FIGS. 24A, 24B) are disposed both on the housing of the electronic unit 9 and the neck loop.

Buttons of the neck loop are disposed on separate boards, protected from accidental pressure and connected to the electronic unit 9 via a separate cord.

Furthermore, pressure can be made at once on two opposite buttons with two fingers, thumb and forefinger, simultaneously on both sides of the neck loop relative to the electronic unit or the rigid member disposing on the neck loop. This eliminates accidental pressure by a vehicle safety belt, a bag strap, etc. Such an arrangement of buttons provides for maximum accessibility to them, even when wearing a tie, suit or coat.

A call answering button may be positioned on one of the earphones.

Figure 26:
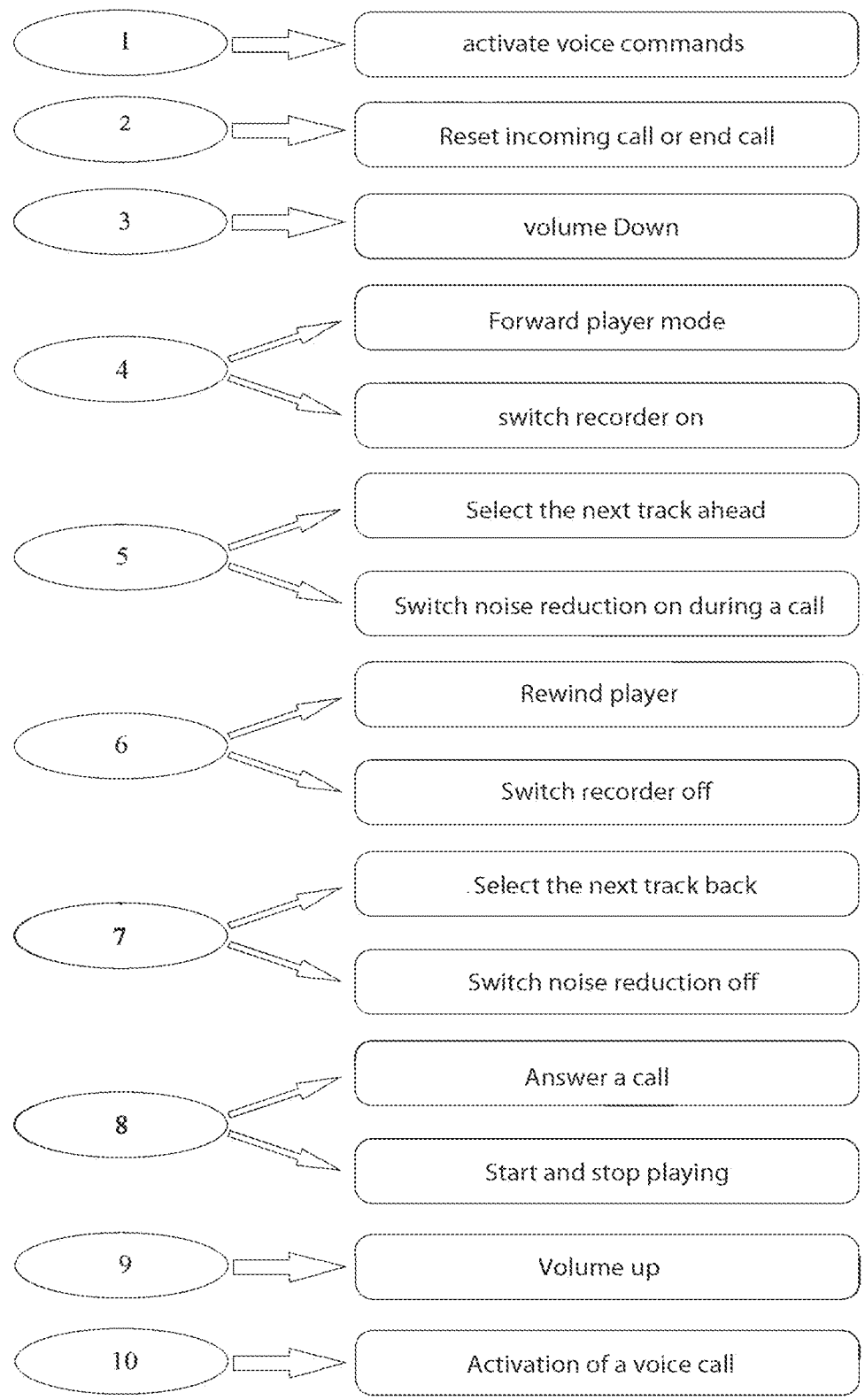
FIGS. 26 and 27 show implementation of button control functions in an embodiment of a headset according to the invention.
Figure 27:
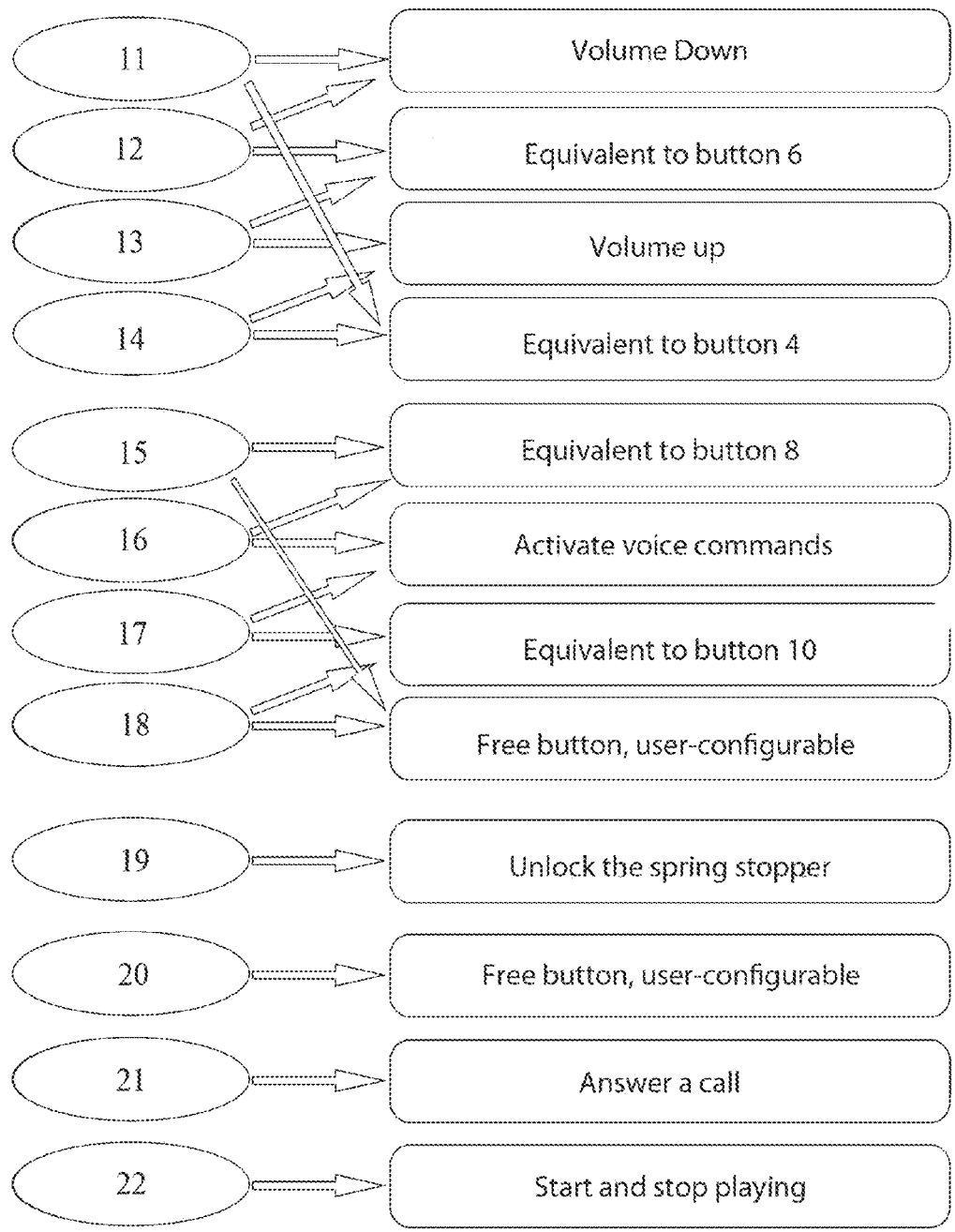

FIG. 26, FIG. 27 show a maximum possible allocation of key functions. An electronic voice device may be used for announcement of settings that have been made.

Figure 28A:
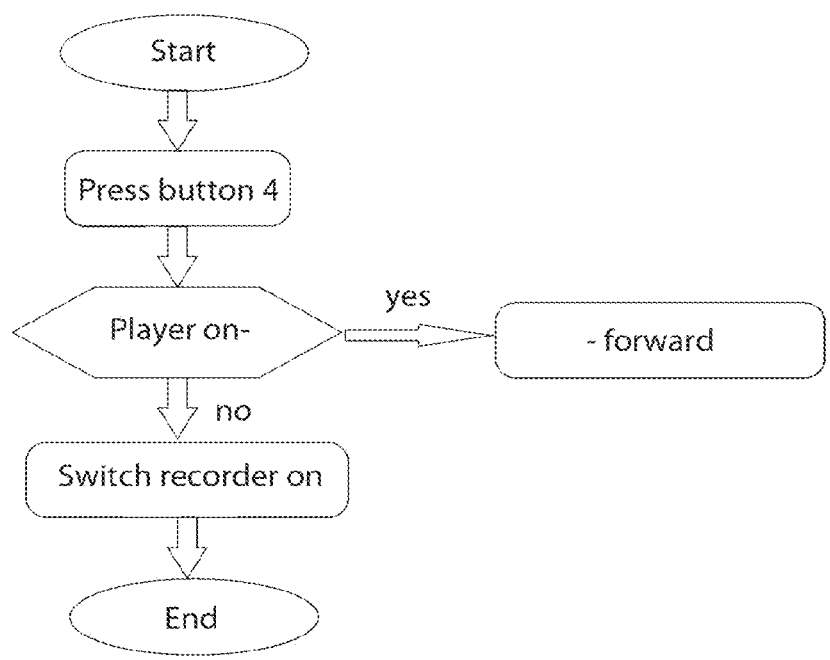
FIG. 28A and FIG. 28B show exemplary algorithms according to the invention, executed when buttons are pressed.
Figure 28B:
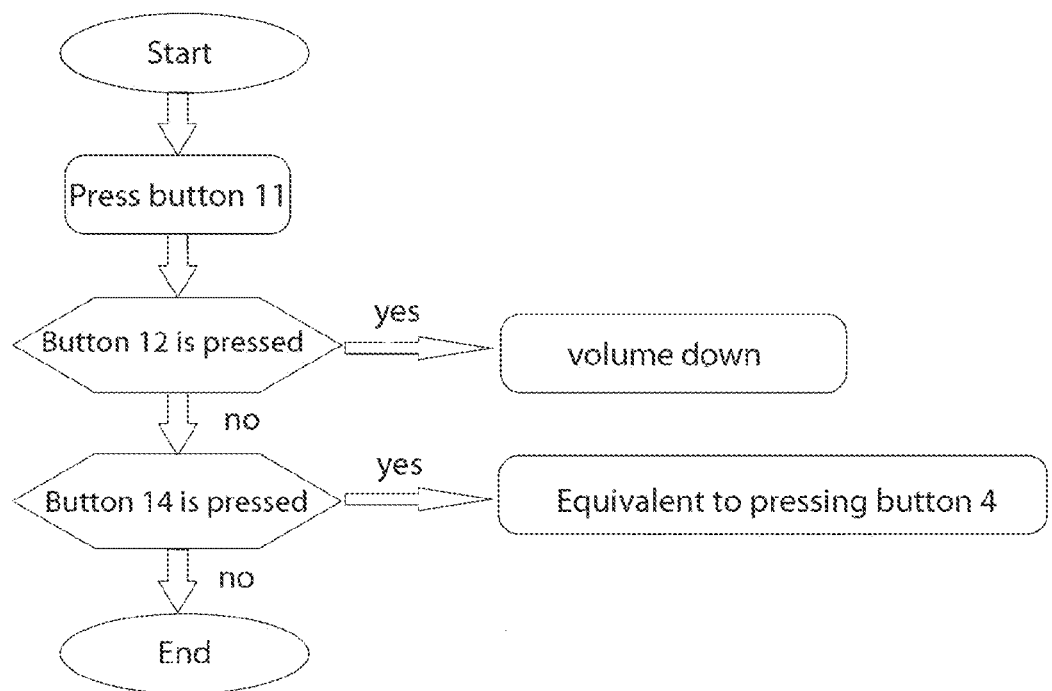

FIG. 28A, FIG. 28B show examples of algorithms implemented when buttons are pressed. Arrows point to the functions carried out at pressing the buttons. A button divided into two parts means a dual button.

In one embodiment, a call answering button may be positioned in one of the earphones. When a call is received the user either puts on the taken-off earphone simultaneously pressing the button, or simply adjusts the earphone to provide its better position in the auricle and simultaneously presses the button to answer the call. To avoid accidental pressure on the button in other cases, the button is operated only at incoming call and does not have any other functions at other times: during a telephone conversation, while listening to the music or in the standby mode.

Herein, control means of the claimed device are mainly described as buttons or keys in examples and embodiments. However, other types of control means may be used depending on the functions controlled by these control means. In particular, buttons or keys may be used in order to turn on and off some functions of the device (answer a call, decline a call, play, pause, next track, previous track, etc.); scrolling wheels or sliders may be used in order to adjust some parameters in a continuous range (volume up and down, degree of noise suppression, etc.); pressure sensors (e.g. those of resistive, capacitive, ferroelectric or piezoelectric type, etc.) may be used instead of mechanical buttons or keys; gestures together with gesture recognition can be used; pushbuttons may be integrated with scrolling wheels or sliders so providing combined control. In any way, the control means are configured in such a way that at least part of them may be easily activated through clothes of the user (mainly by pressing), providing fast and simple managing the device.

In an embodiment of the headset (FIGS. 24A, 24B), a power source 23 and a microphone 24 can be disposed on a neck loop 1. The power source (e.g., batteries) may be distributed over different parts of the headset: in the electronic unit 9, a round flat battery may be positioned along with the main hardware lying on the body, mostly in the upper abdomen, where the diameter of the battery may be about 30 mm and thickness about 5 mm, attached below to the electronic unit via a flexible spring cord; when the headset is worn by the user, the movability of the battery is restricted by a single plane being perpendicular to the plane of the battery itself.

In some embodiments, the headset can be free of cords transmitting signal to the earphone and have a power cord only; a cordless module can be disposed in each earphone to receive and transmit electromagnetic signal for the earphone.

Figure 29:
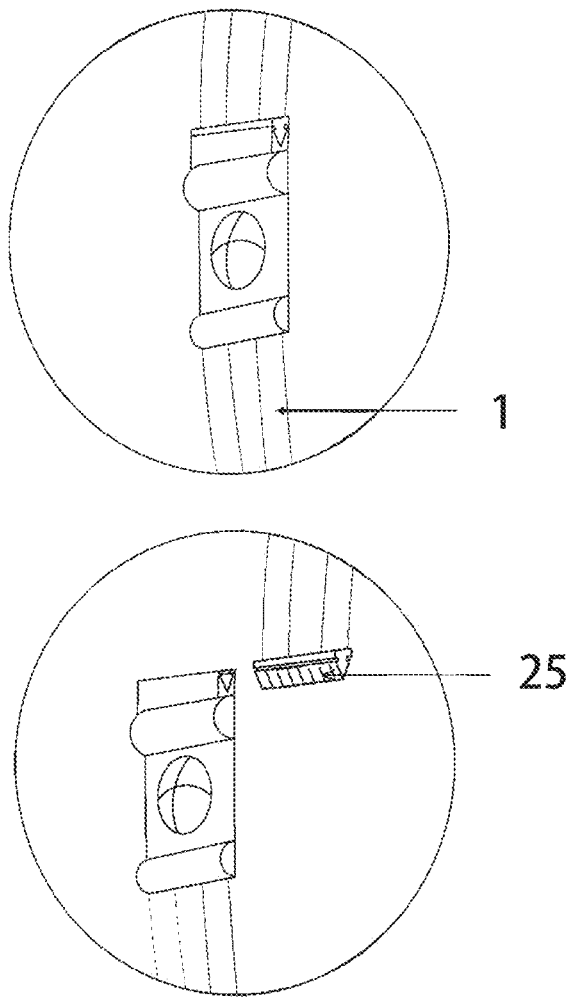
FIG. 29 shows an embodiment of a neck loop connector according to the invention.

A neck loop 1 (FIG. 29) may have at least two slots 25 for connecting additional sections of the neck loop.

Figure 30:
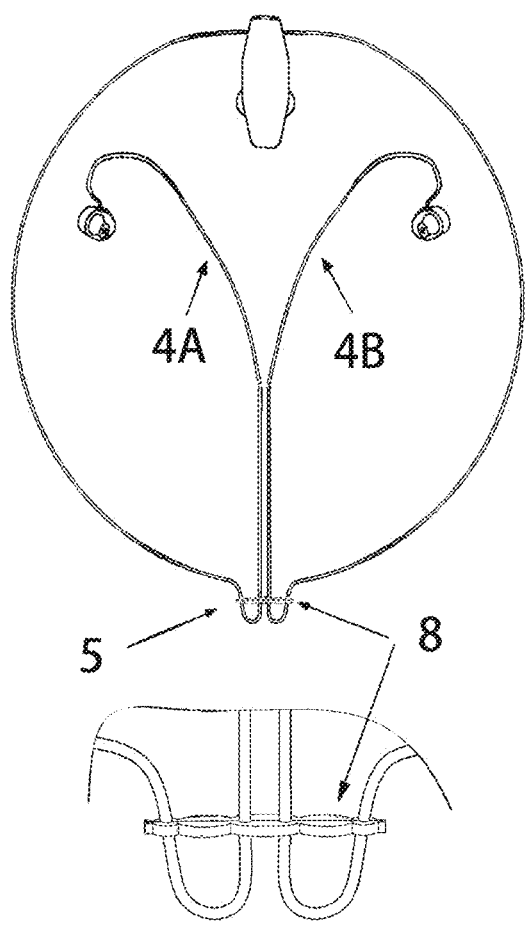
FIG. 30 shows an embodiment of a headset according to the invention, where the cords are connected by a clip.

FIG. 30 shows an embodiment of a wearable device, wherein wires are connected with a clip 8.

Figure 31:
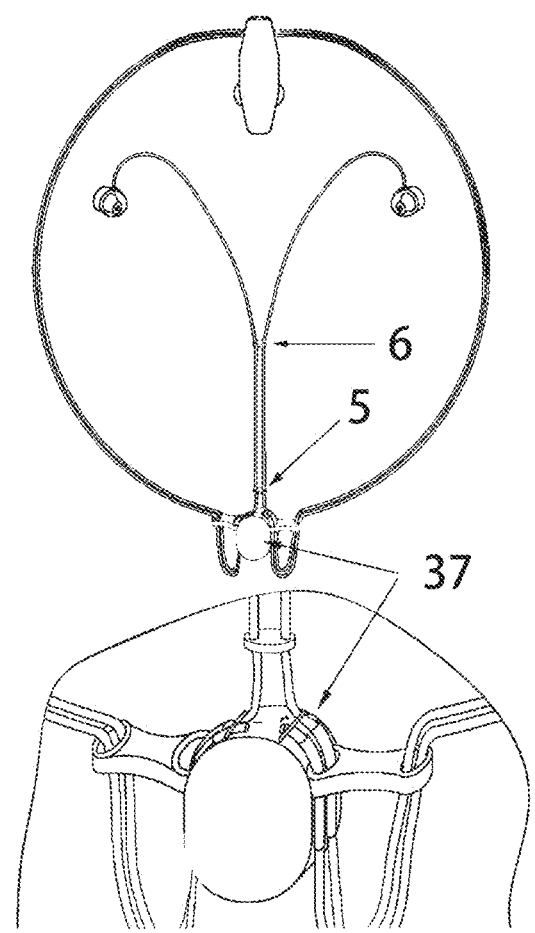
FIG. 31 depicts an embodiment of a headset according to the invention, having a mechanism for pulling cords, in which the cords are connected.
Figure 32:
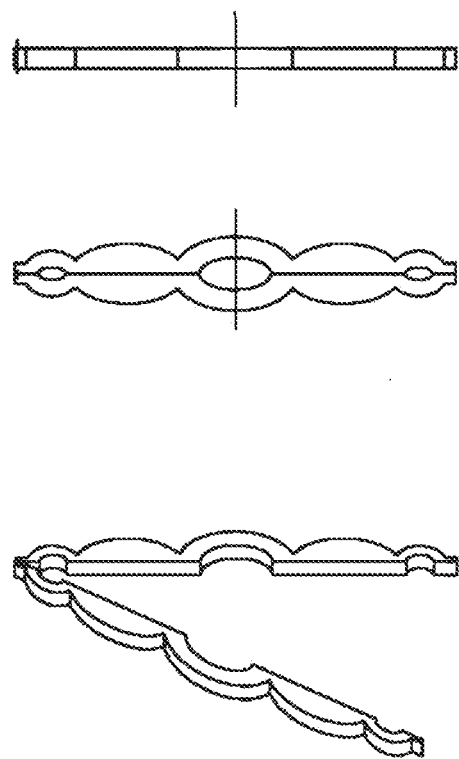
FIG. 32 and FIG. 33 show various designs of clips according to the invention.
Figure 33:
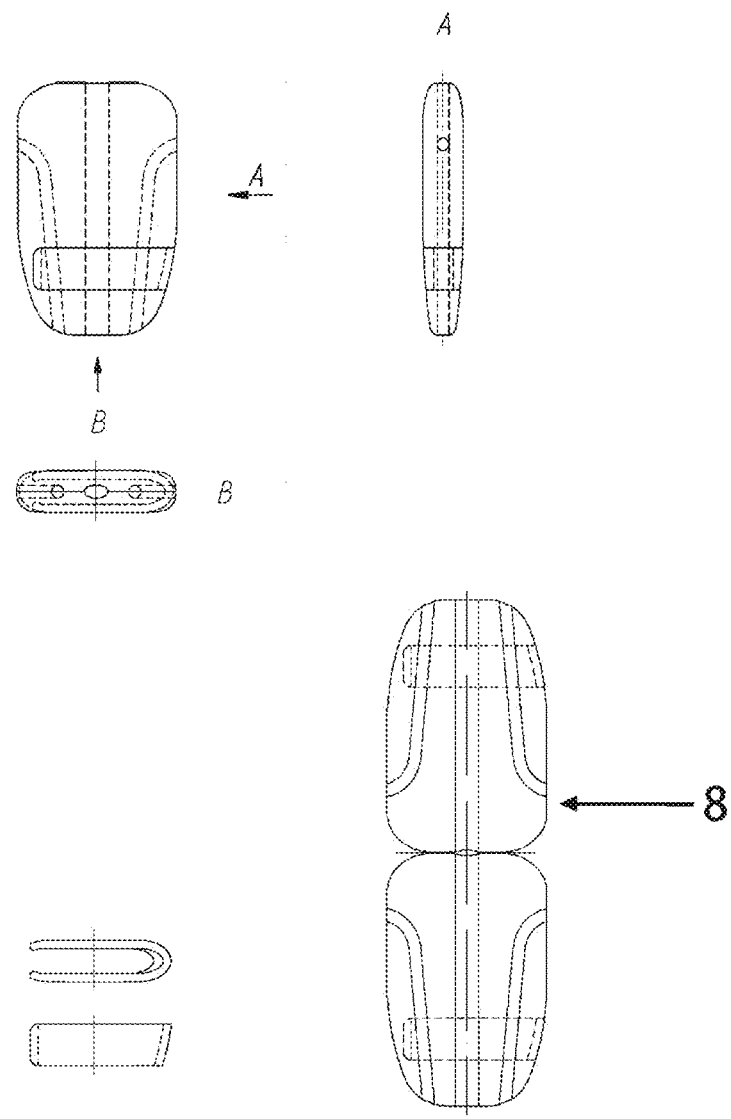

FIG. 31 depicts an embodiment of a headset having a mechanism of pulling cords, inside which the cords are connected. FIG. 32, FIG. 33 show various designs of clips 8.

It shall be noted that herein, a wearable device or a part thereof may be put on the neck of a user and may look like an article of clothing, e.g., a scarf or a neckerchief, which can be put on and used in the form of an O-shaped neck loop or an U-shaped neck loop. In publications, similar devices or articles of clothing are described by different terms but with similar explanation:

U.S. Pat. No. 2,625,612 discloses that a telephone holder has a "U-shaped portion, or open neck loop";

U.S. Pat. No. 7,416,099B2 discloses a neck strap for a mobile electronic device, comprising a flexible loop arrangeable around the neck of a user;

a stole or a epitrachelion is a garment which is "worn around the neck with the two ends hanging down equally in front" (Greek επιτραχελιον) means "around the neck"); in patent documents, stole is "submarine escape suit" (U.S. Pat. No. 7,900,573B2).

In order to concisely indicate a component designed and arranged to be worn around the neck, the following terms may be used: neck loop, neck set, neck strip, neck tape, neckerchief, neck strap, neck band, neckwear. These terms were used by other applicants as art-recognized definitions for indication of similar devices or articles of clothing, e.g. a telephone neck set configured as a U-shaped loop worn around the neck (US29044661); a neck tape, an O-shaped or U-shaped loop (U.S. Ser. No. 13/679,666); a neck-wear configured as a U-loop (U.S. Pat. No. 7,876,912B2); a neck-wear as a U-loop (U.S. Ser. No. 11/523,456); a neck band configured as an O-shaped loop (U.S. Pat. No. 3,778, 847A, U.S. Ser. No. 09/110,384).

The term "neck loop" in its meaning of an open loop is an art-recognized definition in the field of wearable devices to be worn around the neck (e.g., see U.S. Pat. No. 8,300, 862B2), the same is valid for the term "ear loop" (e.g., see U.S. Ser. No. 12/590,775).

Therefore, the term "loop" used herein can be interpreted both as a closed loop, and as an open loop. The inventor has found by trial that the components disposed on the user's neck, shoulders and chest, being both in the form of a closed loop and an open loop (or a half-loop), equally allowed attaining the same technical result when the neck-worn part of components were properly located adjacent to the dorsal part of the user's neck. In this case, the dorsal and suboccipital nodes of the device are located in optimized positions according to the mathematical models described herein, which is essential for attaining advantageous effects of this invention. Any of a neck loop, a neck set, a neck strip, a neck tape, a neckerchief, a neck strap, a neck band, a scarf, a U-shaped loop, an O-shaped loop, etc. may be equipped with the dorsal node according to the invention. Thus, any configuration of the neck-worn part of the claimed device as discussed in the above is applicable for attaining advantageous effects of this invention.

From the usability point of view, the two types of neck loops may differ from each other. In particular, an O-shaped loop can hardly be put on and taken off without unfastening thereof. Moreover, this is technically impossible for a typical woman-targeted device due to the smaller size thereof. Unfastening the device at the rear side, as it is usual for the most necklaces, is not convenient due to presence of the dorsal node disposed on the dorsal neck side, which is one feature of the invention.

The parent patent application describes "a headset wherein said cords comprise at least one contact member to connect portions of the cords to each other," which implies possibility of opening the loop. Placing the contact member at the rear side of the neck band is difficult due to presence of the dorsal node. So the loop may rather be opened at the front side thereof. However sometimes connecting the neck band sides at the front portions thereof may also be not a good idea, since one of the objects of creating a headset is to enable wearing the headset under clothes and managing it by touch through the clothes. Thus, a possibility of using the device with constantly disconnected neck band sides in the operational position, i.e., when the device is configured as a U-shaped loop, is also contemplated.

Meanwhile, a U-shaped loop also has some disadvantages. In particular, such devices tend to rotate and move on the neck and to slip down to the user's back. In order to prevent such undue movements, the neck band has to be designed in the form of a spring-loaded yoke, which may apply pressure to the jugular vein and thus cause discomfort while wearing thereof. Moreover, any substantial hardware can hardly be placed within a device of such type.

Therefore, a U-shaped loop is an instance of a neck loop, which is suitable for simple devices having limited functions. This option allows easy put-on and take-off of the device and provides compact design thereof.

Figure 11B:
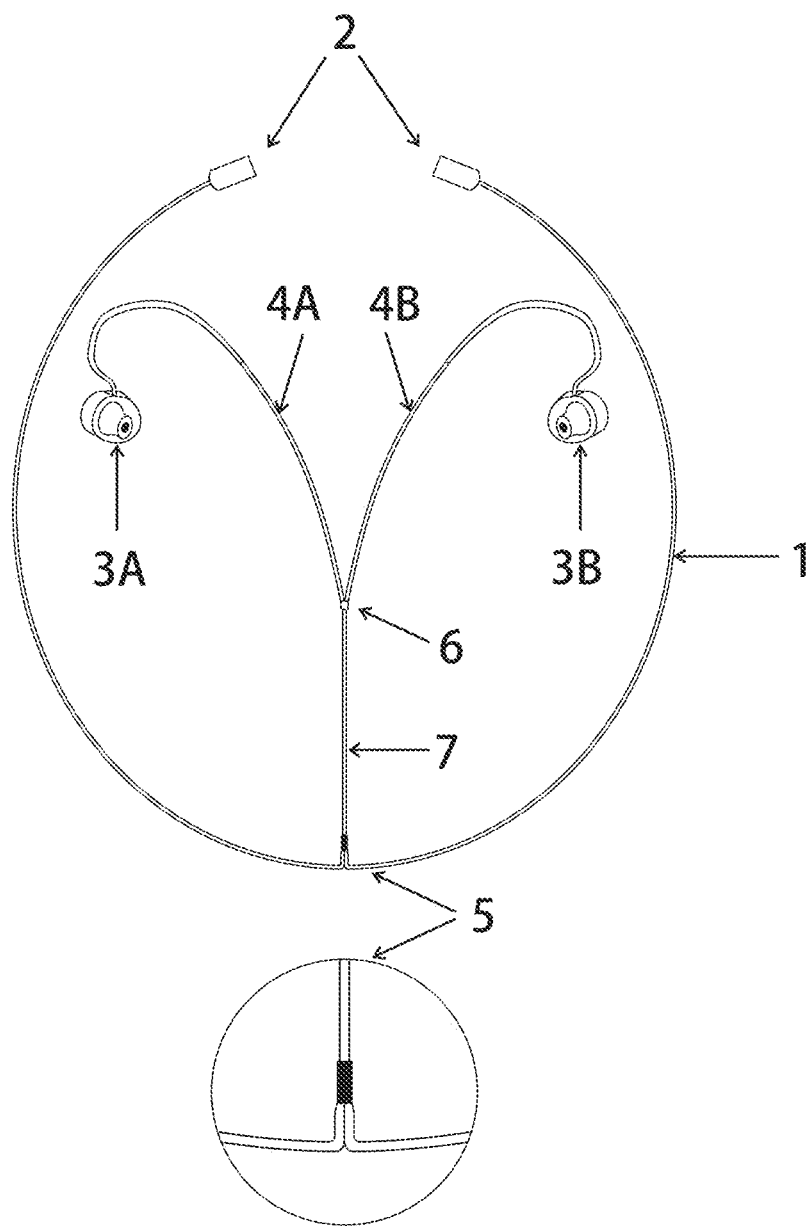
FIG. 11B is a general view of a wearable device according to the invention, with an O-shaped loop in open position, showing main functional components.

FIG. 11B and FIG. 11B show an embodiment of a wearable device with an O-shaped loop.

Figure 34:
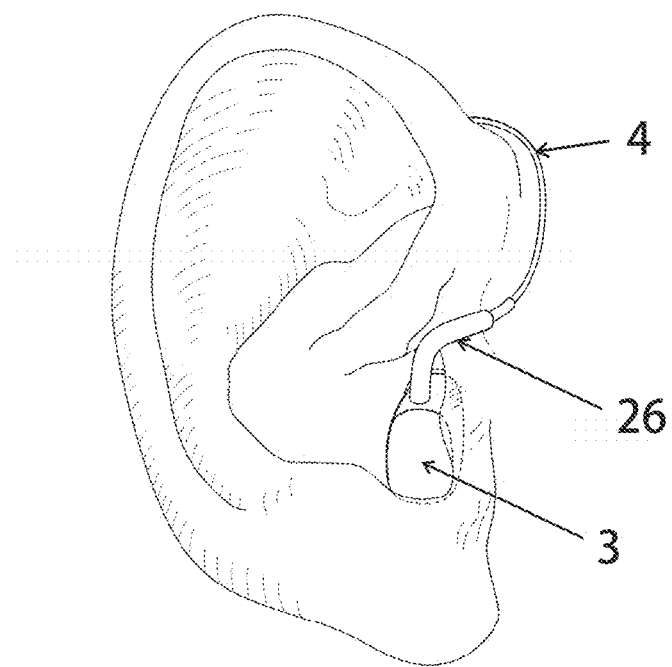
FIG. 34 and FIG. 35 show various designs of in-ear earphones configured to be at least partly placed in an external auditory canal, according to the invention.
Figure 35:
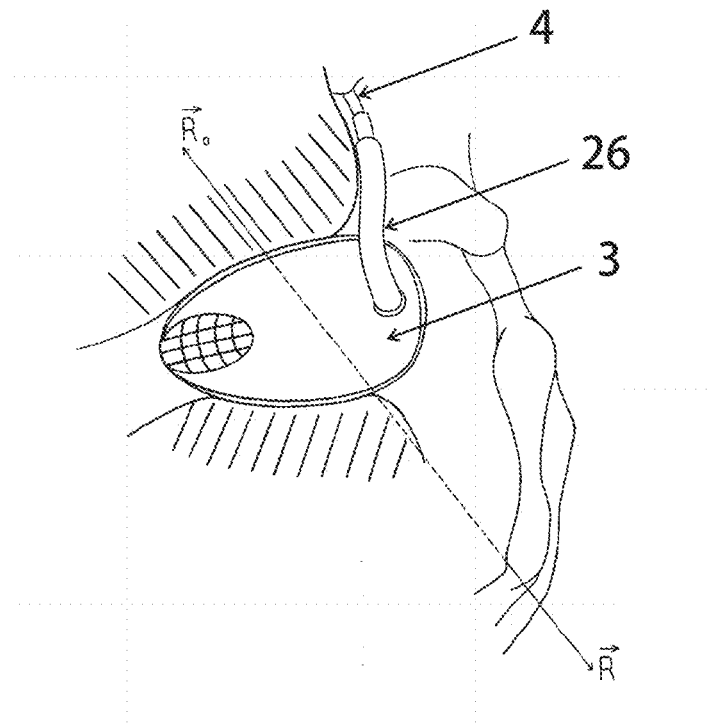

FIG. 34 and FIG. 35 show various designs of in-ear earphones configured to be at least partly placed in an external auditory canal, wherein the in-ear earphone 3 includes a guide wire 26. FIG. 34 shows a top view of the in-ear earphone 3, placed in user's ear (given in section) displaying vectors of forces affecting the earpiece.

When the earphones are in the non-operational position, the following additional tasks shall be addressed:

securing the earphones and, partly, the earphone cords on the neck loop in the non-operational (parking) position;

preventing a meshing the earphone cords in the cord portions between the suboccipital node and the earphones, when the earphones are being transitioned from the operational position to the non-operational position thereof;

providing a possibility of fast taking and placing one earphone in the ear when urgent incoming or outgoing call occurs;

providing enough length of the earphone cord for free rotating and tilting the user's head when one earphone is in use and the other one is secured to the neck loop in the parking position;

addressing all the above tasks when the device is worn under clothes;

providing a possibility of tactile contact with the control means but preventing unintentional activating thereof, when the device is worn under cloths;

providing a possibility of adjusting the neck loop length according to the user's size and preferences.

In order to address the above tasks, the following solutions are provided:

permanent magnets are placed in the suboccipital node and the earphones; the neck loop, at least partially, is made of a magnetic material; for instance, a helical spring made of a magnet material may be used in a Bowden cable in the portion of the neck loop between the rigid members of the loop and the dorsal node;

permanent magnets are placed in the earphones in such a way that analogous poles are positioned on the surface thereof, and the antipoles are positioned inside the body thereof, so their polarity impedes attraction of the earphones to each other and to the suboccipital node in order to prevent meshing the earphone cords;

in some embodiments, instead of permanent magnets, electromagnets may be used, wherein an electric pulse is applied to the electromagnets in order to pull the earphones to the parking spots upon the rigid member; afterwards, the earphones are caught and retained in the non-operational position by mechanical holders, latches or locks;

the cords, at least partially, are provided in the form of a spring; this allows reducing the length of the earphone cords between the dorsal and suboccipital nodes to 5-8 cm, which is less than the range of 9.8-13 cm as indicated in Table 1, when the cords are in a free, unloaded state. In such a configuration, the point of fixation of the suboccipital node is located on the lower part of the side surface (right or left) of the user's neck when the earphones are in the non-operational position. This position of the fixation point is located almost facing the corresponding ear when seen from the front side of the user and corresponds to the minimal distance between the neck loop and the ear. If the length of the cord portion between the nodes is in the range of 9.8-13 cm, the suboccipital node is fixed on the lower part of the neck loop, and the distance between the point of fixation of the suboccipital node and the neck loop is increased, which may impede taking thereof by the user's fingers when the earphones shall be transitioned from the non-operational position to the operational position, and may limit rotation of the user's head when one earphone is used and the other one is parked on the neck loop;

earphones are in-ear earphones, wherein the cord connected to the earphone is forming a kind of an arm or bail, which allows using the earphone with the cord either located over the auricle or positioned in the lower part of the auricle;

additional holding means like holders, latches or locks are provided in the neck loop;

control means are designed to facilitate tactile finding the control means and activating thereof through the cloths. In other words, the user has to find a button or key located under the cloths with no visual contact with them, while unintentional pressing thereof by a safe belt or a knapsack strap, etc. is prevented.

This task can be solved with a device comprising rigid members. The rigid member may be provided in the form of a flat polyhedron, wherein the planes of two narrow facets are substantially parallel to each other and substantially perpendicular to the user's body plane. The rigid member contains a control button or key positioned on the facet, wherein the position of the button or key is near the member's corner, where said facet borders another facet being perpendicular to the user's body plane, and the button or key is configured to be easily found and pressed through the cloths when the device is worn under the cloths. The described configuration prevents unintentional pressing thereof, whereas intentional pressing is possible by catching and holding the member with two fingers.

In an alternative embodiment the rigid member may be provided in the form of a flat curved body instead of a polyhedron, wherein the parallel and perpendicular positions relate to corresponding tangent planes of the member surface.

Further embodiments of a wearable electronic communication device intended for wearing under clothes, e.g., in the form of a neck loop or a half-loop are described. The most ergonomic solution is disposing a button interface in the region having form of an isosceles triangle having horizontal base located between proximal ends of clavicle and the vertex directed downwards in the vicinity of xiphisternum in men and somewhat above in women. The reach of hands in this case is based on particularities of the user's clothes, when considering a male dressed in standard European clothes not only in warm but also in cold climate. This layout of the buttons allows managing the electronic device with no pulling it from under the clothes, by pressing buttons or keys which are easily addressable by touch through the standard clothes; the buttons or keys are substantially unmovable and projected to substantially the same spot of the user's body, and they are tactually distinguishable from each other and able to provide a feedback in the form of a tactile or sound response (a click) upon pressing thereof.

Figure 36:
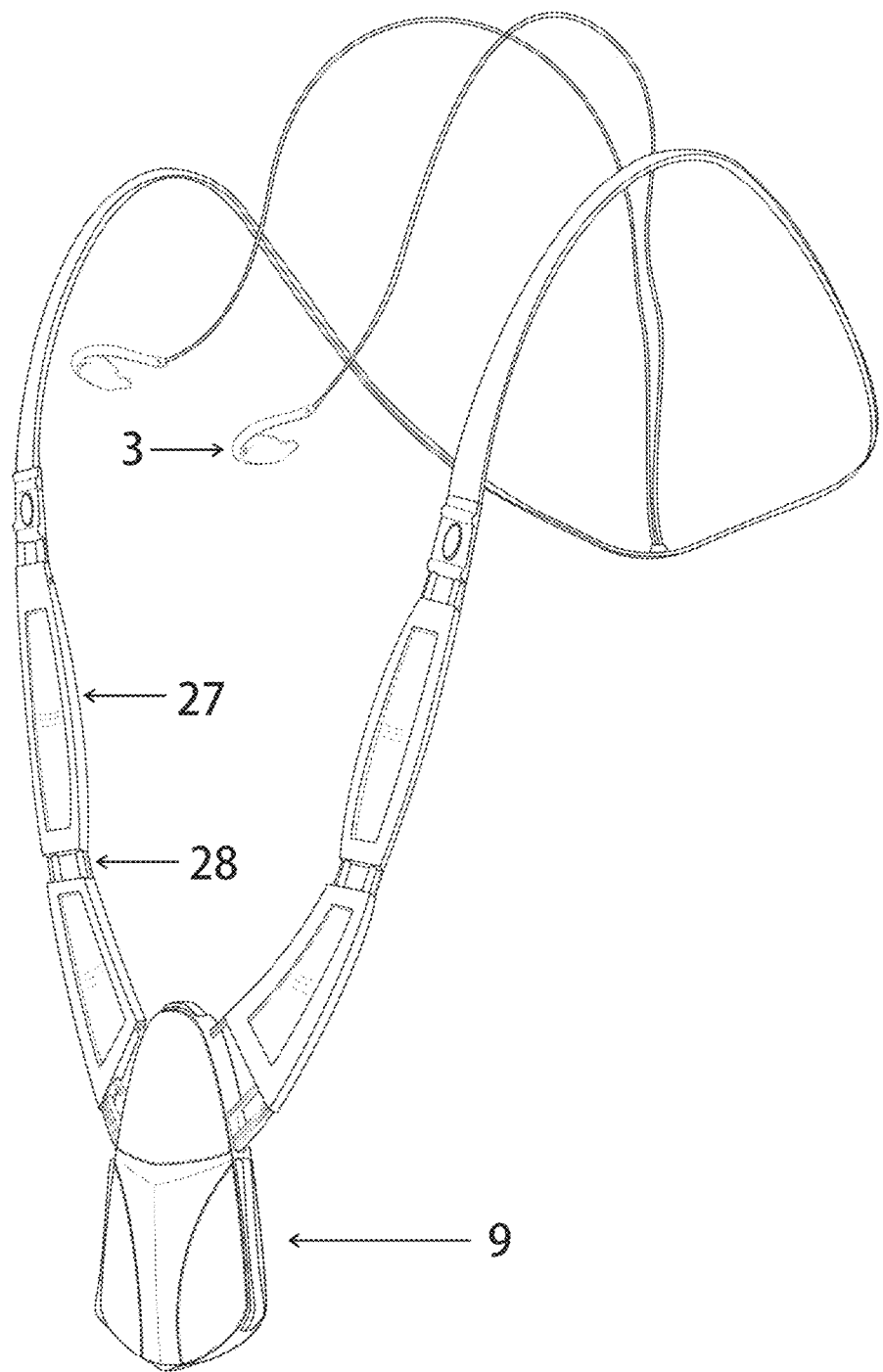
FIG. 36 shows a general view of the wearable device according to the invention, having rigid flat members.

FIG. 36 shows an embodiment of the claimed wearable electronic communication device provided in the form of a loop, wherein the wearable device comprises rigid flat shells 27 connected to each other by pairs of cables comprising wires 28. This type of design is stipulated by the following requirements applicable to constantly wearable accessories suitable for wearing under clothes:

(1) the wearable electronic communication device shall be flexible enough in order to be able to fit the user's body shape;

(2) the push buttons and the recesses for nesting or parking the earphones shall be located on the rigid members;

(3) the wearable device shall be stiff enough in order to avoid flipping over the buttons and the nest recesses located on the rigid members;

(4) the buttons and the nest recesses shall be disposed in readily accessible areas in order to assure comfortable access and effective control.

In order to provide enough flexibility, the cables with wires arranged inside the cables have to be flexible. A Bowden cable may be the best solution, as it may have magnetic properties. In order to improve reliability of electrical connections, the wires shall have some excess length so as the tension force caused by bent of the cables do not affect considerably the soldering points of the wires. In order to reduce twisting parts of the wearable electronic communication device during wearing thereof, cross-section dimension, optimal length and the number of the cables have to be determined.

Usually in wearable devices, the shells containing electronic functional devices are mounted directly on the wire, thus often causing the wire twist further causing the buttons being out of body area reachable by the user's fingers.

The torsional strain concept for a sole wire connecting rigid members may be expressed by an equation characterizing torsional strain of a cylinder, which equation establishes correspondence between the moment T of restoring force and the twist angle φ:

$$T = \varphi G J_0 / l \quad (37)$$

wherein G is shear modulus; $J_0$ is geometrical polar moment of inertia; 1 is the wire length. When considering the cylinder shape, $J_0 = \pi r4/2$, wherein r is the cylinder base radius. The equation (37) shows that a decrease in the length 1 and an increase in the cylinder radius r increases the moment of forces impeding the twist. However, the increase in the cylinder radius, i.e., the wire gage in between the rigid members of the wearable electronic communication device causes great discomfort while wearing thereof, so it is found expedient to shift from a circular wire to a flat wire disposed in parallel with the human body surface while wearing the wearable electronic communication device. In this case, a model of an inextensible tape shall be considered instead, since deformation of a tape occurs in the form of bending strain rather than shear strain.

By using a flexible but inextensible tape, additional rigidity in view of rotation of the rigid members relative to the longitudinal axis of the tape may be achieved, still retaining the tape flexibility in the cross-section thereof. As the tape material is non-extensible and incompressible, the length of the tape edges is not changed upon twisting the tape to the angle φ and the tape edges are disposed along spiral geodesic curves on the surface of a cylinder circumscribed by the tape. Thus, if the length L of the tape edges is constant, then the cylinder height is changed, which height $h_1$ may be determined based on the length of the geodesic curve on the cylinder surface:

$$h_1 = (L^2 - \varphi^2 D^2/4)^{1/2} \quad (38)$$

The equation (38) shows that fixation of the geodesic curve length corresponding to inextensibility of the tape leads to a limitation of possible rotation angle, resulting from the following condition:

$$L^2 - \varphi^2 D^2/4 \geq 0 \quad (39)$$

Upon button flip-over, φ=π, then:

$$L^2 - \pi^2 D^2/4 \geq 0 \quad (40)$$

Figure 37:
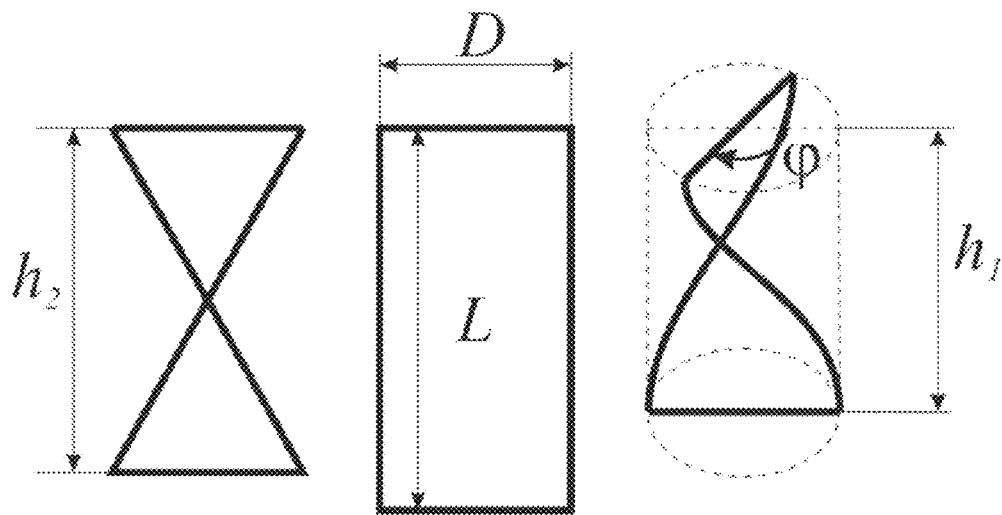
FIG. 37 illustrates the change in the form of flexible inextensible members of the wearable device according to the invention, occurring upon rotation thereof.

FIG. 37 shows examples of change in shape of flexible inextensible members upon twisting thereof. In the central part of FIG. 37 a flexible member having the length of L and the diameter of D is shown. A twisted tape is shown in the right part of this figure, and a pair of cables secured to rigid members is shown in the left part, wherein the planes of securing are rotated by 180° relative to each other.

If the length L and the diameter D are selected so that the inequality (40) is false, then flip-over of buttons is impossible due to inextensibility of the tape, i.e., in order to prevent flip-over of buttons, it is required that the following condition is met:

$$L \leq \pi D / 2 \quad (41)$$

If rigid shells having width of D are connected with two cables having the edge length of L and disposed on the shell sides, then rotation by 180° or π radian causes crossing the cables and the height $h_2$ is determined to be $$h_2 = (L^2 - D^2)^{1/2} \quad (42)$$

Correspondingly, the allowable length of the cables is determined to be $$L \leq D \quad (43)$$

Therefore, in order to avoid flip-over of the rigid shells, they shall be connected by flexible inextensible members, or a tape or a Bowden cable, or a pair of cables having a length equal to or less than the shell width.

In some embodiments, the form of the wearable device may vary from a half-loop to a completely open loop. A range of intermediate options is also possible, like an O-shaped loop configured to open and thus to transform to an open loop or a U-shaped loop configured to close and thus to transform to a closed loop during its use. In some embodiments, the wearable device may comprise rigid members 27 and at least one electronic unit 9 mounted in a flexible half-loop (FIG. 24B). In such examples the electronic unit 9 and the earphone may be located either on left or right side relative to the dorsal node or the components may be located on both left and right sides.

Figure 38:
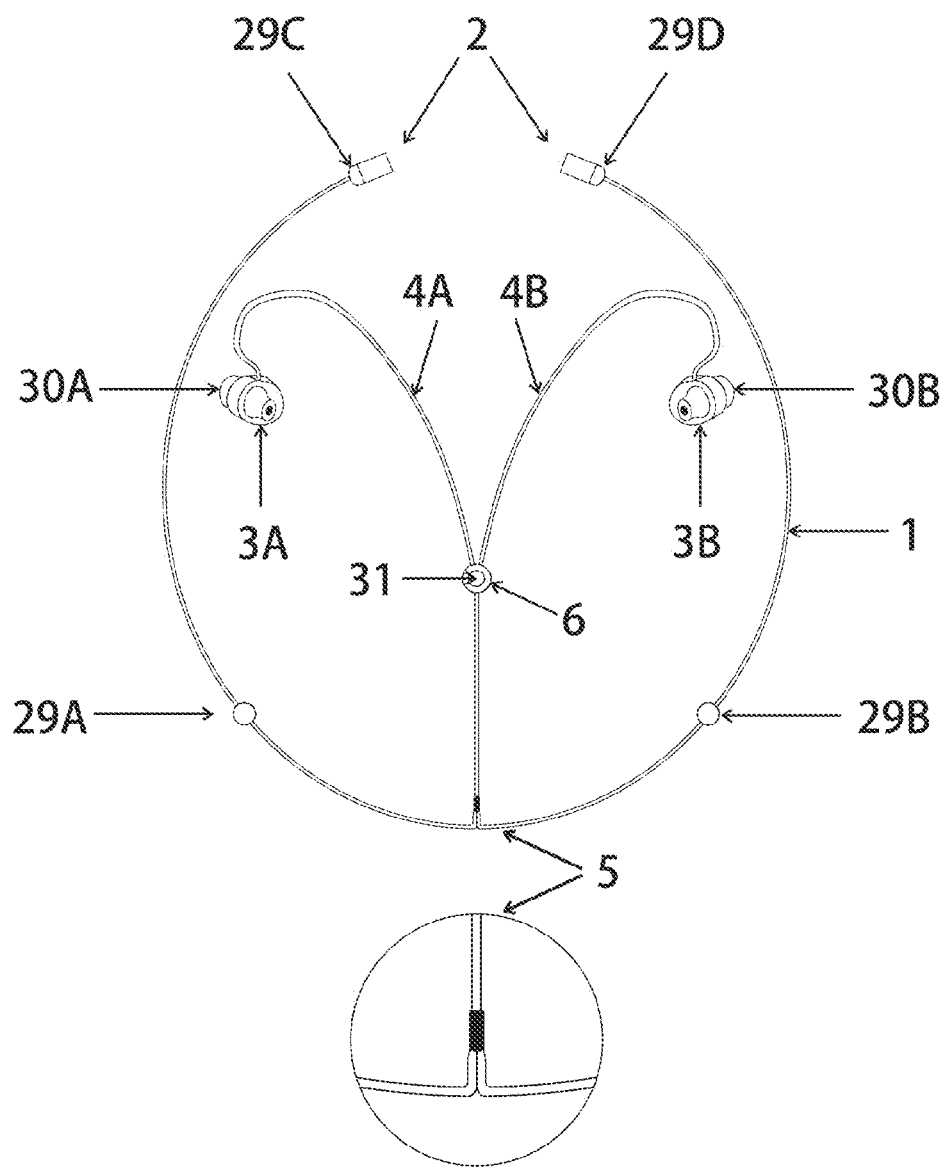
FIG. 38 shows an embodiment of a wearable device according to the invention, with ferromagnetic inserts.

In a preferred embodiment (FIG. 38), the wearable device contains a neck loop 1 comprising an electric connector 2, a couple of in-ear earphones 3A, 3B, two cords 4a, 4B forming a suboccipital node 6, and a dorsal node 5, wherein the earphones, the suboccipital node and the neck loop comprise ferromagnetic inserts 29A-29D, 30A, 30B, 31, and at least one of the ferromagnetic inserts is a magnet. Ferromagnetic inserts 30A, 30B of the earphones and the ferromagnetic insert 31 of the suboccipital node are configured so as to avoid or at least reduce magnetic attraction of the earphones to each other and to the suboccipital node, while the ferromagnetic inserts 29A-29D of the neck loop are configured to attract the headphones and the suboccipital node.

When in the non-operational position, the two earphones and the suboccipital node are secured on the neck loop surface by means of ferromagnetic inserts. It shall again be pointed out that the ferromagnetic inserts of the earphones and the suboccipital node are configured so as to avoid or reduce magnetic attraction of the earphones to each other and to the suboccipital node.

Figure 39:
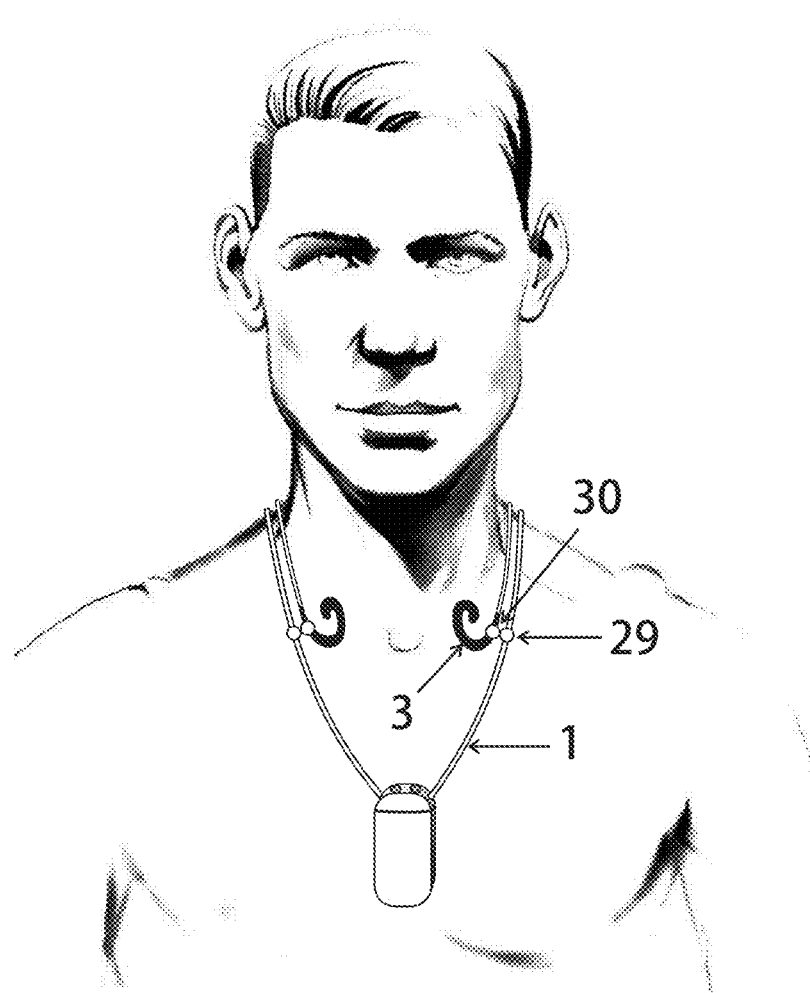
FIG. 39 shows an embodiment of a wearable device with ferromagnetic inserts in the non-operational position of the earphones, according to the invention.

FIG. 39 depicts a user bearing the device with the earphones in the non-operational position, where the earphones are parked on the loop on left and right sides of the user's head by means of the ferromagnetic inserts. FIG. 18 and FIG. 19 show the device equipped with the ferromagnetic inserts located in the suboccipital and dorsal nodes, when the earphones are in the operational position (FIG. 19) and in the non-operational position (FIG. 18).

The neck loop may be U-shaped or O-shaped in different embodiments of the invention.

When the user wears the device in the operational position of the earphones (FIG. 40), the dorsal cord connection node 5 is configured to be placed on the lower dorsal neck surface, while the suboccipital node 6 is configured to be placed on the upper dorsal neck surface. Cords 4A, 4B, in their portions located between the earphones and the suboccipital node, are configured to be under tension and placed on the user's head surface over the auricle. When the user wears the device in the non-operational position of the earphones, the suboccipital node 6 is configured to be secured to one of the ferromagnetic inserts of the neck loop 1, while the earphones are configured to be secured to another ferromagnetic insert of the neck loop.

In some embodiments of the device, at least one cord 7 in its portion between the suboccipital and dorsal nodes may be provided in the form of a helical spring or an S-spring, and this portion may be 5 cm to 8 cm long when the spring is in a free, unloaded state.

In some embodiments of the device, each of the cords 4A, 4B in their portions between the suboccipital node and the earphones may be provided in the form of helical springs or S-springs 32A, 32B, and this portion may be 12 cm to 16 cm long when the spring is in a free, unloaded state.

In some embodiments of the device, the above-mentioned magnet may be a permanent magnet or an electromagnet. The neck loop may comprise a Bowden cord 33.

Figure 41:
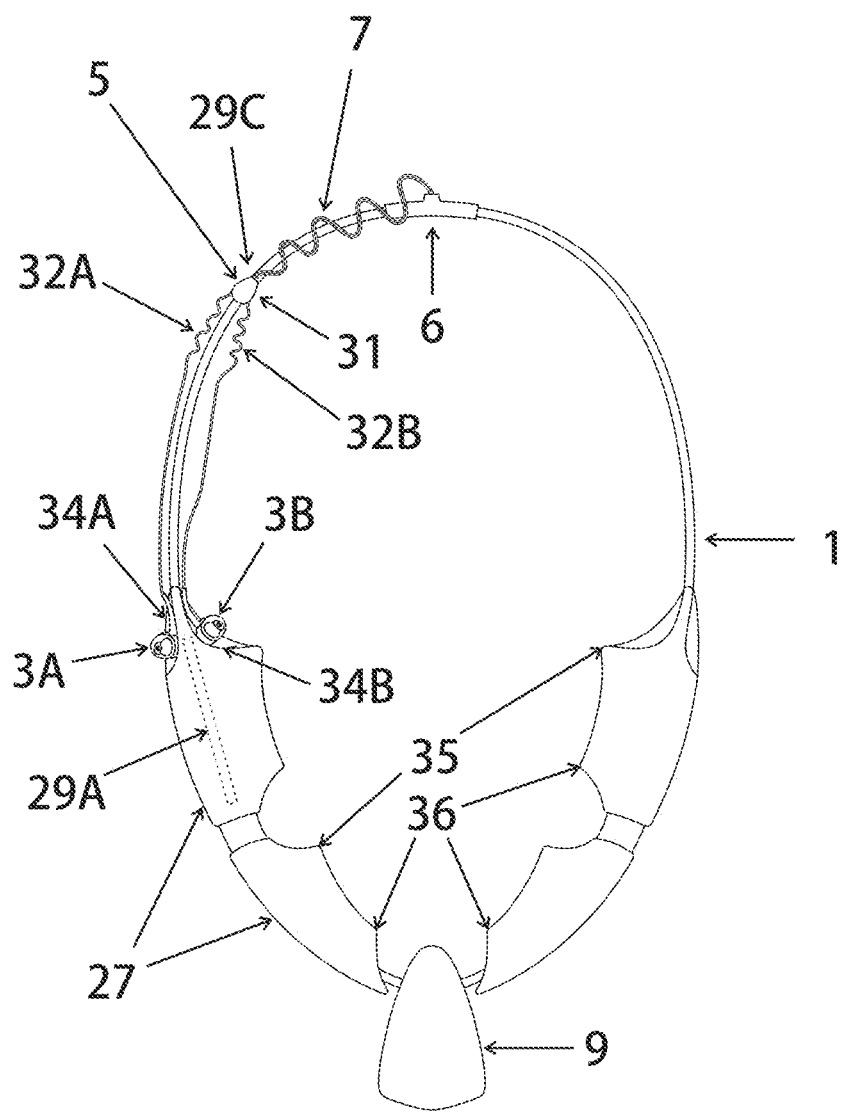
FIG. 41 shows an embodiment of a wearable device according to the invention with rigid members in the non-operational position of the earphones.

In preferred embodiments of the device, the neck loop may comprise rigid members 27 disposed on the neck loop astride of the dorsal node 6, wherein the ferromagnetic inserts 29A, 29B are located in the rigid members and the neck loop is configured so as to prevent twisting the rigid members 27. When in the non-operational position, the earphones 3A, 3B are parked on one of the rigid members comprising a ferromagnetic insert 29A, wherein the ferromagnetic inserts of the earphones are adjacent to the ferromagnetic inserts of the rigid member (FIG. 41). Additionally, the rigid members may comprise mechanical holders, latches or locks configured to hold the earphones in the parked position.

It shall be noted, that mechanical holding means are mainly described herein as holders, latches or locks. However, any other holding means of mechanical types like caps, hooks, arms, etc. having appropriate size and design may be used to hold the earphones in the parked position.

The suboccipital node may be configured in the form of a clip for adjusting the length of the cords between the suboccipital and dorsal nodes.

The suboccipital node and/or the dorsal node may be configured in the form of an electric connector for connecting and disconnecting the cords. The device may comprise control buttons and/or keys; in some embodiments, the buttons and/or keys may be configured to generate control command only when two buttons and/or keys are pressed at once.

The telecommunication device may additionally comprise a lock for opening the neck loop i.e., for disconnecting parts of the loop so as to make the loop open.

The telecommunication device (FIG. 40, FIG. 41) may comprise a neck loop 1 comprising rigid members 29 coupled to each other so as to avoid twisting the rigid members, wherein the rigid members may contain electronic hardware. The telecommunication device may also comprise two in-ear earphones 3 each comprising a ferromagnetic insert 30 (FIG. 39), two cords 4a, 4B forming a suboccipital node 6 and a dorsal node 5, wherein the cords between the suboccipital and dorsal nodes are partly provided in the form of springs 32A, 32B so that each cord is 12 cm to 16 cm long when the spring is in a free, unloaded state, and the cord between the suboccipital and dorsal nodes are at least partially provided in the form of a spring, so the cord is 5 cm to 8 cm long when the spring is in a free, unloaded state.

The rigid members 27 are disposed on the neck loop astride of the dorsal node 6 and shall be located on the user's chest and at least one of the rigid members 27 comprises at least one nest recess 34A, 34B combined with a ferromagnetic insert 29A or 29B for parking the earphone(s) 3A, 3B in the non-operational position thereof by means of magnetic attraction, wherein the length of the neck loop between the nest recesses and the dorsal node is in the range of 16 cm to 24 cm.

The suboccipital node 5 may comprise a ferromagnetic insert 31 and the neck loop may comprise at least one ferromagnetic insert 29C disposed in the cord portion between the dorsal node and the rigid member 27 so the suboccipital node may be magnetically attracted and retained on the neck loop, meanwhile the ferromagnetic inserts 30A, 30B of the earphones and the ferromagnetic insert 31 of the suboccipital node are configured so as to avoid or reduce magnetic attraction of the earphones to each other and to the suboccipital node.

Figure 40:
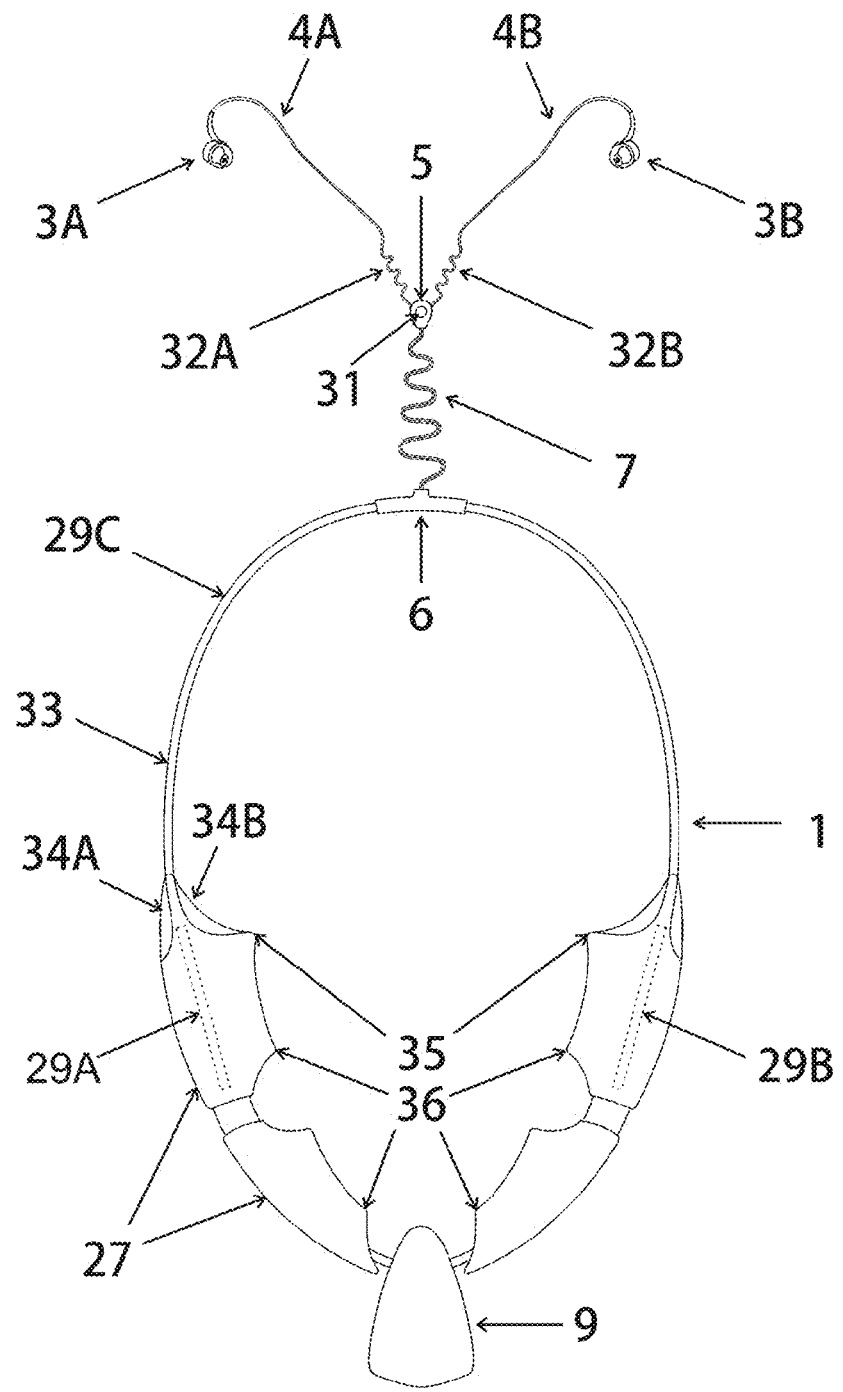
FIG. 40 shows an embodiment of a wearable device with rigid members according to the invention in the operational position of the earphones.

In some embodiments of the device, the ferromagnetic insert 29A may be provided in the form of a permanent magnet or an electromagnet, wherein the magnet pole being adjacent to the parking nests 34A, 34B is the antipole to the open poles of the earphones (FIG. 40, FIG. 41).

In some embodiments of the device, the neck loop may be provided in the form of a Bowden cable 33, and the common cord 7 between the suboccipital and dorsal nodes may be provided in the form of a spiral or S-shaped spring; alternatively, two separate cords 7 between the suboccipital and dorsal nodes may be provided in the form of spiral or S-shaped springs like shown in FIG. 17.

In some embodiments of the device, the suboccipital node may be provided in the form of a clip for adjusting the length of the cords between the suboccipital and dorsal nodes and between the suboccipital node and the earphones.

In some embodiments of the device (FIG. 40, FIG. 41), the rigid members 27 may be provided in the form of flat shells having a polyhedron-like form, wherein the planes of two narrow facets of the polyhedron are substantially parallel to each other and substantially perpendicular to the user's body plane. At least one of the rigid members may contain a control button or key 35, 36 positioned on the facet, wherein the position of the button or key is near the member's corner where said facet borders another facet being perpendicular to the user's body plane, and the button or key is configured to be easily found and pressed through the cloths when the device is worn under the cloths. The described configuration prevents unintentional pressing thereof, while intentional pressing is possible by catching and holding the member with two fingers.

In different embodiments of the device, the neck loop may be U-shaped or O-shaped, depending on usability requirements or user's preferences. Moreover, in some embodiments, the device may be configured as a U-shaped or O-shaped loop by the user and this configuration may be changed during the use of the device.

The electronic unit 9 may be positioned on the neck loop antipodally to the dorsal node 6.

The wearable telecommunication device may contain at least one power source, at least one microphone and at least one lock for opening the neck loop.

The suboccipital node and/or the dorsal node may be provided in the form of an electric connector.

The rigid member may be configured to be electrically and/or mechanically connected with additional electronic units. Additionally, the rigid members may comprise two mechanical holders, latches or locks on the parking nest configured to hold one or both of the earphones in the non-operation position thereof.

Figure 42:
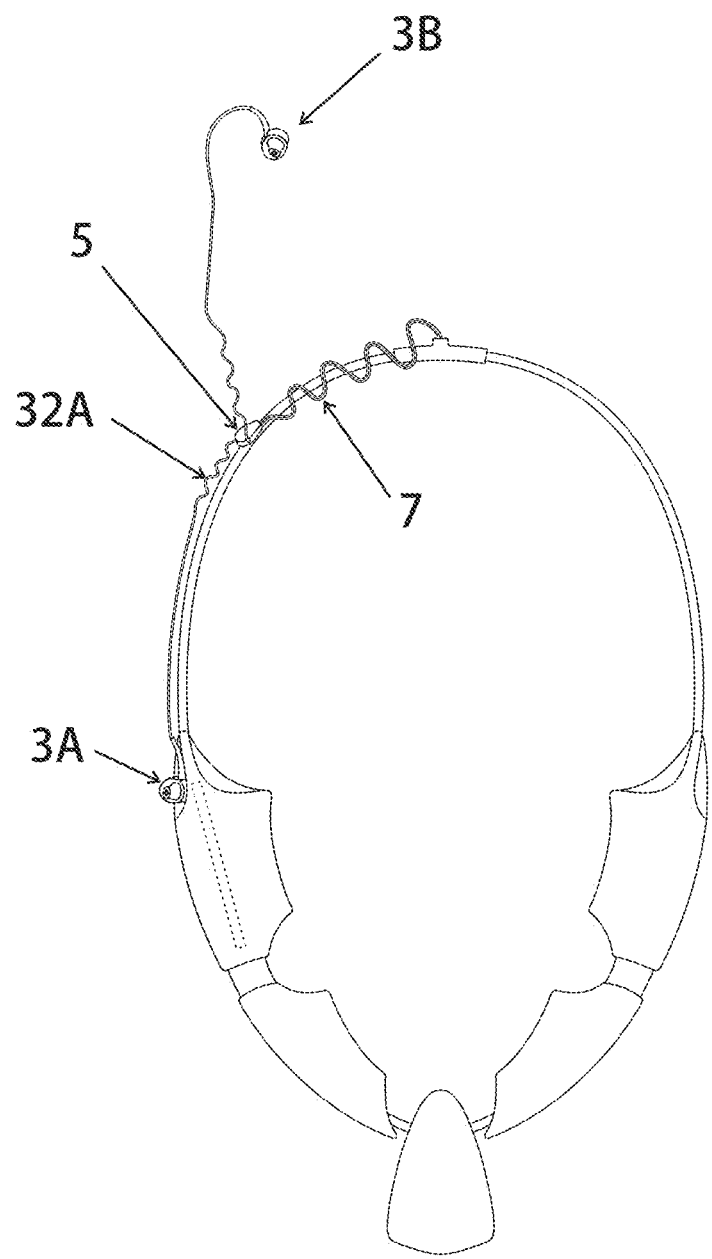
FIG. 42 and FIG. 43 show embodiments of a wearable device according to the invention with rigid members in a mono operational position of the earphones.
Figure 43:
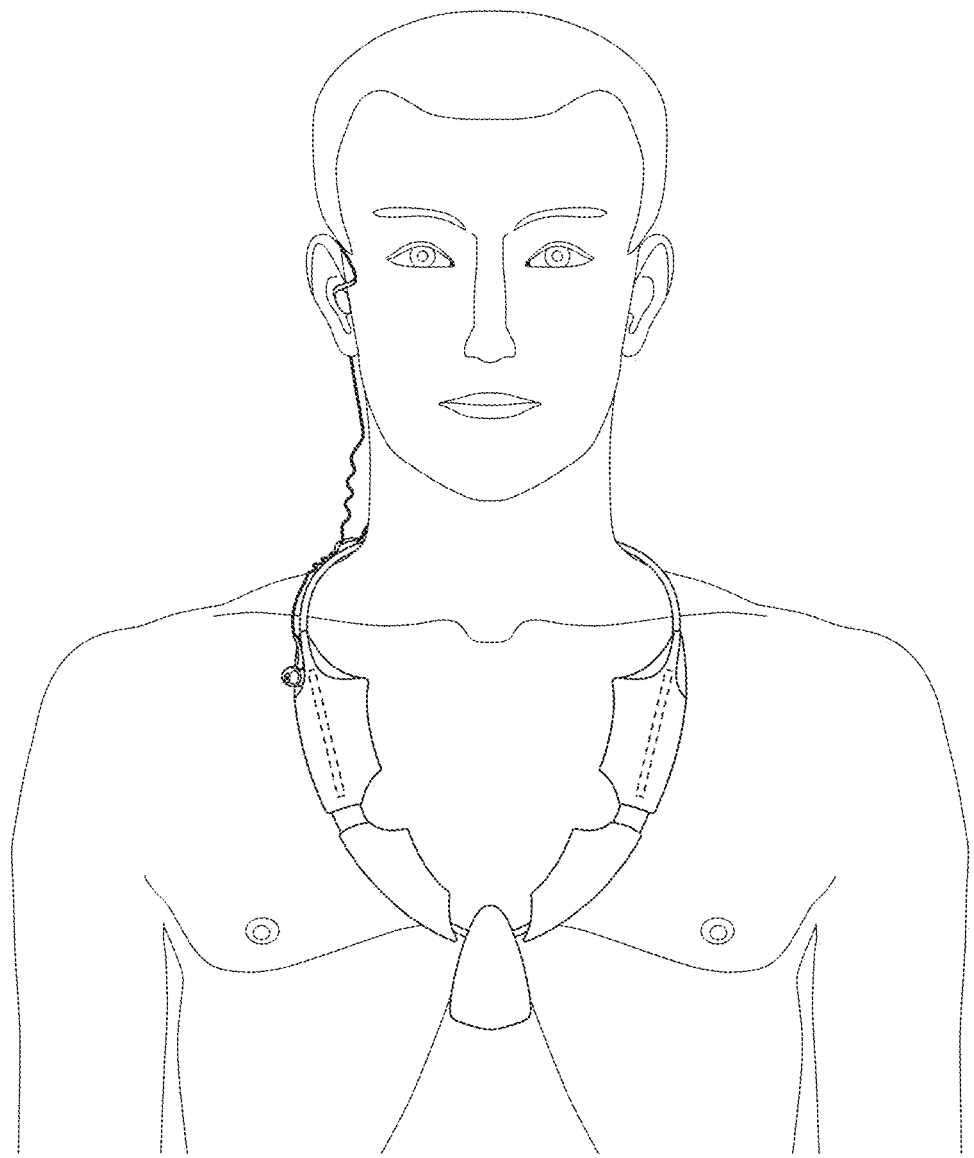

If necessary (e.g., when the user has to answer an incoming call or listen to an incoming message), any of the earphones may be readily transitioned from the non-operation position to the operational position and the device may be used in a monophonic mode (FIG. 42, FIG. 43).

Figure 44:
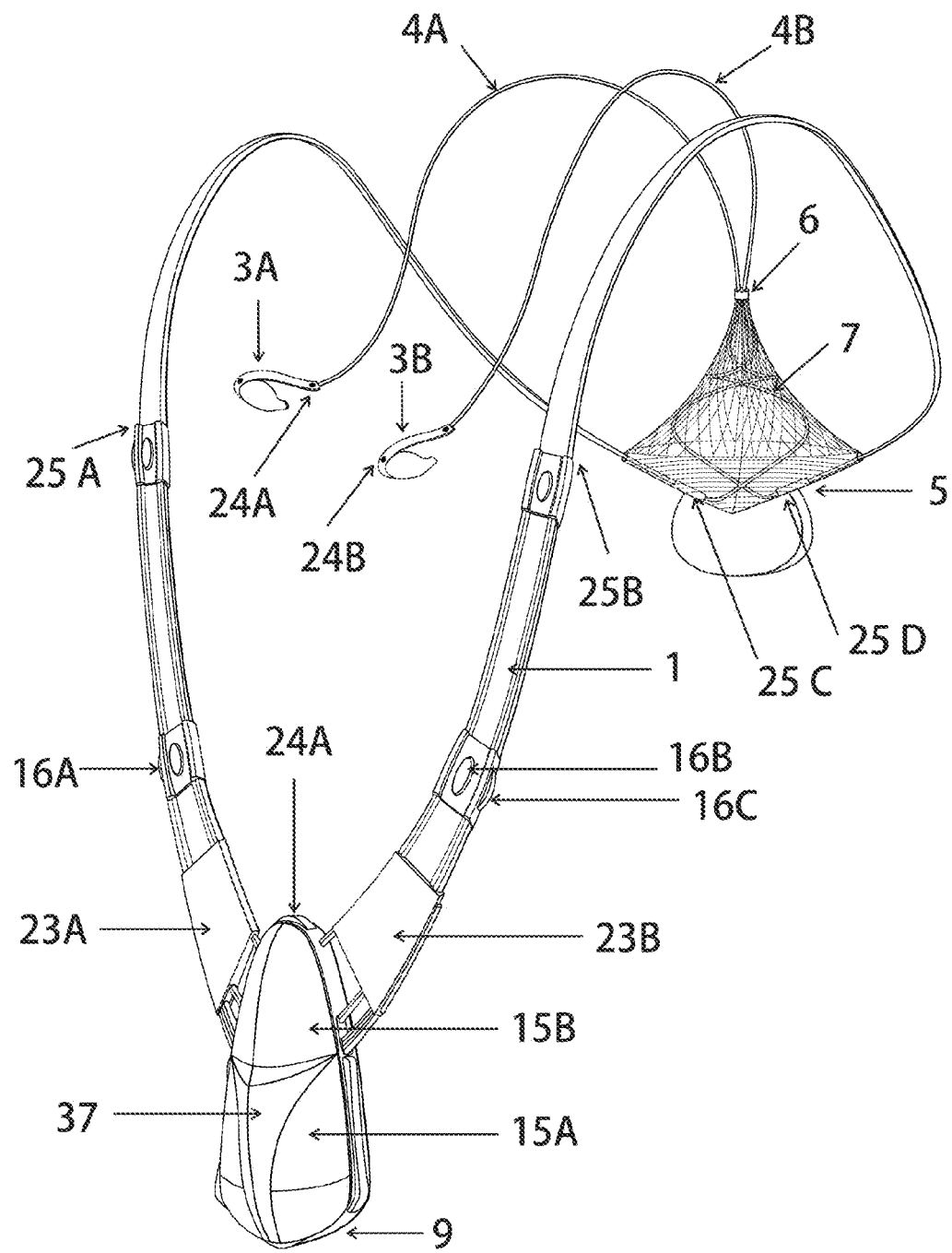
FIG. 44 is a general view of a headset provided as a multifunctional portable device, according to the invention.
Figure 45:
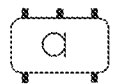
FIG. 45 shows a possible set of contact members of digital microphones, according to the invention.

FIG. 44 shows a schematic diagram of a headset configured as a multi-function portable device.

An electronic unit 9 provides electrical communications in user's Personal Area Network (PAN) with a mobile phone, a player, a radio station, etc. via a wireless transceiver of electromagnetic signal with license-exempt parameters, for example, Bluetooth, Kleer, ZigBee, AirPlay, Ultra-Wide Band, Piconet and others; in various embodiments the electronic unit 9 may be a phone or a smartphone, a radio station, a player, a radio, a Wi-Fi or GPS receiver, an electronic key or a data storage medium.

The electronic unit 9 is connected to the neck loop 1 via an electrical connector, which is accommodated in the electronic unit 9 in this embodiment. When the headset is worn, the electronic unit 9 is preferably positioned on the user's chest.

As one of the objects consists in creating a headset suitable for wearing under clothes and managing it over the clothes on the touch, while avoiding accidental pressure, some structural features have been provided. Electronic unit 9 has a protective rib 37 to separate buttons 15A, 15B that have different functions. A microphone 24A is also disposed on the electronic unit. Batteries 23A, 23B and interface buttons such as buttons 16A-C, are disposed on the neck loop. Connectors 25A-D allow replacement of detachable parts of the neck loop for individual adjustment of the headset.

When the headset is worn, portion 7 of cords between the suboccipital and dorsal cords connection nodes and the suboccipital cord connection node 6 is positioned on the dorsal surface of the user's neck up to the suboccipital part, where cord portions 4A, 4B are V-like split and settle on the user's skin in a relatively tensioned state, and they are directed over the auricle to earphones 3A, 3B placed in the user's auricles.

Microphones 24B, 24C are disposed on earphones 3A, 3B.

FIGS. 45, 46A, 46B and 47 show a connection circuitry of keys and microphones in one embodiment of the headset. This embodiment includes twelve keys and seven microphones. The microphones are digital microphones with a standard set of contact members shown in FIG. 45.

Figure 46A:
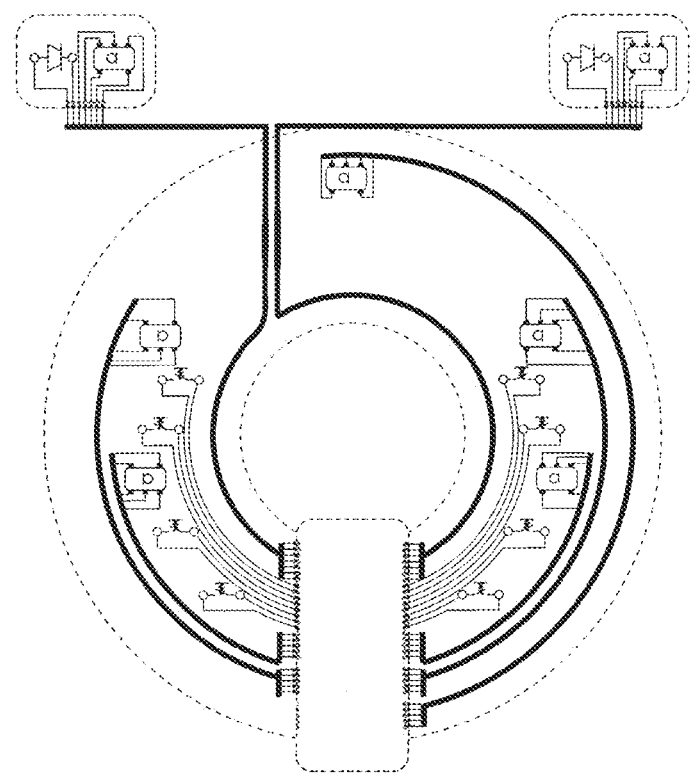
FIG. 46A, FIG. 46B and FIG. 47 show illustrative circuitry of a headset embodiment according to the invention.
Figure 46B:
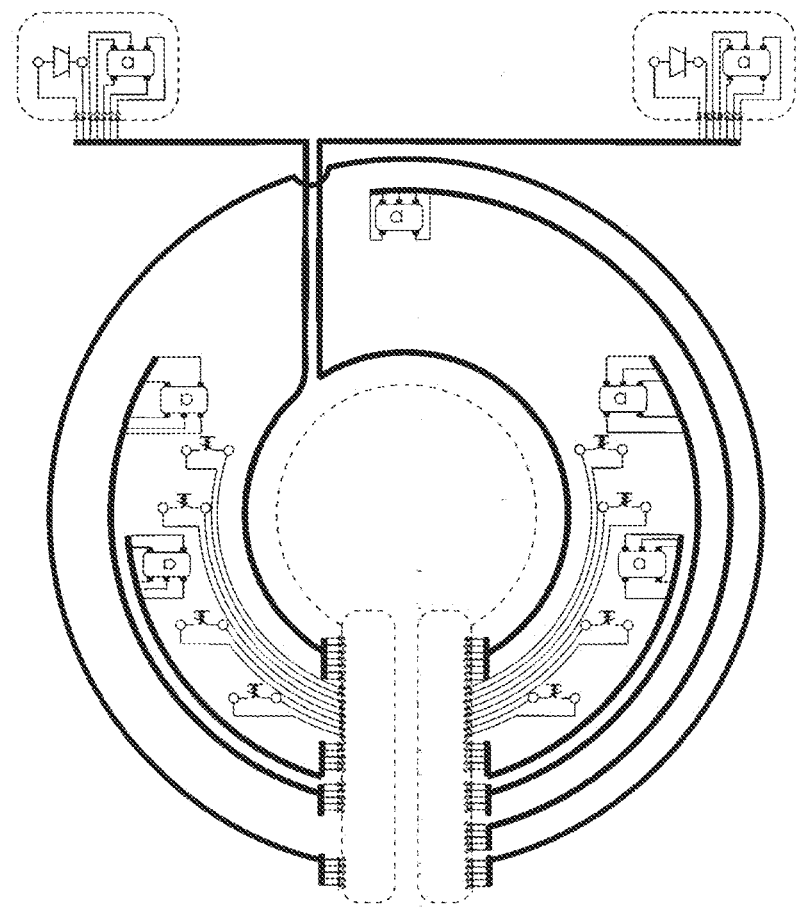
Figure 47:
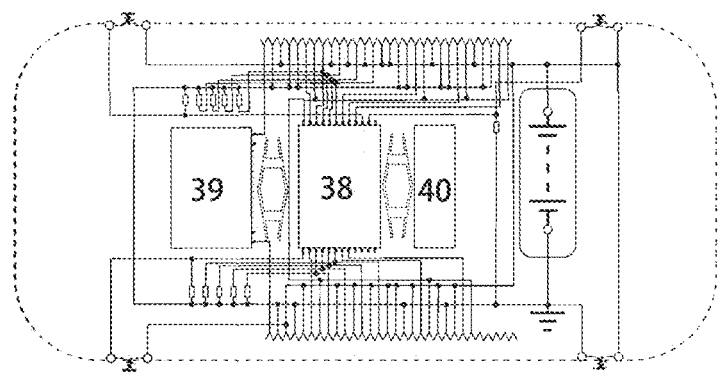

Data outputs to contact members, sync signal inputs of the microphones and control keys are connected to inputs of a signal processor or controller 38 (FIGS. 46A, 46B). Earphones are connected to a control chip, CODEC 39, or an audio module, which comprises a digital-to-analog converter, and a controllable-gain amplifier. In operation, the processor data exchanges data with peripheral devices 40 as well. FIG. 47 shows electrical circuitry of the headset.

Figure 48:
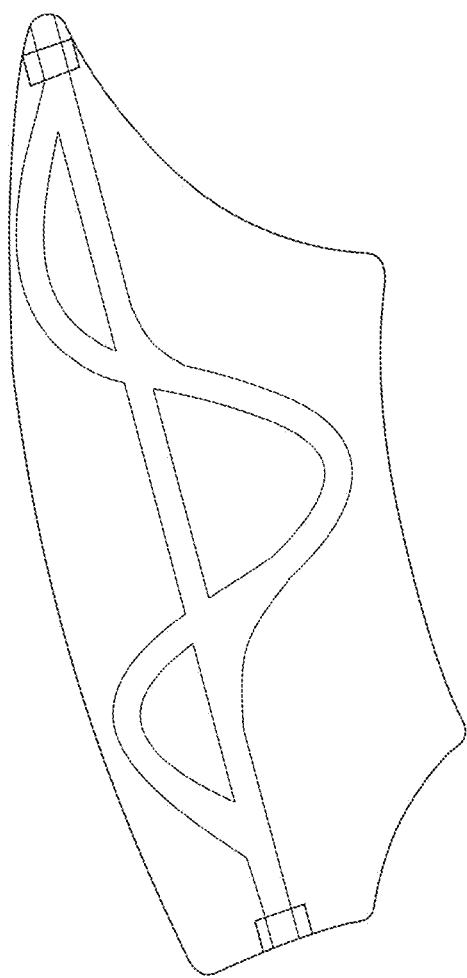
FIG. 48 shows curved paths for the cord length adjustment.

In some embodiments, the rigid members comprise a curved passage (FIG. 48) for adjusting the size of the neck loop by placing a part of the flexible neck loop located between the dorsal node and the left and right rigid members, correspondingly, into the passage as necessary for providing a better fit.

Thus, the device described herein differs from known devices on the market by the following features.

The device in the form of an electronic necklace may be configured as a constantly worn headset connected by a spring-like cord to an additional node for holding the earphone cords, wherein the device has bigger size and provides more room for hardware (like microphones, digital signal processors, data storage memory, sensors, radio transceivers, antennas, more powerful power source, etc.), while still being anatomically comfortable, ergonomic and user-friendly while wearing. For example, in some embodiments of the device, it comprises an electronic unit 9, a power source and microphones.

Contrary to known stereo Bluetooth headsets, the neck loop connected to the earphones by a spring-like cord has minimal length of free cords (i.e., cords which tend to loose and sag), while the rest part of each cord (i.e., about ⅔ of the total cord length) is disposed on and along the user's body surface under certain tension, so those parts of the cords do not tend to loose and sag and the earphones are better secured on the auricle and in external auditory canal. As a result, the device changes the user's appearance very little while wearing; it does not limit the freedom of movements; upon receiving a call or a message, the earphones can easily be drawn from under the clothes or pulled out from a dedicated soft pocket in the rear part of the necklace and placed on or in the user's ear.

The cord length between the earphone arm and the point of connecting to the necklace is adjusted, which allows a perfect fit to the individual user's size and preferences, thus providing more close engagement of the cords and safety of wearing the device, and additionally contributes to preserving unchanged user's appearance.

The earphones of a special shape are designed for parking on the electronic necklace disposed on the user's body, so the device does not have to be taken off when in the non-operational position; meanwhile the earphones are parked very compactly so they do not catch on the clothes and never bother the user.

The electronic necklace engages the user's body very close and in some embodiments, it has a vibration ring (a vibrocall), wherein the vibration ring may be configured to different vibration patterns according to events, so even when the acoustic ring is off, a call or a message may be successfully received; moreover, different events may be identified by the different vibration patterns with no necessity of any actions by the user.

Unlike known stereo Bluetooth headsets, the electronic necklace in the form of an open or a closed loop can be controlled directly through the clothes, with no necessity of pulling it from a pocket of a bag or drawing it from under the clothes.

When the electronic necklace in the form of an open or a closed loop is taken off, it is easily folded (i.e., reduced in size owing to flexible parts (e.g., tapes, wires or cords) placed between the rigid members, thus avoiding meshing cords.

The additional advantage of the wearable device is the ability to position antennas of a Bluetooth or another wireless module on the neck loop, preferably according to the Vvedensky expression, at the level of user's shoulders to provide better conditions for reception and transmission.

The headset may also comprise gyroscopes, accelerometers, magnetometers or other position sensors to assist in navigation with voice prompts of GPS device. If the sensors are positioned on earphone arms or in earphones as such, the navigation system housed in the headset will be able to determine the direction of rotation of the user's head.

Benefits of the invention such as: shortening by more than two times the length of the movable parts of cords, i.e., the portions between the nodes; convenient position and tension of cords on surface of the body; and immobility of the remaining cord portions allow the headset to be worn under clothes in the operational and non-operational position, and throat microphones may be disposed thereon.

In many embodiments the headset can be controlled without taking it from under the clothes or pulling a phone from a pocket, because the buttons located under clothes can be pressed from outside, over clothes, or by giving voice commands without hand manipulations at all. However, it should be kept in mind that to activate voice commands a button on the headset is still to be pressed, which increases the value of the tactile interface used in the headset.

With a constantly worn, but nearly invisible headset the user can stay in touch, listen to the music, podcasts, and receive current voice information without impairing the user's appearance and differentiating oneself from others.

The headset allows combining an electronic device with costume jewelry.

Use of the headset reduces the phone radiation on the brain.

Direct contact between the device and the user's skin allows positioning on the headset sensors for monitoring the state of user's health, such as temperature, blood pressure, sugar, alcohol in skin secretions, etc., to monitor galvanic skin response for the purpose of control of the sympathetic nervous system, which allows using the headset as a part of a biotelemetry system for medical diagnostics.

The headset can be used not only as an option for connecting to a mobile phone or itself used as a mobile phone, but also as a component of a wearable mobile system with hardware distributed over several devices carried by a person, for example, some of hardware and battery base can be accommodated in a man's trouser belt, while the wired connection to the headset can be implemented in a cord, which lies under the clothes along the user's spine on the back; the headset itself can be a mobile phone or smartphone, while a separately worn screen/keyboard unit can be used as a wireless interface to the mobile phone or smartphone.

With further development of technologies that enhance capabilities of voice communications between human and computer, as well as with wide spread of 3G and 4G communication, the advantages of the headset become even more obvious, in particular: improved quality of communications with the ability to speak and listen to a counterpart on phone using HD-voice telephony and stereo mode; GPS navigation without visual inspection of the map, but only with voice commands sent to user's earphones; development of new voiceover Internet and web surfing services without any need of a screen or a mouse, but only through a voice interface. When a user performs any actions, functions or operations which involve both hands, if the headset is available, it is possible to be constantly in touch or online without focusing on keeping the phone, but using voice prompts of the operator or computer.

Figure 49:
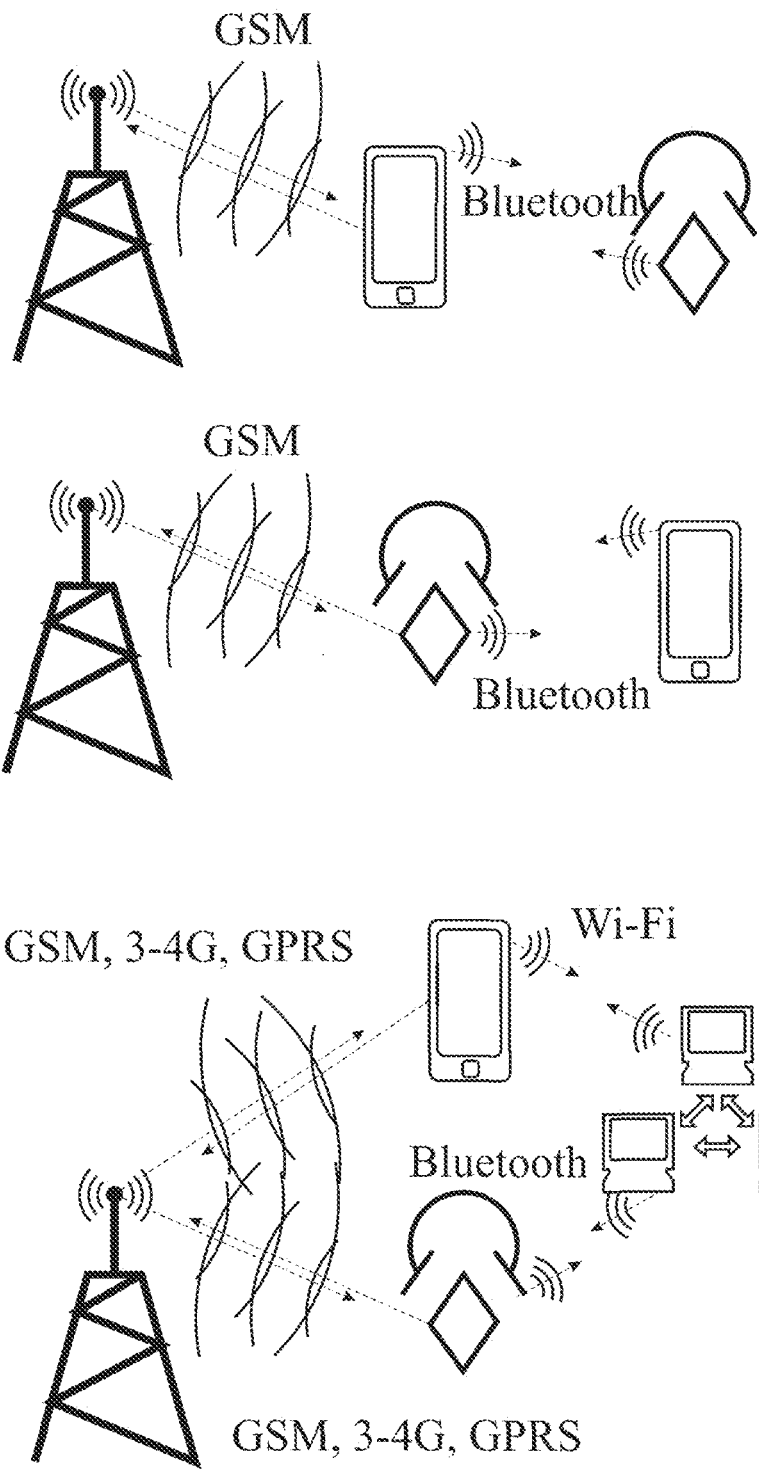
FIG. 49 illustrates the use of a headset according to the invention.

The headset can be a part of an integral system (FIG. 49), which includes, along with glasses/screens and other body-worn mobile devices, home or office computers implementing permanent communications between themselves and the operator base; such a system can be called "cloud mobiling" by analogy with "cloud computing".

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A headset for a mobile electronic device, comprising:
    a neck loop with at least one electrical connector attached thereto;
    two in-ear earphones; and
    two cords, one end of each of the cords being connected to one of the earphones and the other end being connected to the electrical connector;
    wherein the two cords are mechanically connected to the neck loop, and points of connection of the cords to the neck loop are placed in close proximity to each other and form a dorsal cord connection node, and the two cords are mechanically connected to each other in their portions between the in-ear earphones and the dorsal cord connection node to form a suboccipital cord connection node at their connection point.

2. The headset of claim 1, wherein, when the earphones are worn by a user in an operational position, the dorsal cord connection node and the suboccipital cord connection node are disposed on a dorsal surface of a neck, and the two cords are placed over an auricle in their portions between the earphones and the suboccipital cord connection node.

3. The headset of claim 1, wherein, when the earphones are worn by a user in an operational position, the two cords are disposed on a surface of a head of the user in a tensioned state in their portions between the earphones and the suboccipital cord connection node.

4. The headset of claim 1, wherein, when the earphones are worn by a user in an operational position, the dorsal cord connection node is positioned at a level of a seventh cervical vertebra, the suboccipital cord connection node is positioned at a level of an external occipital protuberance, and a portion of each of the cords between the suboccipital and dorsal cord connection nodes has a length determined by a maximum distance between first and seventh cervical vertebrae of the user, measured on a dorsal surface of a neck, with the head rotated sideways and tilted downward at the same time.

5. The headset of claim 1, wherein a portion of each of the cords between the suboccipital and dorsal cord connection nodes has a length of 5 cm to 13 cm.

6. The headset of claim 1, wherein the suboccipital cord connection node is configured as a clip adapted to move along the two cords for adjusting the length of the two cords.

7. The headset of claim 1, wherein the suboccipital cord connection node comprises an electrical connector for disconnecting the two cords.

8. The headset of claim 1, wherein at least one of the two cords in its portion between the suboccipital and dorsal cord connection nodes is configured as a helical spring.

9. The headset of claim 1, wherein at least one of the two cords in its portion between the suboccipital and dorsal cord connection nodes is configured as an S-spring.

10. The headset of claim 1, further comprising a spring disposed between the suboccipital and dorsal cord connection nodes.

11. The headset of claim 1, further comprising at least one electronic unit mechanically and electrically coupled to at least one electrical connector.

12. The headset of claim 1, further comprising at least two control means disposed on the neck loop.

13. The headset of claim 1, further comprising at least one power supply disposed on the neck loop.

14. The headset of claim 1, further comprising at least one microphone disposed on the neck loop.

15. The headset of claim 1, wherein the neck loop is U-shaped.

16. The headset of claim 1, wherein the neck loop is O-shaped.

17. The headset of claim 1, wherein the earphones are configured to be at least partly placed in the external auditory canal.

18. A wearable telecommunication device comprising:
    a neck loop with at least one electrical connector attached thereto;
    two in-ear earphones; and
    two cords, one end of each of the two cords being connected to one of the earphones and the other end being connected to the electrical connector;
    wherein the two cords are mechanically connected to the neck loop, and points of connection of the cords to the neck loop are in close proximity to each other and form a dorsal cord connection node, and the two cords are mechanically connected to each other in their portions between the earphones and the dorsal cord connection node to form a suboccipital cord connection node at their connection point;

wherein each of the in-ear earphones, the suboccipital cord connection node and the dorsal cord connection node comprises at least one ferromagnetic insert configured to avoid or reduce magnetic attraction of the earphones to each other and to the suboccipital cord connection node, and the neck loop comprises at least one ferromagnetic insert configured to attract the headphones and the suboccipital cord connection node; and wherein at least one of the ferromagnetic inserts is a magnet.

19. The wearable telecommunication device of claim 18, wherein the neck loop is U-shaped.

20. The wearable telecommunication device of claim 18, wherein the neck loop is O-shaped.

21. The wearable telecommunication device of claim 18, wherein, when the earphones are worn by a user in an operational position, the dorsal cord connection node is disposed on a lower dorsal surface of a neck, the suboccipital cord connection node is disposed on an upper dorsal surface of the neck, and the two cords are configured in a tensioned state over an auricle in portions between the in-ear earphones and the suboccipital cord connection node;

wherein, when the earphones are worn by the user in a non-operational position, the suboccipital cord connection node is secured to at least one of the ferromagnetic inserts of the neck loop, and each of the earphones is configured to be secured to at least one of the ferromagnetic inserts of the neck loop.

22. The wearable telecommunication device of claim 18, wherein at least one of the two cords is at least partly a helical spring or an S-spring in its portion between the suboccipital and dorsal cord connection nodes.

23. The wearable telecommunication device of claim 22, wherein each of the two cords in its portion between the suboccipital and dorsal cord connection nodes is 5 cm to 8 cm long when the spring is in a free, unloaded state.

24. The wearable telecommunication device of claim 18, wherein each of the two cords is at least partly a helical spring or an S-spring in its portion between the suboccipital cord connection node and the earphone.

25. The wearable telecommunication device of claim 24, wherein each of the two cords is 12 cm to 16 cm long in its portion between the suboccipital cord connection node and the earphone when the spring is in a free, unloaded state.

26. The wearable telecommunication device of claim 18, wherein at least one of the magnets is a permanent magnet.

27. The wearable telecommunication device of claim 18, wherein at least one of the magnets is an electromagnet.

28. The wearable telecommunication device of claim 18, wherein the neck loop comprises a Bowden cable.

29. The wearable telecommunication device of claim 18, wherein the neck loop comprises at least two rigid members disposed astride of the dorsal cord connection node and configured to be worn on the user's chest, and the neck loop is configured so as to prevent twisting of the at least two rigid members, wherein at least one of the ferromagnetic inserts is located in at least one of the rigid members, wherein when the earphones are in a non-operational position, the earphones are secured on one of the rigid members by at least one of the ferromagnetic inserts and the ferromagnetic inserts of the earphones are configured to be adjacent to the at least one of the ferromagnetic inserts located in the rigid member.

30. The wearable telecommunication device of claim 29, wherein at least one of the rigid members comprises mechanical holding means configured to secure the earphones in the non-operational position.

31. The wearable telecommunication device of claim 18, comprising at least one electronic control unit electrically and mechanically connected to the electrical connector.

32. The wearable telecommunication device of claim 18, wherein the suboccipital cord connection node is a clip for adjusting the length of the two cords between the suboccipital and dorsal cord connection nodes, and between the suboccipital cord connection node and the earphones, by moving along the cords.

33. The wearable telecommunication device of claim 18, wherein the suboccipital cord connection node is an electric connector for disconnecting the two cords.

34. The wearable telecommunication device of claim 18, wherein the dorsal cord connection node is an electric connector for disconnecting the two cords.

35. The wearable telecommunication device of claim 18, further comprising at least two control means placed on the neck loop.

36. The wearable telecommunication device of claim 35, wherein the control means are configured to generate a control command only when the two control means are activated simultaneously.

37. The wearable telecommunication device of claim 18, further comprising at least one power source placed on the neck loop.

38. The wearable telecommunication device of claim 18, further comprising at least one microphone placed on the neck loop.

39. The wearable telecommunication device of claim 18, further comprising at least one lock for opening the neck loop.

40. A wearable telecommunication device comprising
a neck loop comprising at least two rigid members connected to each other so as to prevent twisting of the at least two the rigid members;
at least one electronic unit disposed in at least one of the rigid members;
two in-ear earphones each comprising a ferromagnetic insert; and
two cords, wherein a distal end of each cord is connected to one of the earphones and a proximal end is mechanically and electrically connected to the electronic unit;
wherein the two cords are mechanically connected to the neck loop so the points of connection of the cords to the neck loop are located in close proximity to each other and form a dorsal cord connection node disposed on a lower dorsal surface of the neck while wearing the earphones in an operational position, the two cords are mechanically connected to each other in their portions between the earphones and the dorsal cord connection node to form a suboccipital cord connection node disposed on an upper dorsal surface of the neck while wearing the earphones in the operational position;
Wherein each of the two cords earphone is disposed in a tensioned state over an auricle, while its portion between the suboccipital cord connection node and the earphone is at least partly shaped a helical spring or an S-spring and each of the two cords is 12 cm to 16 cm long when the spring is in a free, unloaded state;
wherein each of the two cords in its portion between the suboccipital cord connection node and dorsal cord connection node is a helical spring or an S-spring so as to be 5 cm to 8 cm long when the spring is in a free, unloaded state;

wherein the rigid members are disposed on the neck loop astride of the dorsal cord connection node and configured to be worn on a user's chest, and at least one of the rigid members comprises at least one nest recess for parking the earphones in the non-operational position thereof, each recess being combined with at least one ferromagnetic insert to secure the earphones by magnetic attraction, wherein a length of the neck loop between the recess and the dorsal cord connection node is 16 cm to 24 cm; and wherein each of the in-ear earphones and the suboccipital cord connection node comprise at least one ferromagnetic insert configured to avoid or reduce magnetic attraction of the earphones to each other and to the suboccipital cord connection node, and the neck loop comprises at least one ferromagnetic insert disposed between the dorsal cord connection node and the rigid member and configured to attract the suboccipital cord connection node.

41. The wearable telecommunication device of claim 40, wherein the neck loop is a Bowden cable.

42. The wearable telecommunication device of claim 40, wherein each of the two cords between the dorsal and suboccipital cord connection node s is a helical spring.

43. The wearable telecommunication device of claim 40, wherein each of the two cords between the dorsal and suboccipital cord connection node s is an S-spring.

44. The wearable telecommunication device of claim 40, wherein the two cords between the dorsal and suboccipital cord connection nodes are integral cords.

45. The wearable telecommunication device of claim 40, wherein the suboccipital cord connection node is a clip for adjusting a length of the two cords between the suboccipital and dorsal cord connection nodes, and between the suboccipital cord connection node and the earphones, by moving along the cords.

46. The wearable telecommunication device of claim 40, wherein the rigid members are configured as flat shells having a polyhedron-like shape, wherein a planes of two narrow facets of the polyhedron-like shape are substantially parallel to each other and substantially perpendicular to the user's body plane, and at least one of the rigid members contains at least one control means positioned on at least one of the facets near the rigid member's corner where the facet borders another facet being perpendicular to the user's body plane, and the control means is activated through the clothes when the device is worn under the clothes, wherein intentional activation thereof is possible by catching and holding the member with two fingers.

47. The wearable telecommunication device of claim 40, wherein the neck loop is U-shaped.

48. The wearable telecommunication device of claim 40, wherein the neck loop is O-shaped.

49. The wearable telecommunication device of claim 40, wherein the electronic unit is positioned on the neck loop antipodally to the dorsal cord connection node.

50. The wearable telecommunication device of claim 40, further comprising at least one power source placed on the neck loop.

51. The wearable telecommunication device of claim 40, further comprising at least one microphone placed in the rigid member.

52. The wearable telecommunication device of claim 40, further comprising at least one lock for opening the neck loop.

53. The wearable telecommunication device of claim 40, wherein the suboccipital cord connection node is configured in the form of an electric connector for disconnecting the two cords.

54. The wearable telecommunication device of claim 40, wherein the dorsal cord connection node is an electric connector for disconnecting the cords.

55. The wearable telecommunication device of claim 40, wherein at least one of the rigid members comprises a curved passage for adjusting the size of the neck loop by placing a part of the flexible portion of the neck loop located between the dorsal cord connection node and left and right rigid members, correspondingly, into the curved passage.

56. The wearable telecommunication device of claim 40, wherein at least one of the rigid members connects mechanically and/or electrically to at least one additional electronic unit.

57. The wearable telecommunication device of claim 40, wherein the nest recess comprises at least one mechanical holding means configured to hold one or both of the earphones in the non-operational position thereof.

* * * * *